US006781994B1

(12) United States Patent
Nogami et al.

(10) Patent No.: US 6,781,994 B1
(45) Date of Patent: Aug. 24, 2004

(54) DISTRIBUTING ATM CELLS TO OUTPUT PORTS BASED UPON DESTINATION INFORMATION USING ATM SWITCH CORE AND IP FORWARDING

(75) Inventors: Kazuo Nogami, Sagamihara (JP); Akihiro Horiguchi, Fuchu (JP); Keitaro Hirai, Mitaka (JP); Kazuaki Mori, Fukushima (JP); Takashi Ikeda, Concord, MA (US); Junichi Takahashi, Fuchu (JP); Tohru Kishigami, Ome (JP); Masanori Watanabe, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/367,956
(22) PCT Filed: Dec. 25, 1998
(86) PCT No.: PCT/JP98/05964
§ 371 (c)(1),
(2), (4) Date: Aug. 24, 1999
(87) PCT Pub. No.: WO99/34558
PCT Pub. Date: Jul. 8, 1999

(30) Foreign Application Priority Data

| Dec. 25, 1997 | (JP) | ............................................. 9-358434 |
| Dec. 25, 1997 | (JP) | ............................................. 9-358437 |
| Dec. 25, 1997 | (JP) | ............................................. 9-358439 |
| Dec. 25, 1997 | (JP) | ............................................. 9-358447 |
| Dec. 25, 1997 | (JP) | ............................................. 9-358448 |
| Dec. 25, 1997 | (JP) | ............................................. 9-358449 |
| Dec. 26, 1997 | (JP) | ............................................. 9-366779 |
| Dec. 26, 1997 | (JP) | ............................................. 9-366783 |
| Dec. 26, 1997 | (JP) | ............................................. 9-366784 |
| Dec. 26, 1997 | (JP) | ............................................. 9-366798 |
| Jul. 24, 1998 | (JP) | ............................................ 10-209614 |
| Oct. 30, 1998 | (JP) | ............................................ 10-311369 |

(51) Int. Cl.[7] ............................................. H04L 12/56
(52) U.S. Cl. .............................. 370/395.1; 370/395.52; 370/401

(58) Field of Search ............................... 370/395.1, 397, 370/399, 395.3, 395.4, 395.52, 395.71, 389, 390, 392, 400, 401, 466, 467, 473, 474

(56) References Cited

FOREIGN PATENT DOCUMENTS

JP          5-219098          8/1993

(List continued on next page.)

OTHER PUBLICATIONS

K. Horikawa et al., "NHRP Architecture for Large Scale ATM Internet", The Institute of Electronics, Information and Communication Engineers, Technical Report of IEICE, Vol 96, No. 215 (SSE96–51), pp. 49–54, (1996).

(List continued on next page.)

Primary Examiner—Chau Nguyen
Assistant Examiner—Soon-Dong Hyun
(74) Attorney, Agent, or Firm—Finnegan, Henderson, Farabow, Garrett & Dunner, L.L.P.

(57) ABSTRACT

This invention has as its object to provide an ATM relay device which attains high-speed, large-capacity packet relaying by distributing the load on an IP forwarding unit without having to improve the operation speed, processing performance, and the like of an IP forwarding function. This invention has an ATM switch core (111) for distributing input ATM cells to corresponding ones of a plurality of output ports on the basis of their destination information. A plurality of IP forwarding units (120-1 to 120-n), which are provided in correspondence with the respective output ports of the ATM switch core (111) and have unique forwarding processing functions, execute predetermined forwarding processes for packets obtained by reassembling ATM cells input via the respective output ports. An SAR 121 assigns destination information that assumes different values in units of packets to ATM cells, which form each of packets having an identical address of those processed by the plurality of IP forwarding units (120-1 to 120-n). The ATM cells of a packet assigned identical destination information by the SAR 121 are stored in a PerVC queuing unit 112 by a predetermined volume, and are output in the format that stores the ATM cells by the predetermined volume.

7 Claims, 69 Drawing Sheets

U.S. PATENT DOCUMENTS

| | | |
|---|---|---|
| JP | 6-141038 | 5/1994 |
| JP | 7-30554 | 1/1995 |
| JP | 7-66811 | 3/1995 |
| JP | 7-221762 | 8/1995 |
| JP | 8-37530 | 2/1996 |
| JP | 8-223181 | 8/1996 |
| JP | 8-288952 | 11/1996 |
| JP | 9-149050 | 6/1997 |
| JP | 9-172457 | 6/1997 |
| JP | 10-51465 | 2/1998 |
| JP | 10-65711 | 3/1998 |
| JP | 10-200533 | 7/1998 |
| JP | 10-313316 | 11/1998 |
| JP | 11-88427 | 3/1999 |
| WO | WO 97/50276 | 12/1997 |

OTHER PUBLICATIONS

T. Ikeda et al., "ATM Koukan System AX–4100/AX–1500", Toshiba Review, vol. 51, No. 9, pp. 39–42, (1996).

Y. Katsube et al., "Cell Switch Router", The Institute of Electronics, Information and Communication Engineers, Technical Report of IEICE, vol. 95, No. 579 (SSE95–201), pp. 173–178, (1996).

H. Esaki, "High Speed IP Packet Forwarding Over Internet Using ATM Technology", Proceedings of the SPIE, vol. 2608, pp. 44–51, (1995).

| ROUTING TABLE ||| 415a |
|---|---|---|
| VPI/VCI | OUTPUT-PORT HEADER INFORMATION | OUTPUT SWITCHING INFORMATION |
|  |  |  |
|  |  |  |
|  |  |  |

FIG. 40A

| MASK BIT PATTERN 415b |
|---|
|  |
|  |
|  |

FIG. 40B

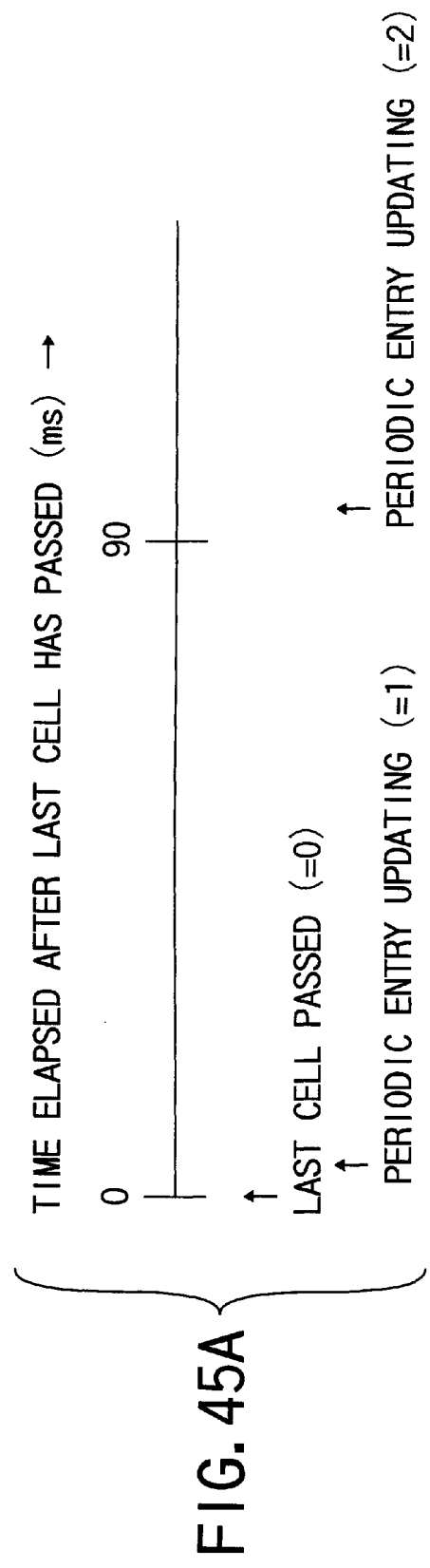
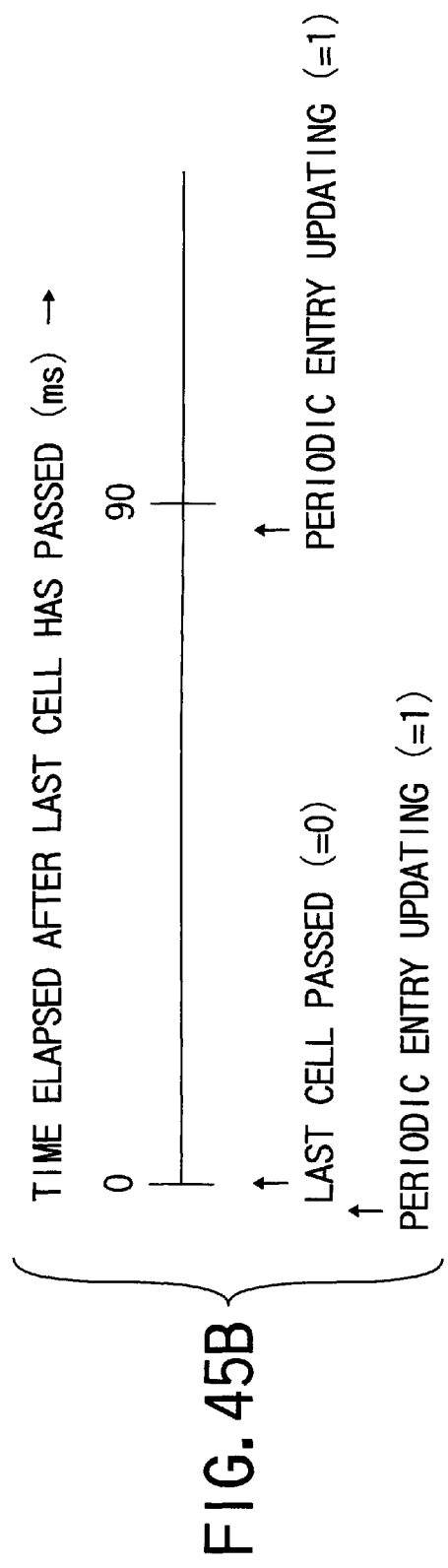
FIG. 45A
FIG. 45B

| PORT | ORIGINAL VPI/VCI | PDU ORDER | QoS |
|---|---|---|---|
| 1 | A | BOC(1) | PRIORITY 1 |
| 2 | B | BOC(1) | PRIORITY 2 |
| 1 | A | (2) | PRIORITY 1 |
| 2 | B | (2) | PRIORITY 2 |
| 1 | A | (3) | PRIORITY 1 |
| 2 | B | (3) | PRIORITY 2 |
| 1 | A | EOC(4) | PRIORITY 1 |
| 2 | B | EOC(4) | PRIORITY 2 |
FIG. 54A
| VC QUEUE | INPUT PORT | ORIGINAL VPI/VCI | PDU ORDER | CONVERTED VPI/VCI | QoS |
|---|---|---|---|---|---|
| A | 1 | A | BOC(1) | C | PRIORITY 1 |
| A | 1 | A | (2) | C | PRIORITY 1 |
| A | 1 | A | (3) | C | PRIORITY 1 |
| A | 1 | A | EOC(4) | C | PRIORITY 1 |
| B | n | B | BOC(1) | C | PRIORITY 2 |
| B | n | B | (2) | C | PRIORITY 2 |
| B | n | B | (3) | C | PRIORITY 2 |
| B | n | B | BOC(4) | C | PRIORITY 2 |
FIG. 54B
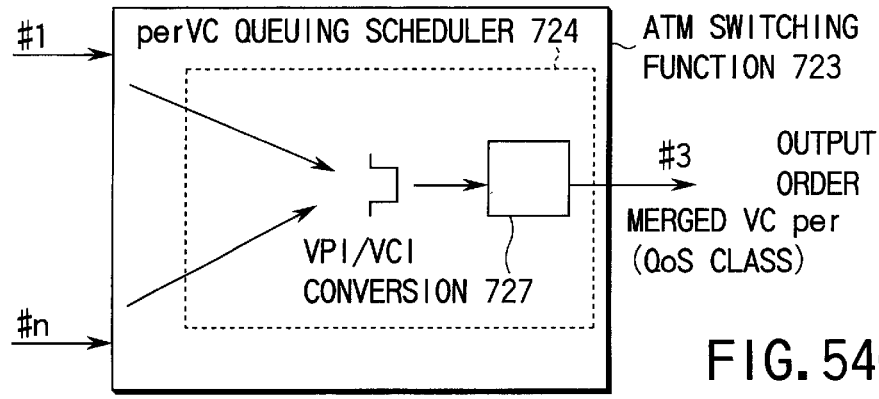
FIG. 54C
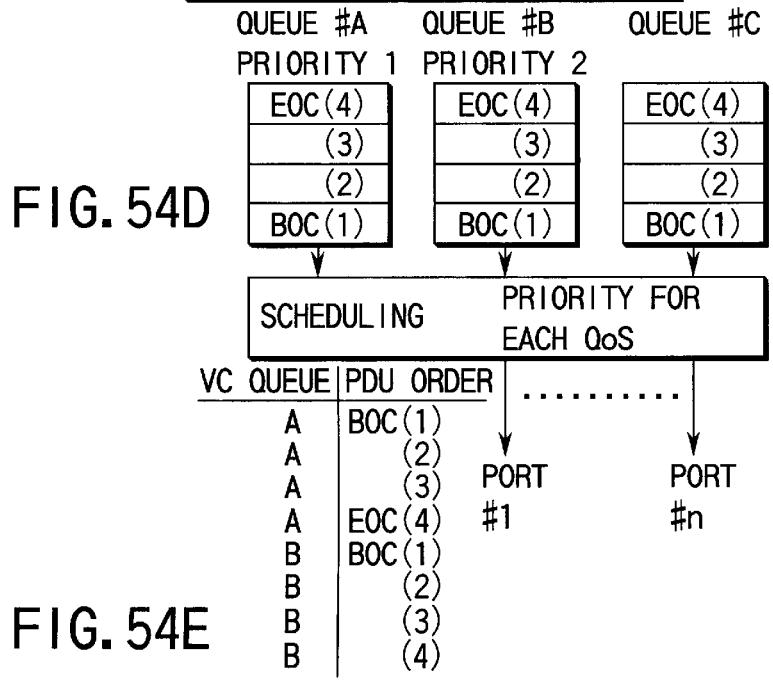
FIG. 54D
FIG. 54E

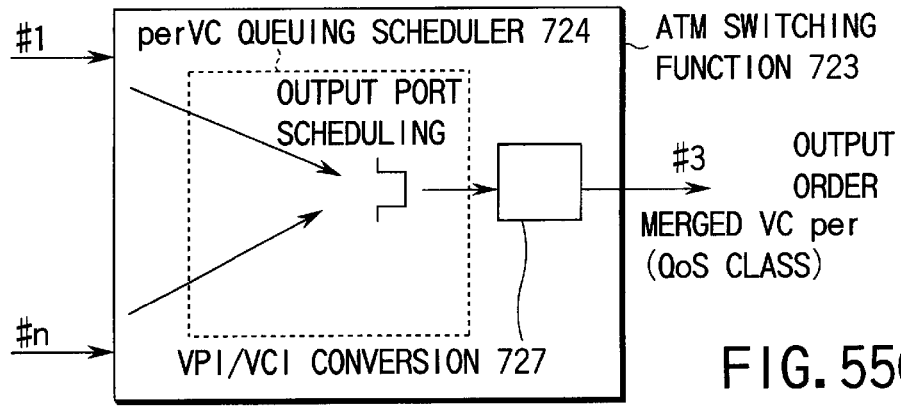
FIG. 55A
FIG. 55B
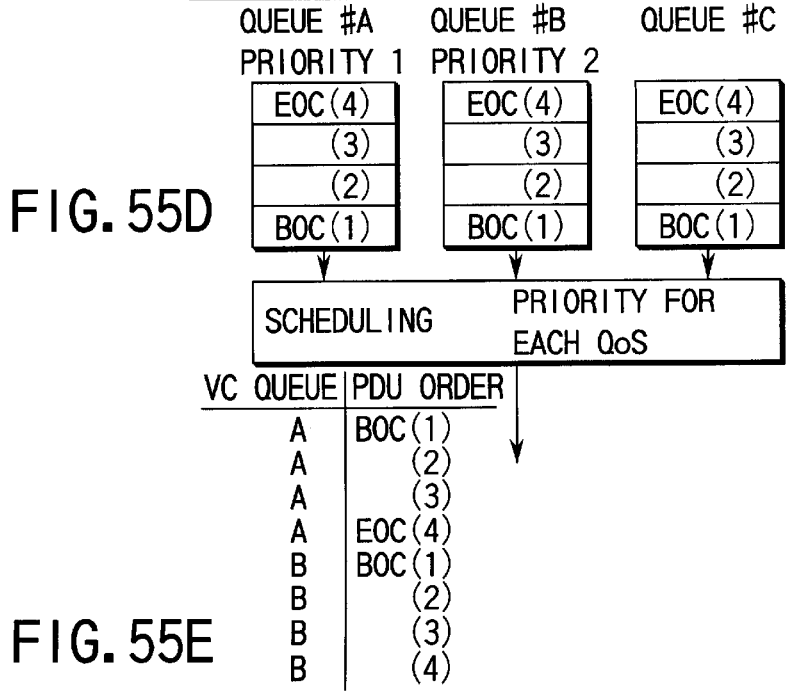
FIG. 55C
FIG. 55D
FIG. 55E

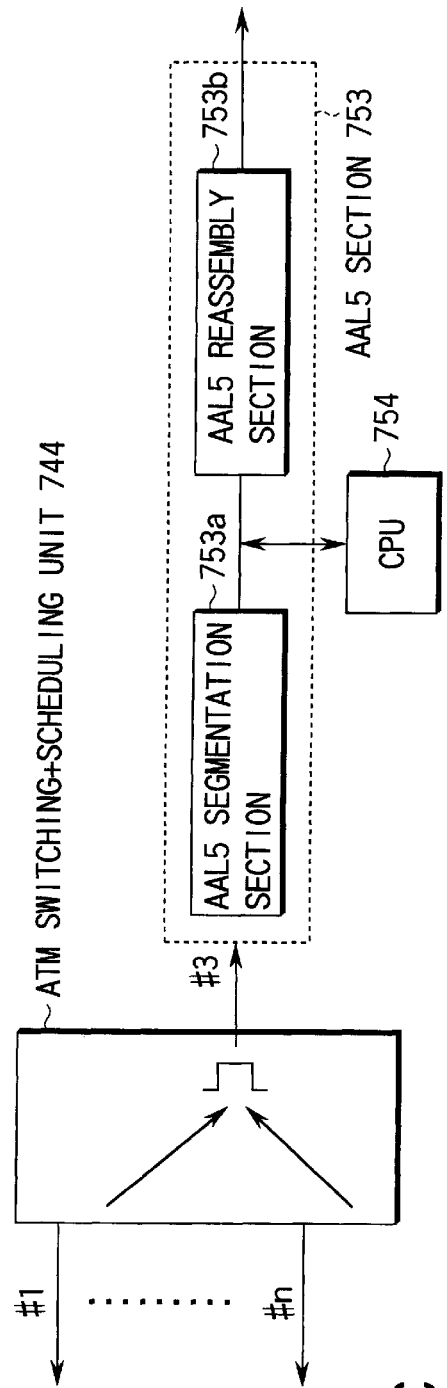

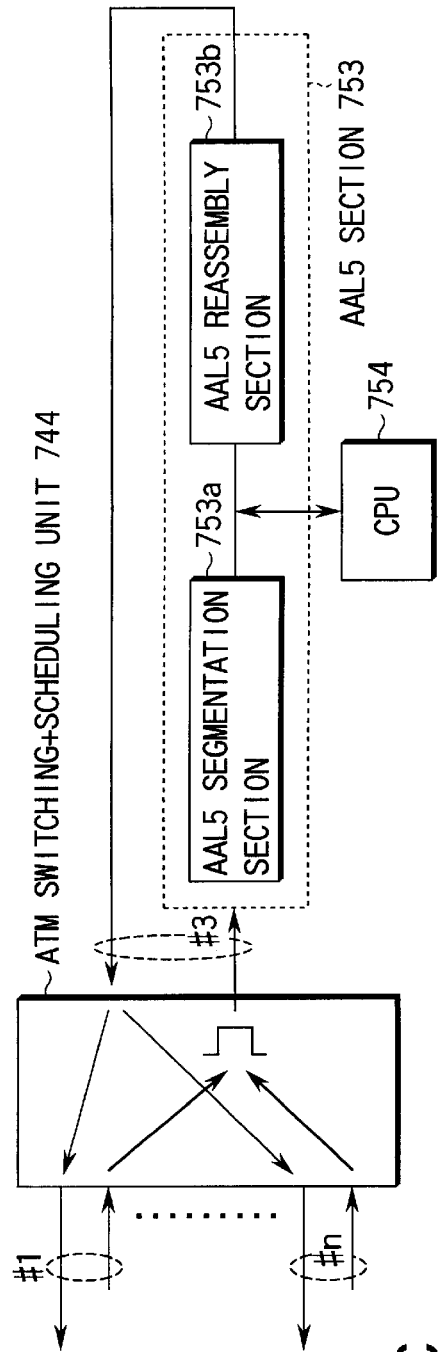

| IP ADDRESS | | PORT | PROTOCOL | SIGNAL | | | | | | | | |
|---|---|---|---|---|---|---|---|---|---|---|---|---|
| SOURCE | DESTI-NATION | | | | | | | | | | | |
| HOST A | HOST B | TCP | 23 | | 32,359 | 0 | 0 | 0 | 0 | 13,670 | 96,423 | 45,232 | 0 |
| HOST A | HOST B | TCP | 7 | | 55 | 66 | 77 | 55 | 33 | 55 | 34 | 26 | 75 |
| HOST A | HOST C | TCP | 5000 | | 0 | 0 | 0 | 0 | 0 | 11,821 | 4,343 | 0 | 0 |
| HOST A | HOST C | UDP | 300 | | 15,697 | 68,932 | 89,452 | 64,999 | 78,938 | 78,423 | 82,900 | 69,321 | 73,973 | 89,327 |
| HOST B | HOST A | TCP | 23 | | 1,243 | 0 | 0 | 0 | 0 | 0 | 765 | 2,955 | 2,102 | 0 |
| HOST B | HOST C | TCP | 21 | | 0 | 0 | 87 | 0 | 0 | 68,599 | 78,585 | 88,344 | 91,105 | 23,476 | 0 |
| HOST B | HOST A | TCP | 7 | | 65 | 66 | 65 | 75 | 66 | 46 | 25 | 76 | 56 | 66 |
| HOST C | HOST A | TCP | 5000 | | 0 | 0 | 0 | 0 | 0 | 223 | 198 | 0 | 0 |
| HOST C | HOST A | UDP | 300 | | 25,301 | 78,353 | 92,050 | 67,335 | 82,333 | 84,939 | 88,333 | 78,898 | 80,283 | 93,223 |
| HOST C | HOST B | TCP | 21 | | 0 | 0 | 109 | 65,195 | 80,191 | 91,672 | 98,100 | 40,921 | 0 |

O/X O/X O/X O/X O/X O/X O/△ O/△ O/△ O/△
0:00 3:00 6:00 9:00 12:00 15:00 18:00 21:00 0:00 3:00 6:00 9:00

DATE →

FIG. 65

| 1 | CANNOT PERMIT TIME DELAY | CANNOT PERMIT DISCARD |
| 2 | PERMIT TIME DELAY | CANNOT PERMIT DISCARD |
| 3 | CANNOT PERMIT TIME DELAY | PERMIT DISCARD |
| 4 | PERMIT TIME DELAY | PERMIT DISCARD |

DISTRIBUTING ATM CELLS TO OUTPUT PORTS BASED UPON DESTINATION INFORMATION USING ATM SWITCH CORE AND IP FORWARDING

TECHNICAL FIELD

The present invention relates to an ATM relay device which constructs an IP relay function in a packet communication scheme represented by TCP/IP or the like using destination information on the basis of ATM (Asynchronous Transfer Mode), and a network including it.

BACKGROUND ART

With growth of the Internet, the Internet infrastructure keeps on developing. An important technique in this respect is a device for connecting a plurality of logical networks. A packet relay device such as a bridge, router, or the like forwards packets by routing in units of packet destinations in the data link layer in case of communications within a given subnet (logical network) or in the network layer in case of communications between different subnets (logical networks).

Packet relay using ATM uses a packet forwarding scheme called hop-by-hop forwarding. FIG. 1 is a diagram showing the arrangement of such conventional ATM relay device, which comprises an ATM switch 160 which includes an ATM switch core 160a having a plurality of ports (#1 to #N), and an IP forwarding unit 161 which has a cell/data unit segmentation and reassembly unit (SAR: Segmentation And Reassembly) 161a, and an IP processor 161b including a CPU.

In hop-by-hop forwarding, extraction of IP header information and determination of the next destination (next HOP) of a packet depend on software processes by the CPU. Hence, the processing speed of such processes is low, and it can be a bottleneck in a network of a plurality of relay devices considering recent trend for higher-speed, heavier communication traffic, thus disturbing an increase in throughput.

In recent years, a method of processing hop-by-hop forwarding of packets by hardware has been proposed. More specifically, this method achieves high-speed search by using table lookup which makes the destination field of an IP packet correspond to output line information, and distributes packets. By executing such hardware process, a higher-speed relay process than the conventional software process can be implemented.

Furthermore, in a relay device that uses an ATM switch, a cell switch router (to be referred to as a CSR hereinafter) scheme has been proposed. In this scheme, for example, upon relaying successive IP packet data, processing of the network layer in the layer 3 level is switched to high-speed forwarding using the layer 2 level called cut-through forwarding.

That is, a conventional IP router controls routing of packet data 372 using only the network layer of a plurality of layers 371 of the communication protocol, as shown in FIG. 2. However, the CSR is a technique for forwarding packet data at high speed using the data link layer in addition to the network layer, i.e., a high-speed, high-performance router which does not require any packet forwarding by means of a CPU (software), as shown in FIG. 3.

The CSR scheme is effective for improving the throughput since it uses cut-through forwarding (forwarding in the layer 2 level (ATM layer)) in case of communications with a relatively long session time using protocols such as ftp, http, and the like, and can greatly increase the packet forwarding speed compared to conventional routers.

VPI/VCI used in an ATM relay device will be briefly explained below.

Some virtual paths (VPs) are set in an ATM network, and some virtual channels (VCs) for actually sending data are set in units of VPs. For this reason, in order to identify a VP to be used, a VPI (Virtual Path Identifier) is assigned to the header field of a cell. Furthermore, in order to identify VCs in the VP, which are to be used for sending data to the partner, a VCI (Virtual Channel Identifier) is assigned to the header field of the cell. Since the VPI/VCI are the fields for determining VPs and VCs to be selected upon communicating with the partner, they are called routing bits (bits for selecting a communication route). Note that each cell consists of 53 bytes, 5 bytes of which are used as a header, and the remaining 48 bytes of which are used as user information.

FIGS. 4A and 4B are views for explaining two cell forwarding schemes of the CSR.

Referring to FIG. 4A, upon hop-by-hop forwarding, an IP packet coming from a neighboring relay device 383 is sent to an IP processing unit 381A via an ATM switch 381B of a CSR relay device 381, undergoes a software process, and is then forwarded to the next neighboring relay device 383'. At this time, a virtual connection VC-1 is established between the neighboring relay device 383 and CSR relay device 381, and a virtual connection VC-2 is established between the CSR relay device 381 and neighboring relay device 383'. Reference numeral 382 denotes a communication protocol called an FANP normally used in the CSR, which protocol is used to establish/cancel a path for directly forwarding a packet in the data link layer (ATM-SW).

That is, when packet forwarding by the IP processing unit 381A is switched to cut-through forwarding by means of the ATM switch 381B by establishing an FTP session or the like, an ATM path is established to establish a cut-through path for switching to an ATM layer process, as shown in FIG. 4B. At this time, forwarding is done by the ATM switch 381B, and the IP processing unit 381A does not forward any packets. Reference numeral 388 denotes a virtual connection VC-3 established between the CSR relay device 381 and neighboring relay device 383' upon cut-through forwarding.

The two schemes upon cut-through forwarding in the CSR will be briefly explained below. One scheme is called topology driven, which establishes an ATM cut-through path addressed to an identical subnet, i.e., between end-to-end CSRS, and forwards a packet with a large data size at high speed for a long period of time. Otherwise, hop-by-hop forwarding is made. The other scheme is flow driven, that performs high-speed forwarding between neighboring CSRs (link-to-link CSRS). The aforementioned flow-driven scheme is used to implement cut-through processes in units of communications (flows), and has features: it can flexibly cope with changes in network configuration, and is suitable for a route that requires flexible quality control in units of flows, and a route with light packet traffic.

On the other hand, the topology-driven scheme is used to simultaneously implement cut-through processes for each partner, and has features: it is suitable for the backbone of a large-scale network, and a route which is expected to have heavy packet traffic.

The CSR scheme comprises an IP processing unit after, e.g., an ATM switch, and the IP processing unit controls cut-through forwarding by the ATM switch.

FIG. 5 shows the arrangement of an ATM relay device of the CSR scheme, which comprises an IP processing unit 290, and an ATM switch 299 which is connected to this IP processing unit 290 via a single physical path. A main control unit 291 simultaneously processes by software (or hardware) information such as IP forwarding processes (IP packets, routing information), signaling process signal, and other control signals via a data/cell segmentation and reassembly unit (SAR: Segmentation And Reassembly) 395 inserted in this physical path.

In cut-through forwarding in the CSR scheme, high-speed signaling processes such as setup of a cut-through path with respect to a default path (a communication path in normal hop-by-hop forwarding) is also required. As for this cut-through path, a method that uses a permanent communication path like PVC (Permanent Virtual Connection) is available.

The signal processes are preferably done on demand using SVC (Switched Virtual connection) in consideration of channel resources.

FIG. 6 is a diagram showing another example of the arrangement of the conventional CSR relay device, in which an IP processing unit 331 is placed after an ATM switch 332 via a link 334 with IP processing. Upon executing ATM UNI (User Network Interface) signaling processes, a signaling cell is supplied to a data/cell segmentation and reassembly unit (SAR: Segmentation And Reassembly) 333 and is reassembled to a data unit. This data unit undergoes processes for UNI signaling by a software processing unit 335 including a CPU via a signaling data unit route 339. Also, processes in the order opposite to those described above are done.

Upon executing hop-by-hop forwarding in IP forwarding, an ATM cell is supplied to the data/cell segmentation and reassembly unit (SAR: Segmentation And Reassembly) 333 via a cell route 337 other than signaling, and is reassembled to a data unit. This data unit is supplied to the software processing unit 335 via a data unit route other than signaling, and undergoes processes for packet forwarding. After such processes, the data unit is transferred to the data/cell segmentation and reassembly unit 333 again to be segmented into cells, which are returned to the ATM switch 332 to be transferred to the next destination.

Note that the cell routes 336 and 337 pass through a physically identical link, and data unit routes 338 and 339 are a physically identical socket.

The CSR scheme mentioned above will be described in more detail below.

FIGS. 7A and 7B show an example which uses an ATM I/F in CPU communications between an ATM switch 772 and IP processing unit 771. Software of the IP processing unit 771 is composed of a CSR protocol 771a, UDP (User Datagram Protocol)/IP (Internet Protocol) 771b, DSB kernel 771c, ATM driver 771d, and serial driver 771e. FIGS. 7C and 7D show an example which uses an asynchronous port such as Ethernet in CPU communications between the ATM switch 772 and IP processing unit 771.

The ATM driver 771d is used to connect the ATM switch 772. The CPU of the IP processing unit 771 issues setup and release instructions of a VPI (Virtual Path Identifier)/VCI (Virtual Channel Identifier) of the ATM switch 772 for cut-through via CPU communications with the ATM switch 772. The CSR simultaneously provides a packet forwarding mode by means of the conventional software process, i.e., a hop-by-hop forwarding mode, and a high-speed packet forwarding mode by means of hardware using the ATM switch. When the CSR with this arrangement is used, processes can be disconnected from the IP processing unit 771 during communications, and the ATM 772 can cut through to achieve high transfer speed. Cut through means taking a shortcut, i.e., an input packet is not always transferred to the IP processing unit 771 but is relayed to the output port by only the ATM switch 772. No cut through process is done in an end terminal or relay ATM switch. The end terminal need only transmit an IP packet to the neighboring CSR (IP router) as in using an existing IP router network.

The basic operation of the CSR will be described in more detail below with reference to FIG. 8. As shown in (a) of FIG. 8, the first packet is reassembled by the CSR in the hop-by-hop forwarding mode, and the packet header is interpreted. The CSR forwards that packet to a node (router or destination host) or network (router) as the next hop using the packet header information. In case of a packet flow which is expected to have a long duration of an application, e.g., ftp, telnet, WWW, or the like, as shown in (b) of FIG. 8, a cut-through forwarding route is established by informing the correspondence between the packet flow and cut-through forwarding route (ATM-VC) by a protocol (CSR protocol) between neighboring nodes. Whether or not the cut-through forwarding route is established is determined using (as a trigger) information of the TCP/UDP port number, packet length, and the like.

After the cut-through forwarding route is established, as shown in (c) of FIG. 8, the packet is switched using ATM header information VPI/VCI or the like without being reassembled by the CSR.

Upon detecting a decrease in packet flow volume of the application, the CSR releases the cut-through forwarding route using the CSR protocol, as shown in (d) of FIG. 8. After the cut-through forwarding route is released, the control transits to the hop-by-hop forwarding mode ((a) of FIG. 8). The CSR protocol is effective between only neighboring nodes and, hence, information/status exchanged by the CSR protocol is effective between only the neighboring nodes. Therefore, information/status that pertains to cut-through packet forwarding need only be synchronized between the neighboring nodes, and does not require any global synchronization among all the nodes. Information/status is refreshed periodically. Furthermore, the establishment policy of the cut-through forwarding route is local decision of each CSR.

FIG. 9 shows the operation principle of the CSR using an RSVP (Resource Reservation Protocol) as a trigger. FIG. 9 is basically the same as FIG. 8. The CSR operates as a normal IP router that processes by IP processing, as shown in (a) of FIG. 9, and uses a default virtual channel VC at that time. Upon receiving an RSVP request message from the data receiving side (CSR-3), as shown in (b) of FIG. 9, CSR-2 sets a new channel VC (VPI/VCI) with CSR-3 using this message as a trigger. Likewise, packets flow using a new channel also between CSR-1 and CSR-2. After each others VPI/VCI are exchanged in the inter-CSR protocol, data flows using a new channel. By directly ATM-connecting channels between CSR-1 and CSR-2 and between CSR-2 and CSR-3, high-speed packet forwarding, i.e., cut-through forwarding is implemented ((c) of FIG. 9). Upon detecting a decrease in packet flow volume of an application, the CSR releases the cut-through forwarding route using the CSR protocol, as shown in (d) of FIG. 9.

As described above, since audio and moving picture data forwarding on the Internet is becoming frequent recently, requirements for communication quality control and provision of a plurality of QOS classes in the future are increasing, and the flow-driven CSR scheme that provides ATM VCCs in units of packet flows can easily implement a method (control driven) of requesting and providing the QOS (Quality of Service) class by transmitting a control message from a node onto the network like the RSVP, and a method (data driven) of determining the QOS class using information of the type of application.

To realize flexible responses, the flow-driven cut-through path is preferably used in dual modes, that is, a method of setting a path generated by forwarding a control packet to the network like the RSVP, i.e., a control-driven path, and a method of setting a path generated using information of a control packet, i.e., a data-driven path.

However, when only the method of generating a cut-through path upon arrival of each application flow, i.e., only the flow-driven scheme is used, and such scheme is applied to a large-scale network, the number of VCs required for forming cut-through paths may become very large.

However, this problem can be solved when the network administrator uses a method (topology driven) of preparing cut-through paths having different QOS classes in advance. That is, in case of topology driven, packets to be forwarded to subnets having identical addresses can be shared by a single cut-through path, i.e., can be merged. In other words, since a cut-through path can be generated on the basis of information of network topology, the number of VCs required for packet cut-through forwarding can be greatly reduced by the topology driven.

However, when only the topology-driven scheme is used, if quality control, e.g., band control is to be made, the bandwidth required when the traffic (data flow) volume is relatively heavy must be prepared between neighboring nodes. That is, the network administrator must prepare for cut-through paths having different QOS classes, thus wasting the bandwidth.

Therefore, it is best to use the dual modes that exploit the features of both the flow- and topology-driven schemes, and supports them.

FIG. 10A shows the operation in the flow-driven mode, FIG. 10B shows the operation in the topology-driven mode, and FIG. 10C shows the dual modes as a combination of these two modes.

More specifically, when the flow-driven mode is used simultaneously with the topology-driven mode, the bandwidth can be assured on demand for a packet flow that requires quality control. Hence, the bandwidth used in the topology-driven mode can be reduced compared to that used by the topology-driven mode alone.

Since the network may include both a packet flow that shares communication resources, i.e., VCs by a plurality of applications, i.e., topology-driven paths, and packet flows to which communication resources, i.e., VCs, are to be assigned in units of applications or packet flows that require different communication quality classes, different communication quality classes must be provided in the topology-driven mode to satisfy such requirements using only the topology-driven mode. The dual modes that can simplify hardware functions by selectively using cut-through paths in units of required communication quality classes must be used.

A topology-driven CSR network may be implemented by either VP base or VC base. Upon implementation by VP base, the maximum number of paths that one node can set is 256 (=$2^8$), and the network has poor expandability. On the other hand, upon implementation by VC base, a node in which a plurality of flows are merged with the topology-driven network must support a VC merging function that assures the cell order in the AAL (ATM Adaptation Layer) 5 level.

The aforementioned cut-through forwarding will be described in more detail below.

Whether or not a packet input to an ATM relay device is forwarded hop by hop or by cut through is determined on the basis of a condition called a cut-through trigger, which indicates if a cut-through forwarding path is to be established. As the cut-through trigger, the TCP port number of the first packet (to be referred to as a trigger packet hereinafter) in each flow is referred to. Cut-through forwarding is deemed effective in case of an application (e.g., telnet, ftp, http) which is likely to have a long session time.

A relay device that performs cut-through forwarding in addition to hop-by-hop forwarding will be explained below.

The systems of the conventional relay device will be explained below in the order of (a) software implementation of hop-by-hop forwarding, and (b) hardware implementation of hop-by-hop forwarding.

(a) Software Implementation of Hop-by-hop Forwarding

FIG. 11 is a schematic block diagram showing the arrangement of a conventional relay device which uses an ATM switch as a switch, and implements hop-by-hop forwarding by software. Referring to FIG. 11, reference numerals 671-1 to 671-n denote input lines; 672, an ATM switch; 673, a switching table; 674-1 to 674-n, output lines; 675, an SAR; 676, a processor; and 677, a frame memory.

The first packet of a flow to be routed by the relay device is input to the ATM switch 672 via the input lines 671-1 to 671-(n-1). In practice, the input packet has been converted into ATM cells. That is, a plurality of cells are input to the ATM switch 672 in units of packets.

The ATM switch 672 refers to the switching table 673 to switch the packet (ATM cells in practice) by hardware. On the other hand, the switching table 672 is set so that packets in the flow which is not determined to be forwarded either hop by hop or by cut through are output to the output line 674-n.

The packet output onto the output line 674-n is input to the SAR 675. Since the packet is input while being segmented into ATM cells, the SAR 675 reassembles these cells into the original packet on the frame memory 677, so that the processor 676 can process that packet. More specifically, since an application in which the data are used or the data length cannot be determined by checking only one cell, cells are gathered in units of packets, so that the processor 676 can process.

Upon completion of reassembly of the packet, the SAR 675 informs the processor 676 of arrival of a packet that requests establishment of a connection together with the address and the like of the frame memory 677 where the packet is stored. Upon receiving the message, the processor 676 refers to the TCP port number of that packet, and determines if the flow in which the packet flows is to be forwarded hop by hop or by cut through.

As a result, if it is determined that the flow is forwarded by cut through, the processor 676 sets up the switching table 673 so that the packet which flows in that flow is switched by only switching in the ATM switch 672. On the other hand, if it is determined that the flow is forwarded hop by hop, the switching table 673 remains unchanged, and after that, the packet which flows in that flow is processed by software of the processor 676.

How to process a packet to be forwarded by cut through (to be referred to as a cut-through packet hereinafter), and a packet to be forwarded hop by hop (to be referred to as a hop-by-hop packet hereinafter) in the relay device will be explained below.

When a cut-through packet is input to the ATM switch 672, the output lines are determined in accordance with the switching table 673, and the cut-through packet is output onto the determined output lines 674-1 to 674-(n-1).

A hop-by-hop packet is switched to the output line 674-n according to the setup in the switching table 673. The packet output onto the output line 674-n of the ATM switch 672 is transferred to the SAR 675.

The SAR 675 reassembles ATM cells to the original packet on the frame memory 677, so that the processor 676 can process it. Upon completion of reassembly of the packet, the SAR 675 informs the processor 676 of arrival of the hop-by-hop packet together with the address and the like of the frame memory 677 that stores the packet.

Upon receiving the message, the processor 676 executes routing on the basis of the header (source address, destination address, and the like) of that packet. Upon completion of routing, the processor 676 informs the SAR 675 of the presence of a packet to be sent on the frame memory 677. The SAR 675 reads out the packet to be sent from the frame memory 677, segments it into ATM cells, and inputs these cells onto the input line 671-n of the ATM switch 672. The packet input form the input line 671-n is output onto the output lines 674-1 to 674-(n-1) which are determined according to the switching table 673.

In the conventional relay device, the processor 676 processes packets in the order that packet arrival messages are received from the SAR 675 irrespective of the types of packets, i.e., a hop-by-hop packet, a trigger packet, a packet containing routing protocol information, signaling cells used to establish an ATM connection, and the like.

(b) Hardware Implementation of Hop-by-hop Forwarding

FIG. 12 is a schematic block diagram showing the arrangement of a conventional relay device when an ATM is used as a switch, and hop-by-hop forwarding is implemented by hardware. Referring to FIG. 12, reference numerals 681-1 to 681-n denote input lines; 682, an ATM switch; 683, a switching table; 684-1 to 684-n, output lines; 685, an SAR; 686, a processor; 687, a frame memory; and 688, a routing processing unit.

In FIG. 12, the difference from FIG. 11 lies in that routing of a hop-by-hop packet, which is forwarded from the output line 684-n to SAR 685 and is reassembled on the frame memory 687 is implemented by hardware in the routing processing unit 688.

When the SAR 685 informs the routing processing unit 688 that reassembly of the packet on the frame memory 687 is complete, the routing processing unit 688 executes routing on the basis of header information (source address, destination address, and the like) of that packet. Upon completion of routing, the routing processing unit 688 informs the SAR 685 of the presence of a packet to be sent on the frame memory 687. The SAR 685 segments that packet into ATM cells, and inputs them to the ATM switch 682 via the input line 681-n.

In this manner, by implementing the routing processing unit 688 by hardware, high-speed routing can be realized. In this case, in the arrangement shown in FIG. 12, packets to be processed by the processor 686 are only those addressed to the relay device, i.e., a trigger packet used to determine if cut-through forwarding is to be done, a packet containing routing protocol information, signaling cells used to establish an ATM connection, and the like.

In the conventional relay device, the processor 686 and routing processing unit 688 in FIG. 12 process packets in the order that packet arrival messages are received from the SAR 685 independently of the types of packets as in the processor 676 in FIG. 11.

An ATM switch used in connection-oriented communications (CO: a scheme for making communications after a connection to the partner has been confirmed like normal telephones) can serve a connection of connection-less communications (CL: a scheme of suddenly making communications without confirming any connection with the partner like telegraphs).

When the connection of the connection-less communications (CL) is to be released, a method using a counter for counting the number of cells that have passed through the connection is normally used.

FIGS. 13 and 14 show the conventional method. FIG. 13 is a schematic block diagram showing the arrangement of an n×n ATM switch, and FIG. 14 is a schematic block diagram showing the arrangement of an input-port ATM layer processing unit in the ATM switch. Note that n×n means that there are n inputs and n outputs.

As shown in FIG. 13, in the ATM switch used in an ATM network, n ports 540-1 to 540-n are connected in units of lines. Cells input from the respective lines are input to input-port ATM layer processing units 542-1 to 542-n in the ports 540-1 to 540-n.

The input-port ATM layer processing units 542-1 to 542-n obtain information such as the output destinations, connection identifiers, and the like of the cells by searching input-port conversion tables 543-1 to 543-n on the basis of VPI/VCI values and the like in the cells input from the corresponding lines.

The input-port ATM layer processing units 542-1 to 542-n count the numbers of passage cells in units of connections, and store these count values in input-port passage cell counter tables 544-1 to 544-n. The input-port conversion tables 543-1 to 543-n, and input-port passage cell counter tables 544-1 to 544-n need not be physically separated, but may be physically constructed as a single table.

The cells are transferred to an ATM switch core 545 together with the information obtained by the input-port conversion tables 543-1 to 543-n. The output destinations obtained from the input-port conversion tables 543-1 to 543-n indicate those with respect to the ATM switch core 545. The ATM switch core 545 transfers the cells to desired output-port ATM layer processing units 546-1 to 546-n in accordance with the output destinations obtained by the input-port ATM layer processing units 542-1 to 542-n.

The output-port ATM layer processing units 546-1 to 546-n obtain new VPI/VCI values by searching output-port conversion tables 547-1 to 547-n on the basis of the connection identifiers forwarded together with the cells. Furthermore, the output-port ATM layer processing units 546-1 to 546-n append the new VPI/VCI values to headers in place of the old ones, and output the cells onto the lines.

As in the input-port ATM layer processing units 542-1 to 542-n, the output-port ATM layer processing units 546-1 to 546-n count the numbers of passage cells in units of connections, and store these count values in output-port passage cell counter tables 548-1 to 548-n. The output-port conversion tables 547-1 to 547-n, and output-port passage cell counter tables 548-1 to 548-n need not be physically separated, but may be physically constructed as a single table.

Each of the input-port ATM layer processing units 542-1 to 542-n has the arrangement shown in FIG. 14. For example, taking the input-port ATM layer processing unit 421 as an example, a cell input from line 1 is input to an input processor 551. The input processor 551 extracts a VPI/VCI value and the like that can be used as keys upon searching the input-port conversion table 543-1 and input-port passage cell counter table 544-1 from the cell, transfers the VPI/VCI value to a conversion table controller 553 and passage cell counter table controller 554, and stores the cell in a cell buffer 552.

The conversion table controller 553 obtains the output destination, connection identifier, and the like of that cell by searching the input-port conversion table 543-1 on the basis of the VPI/VCI value and the like extracted from the cell. On the other hand, the passage cell counter table controller 554 refers to the input-port passage cell counter table 544-1 on the basis of the extracted VPI/VCI value. If the input cell has normally been received, the controller 554 writes back a value obtained by adding 1 to the referred counter value to the input-port passage cell counter table 544-1.

An output processor 555 outputs to the ATM switch core 545 the cell transferred from the cell buffer 552, and the information such as the output destination, connection identifier, and the like of that cell transferred from the connection table controller 553 together.

A processor I/F 556 controls access from a processor 541. The processor 541 accesses the input-port conversion table 543-1 or input-port passage cell counter table 544-1 via the processor I/F 556 and the conversion table controller 553 or passage cell counter table controller 554. Upon implementing a counter read clear function (to be described later), such function is provided to the passage cell counter table controller 554.

The output-port ATM layer processing units 546-1 to 546-n have a similar arrangement.

In such arrangement, in the conventional scheme, the processor 541 that controls the overall ATM switch periodically polls the input-port passage cell counter tables 544-1 to 544-n of all the connections to be managed, and releases connections on the basis of the count values.

More specifically, if a given count value is equal to the previously polled passage cell counter value, it is determined that no cell has passed through that connection since the previous polling. In such case, the processor 541 determines that the connection is not used, and releases the connection.

When the input-port ATM layer processing units 542-1 to 542-n have a function (counter read clear function) of zero clearing the passage cell counter tables 544-1 to 544-n upon reading from the processor 541, the processor 541 releases the connection when the corresponding counter value is zero.

Note that the method of polling the input-port passage cell counter tables 544-1 to 544-n has been explained, but the output-port passage cell counter tables 548-1 to 548-n may be polled.

In the following description, assume that the input-port ATM layer processing units 542-1 to 542-n have the counter read clear function (the method of zero clearing a given count value when the count value remains the same as the previous one upon being read by the processor 541), and the input-port passage cell counter tables 544-1 to 544-n are polled.

A case will be explained below wherein ATM communications are made using the aforementioned ATM relay device. In ATM communications, data are exchanged using a 53-byte fixed length packet, i.e., cells. In a 5-byte header of the packet, an 8-bit VPI field for UNI (User-Network Interface) and 12-bit VPI field for NNI (Network Node Interface) are assured, and 16-bit VPI fields are assured.

Such VCI/VPI identifiers are assigned in units of physical lines at the beginning of End-End communications (between terminals), and upon completion of assignment, cells are sent from the start point of the communications by following the assigned identifiers while their contents are rewritten in turn to the header value of the next physical link.

On the other hand, in an IP network used in, e.g., the Internet, End-End communications are made using numbers called IP addresses that identify the locations of the respective end terminals. As a method of assigning the IP address, identical network addresses are respectively assigned to large networks to some extent, one network is grouped into subnets having a given size, and the respective terminals are located in the subnets. In this manner, the entire network can be easily managed, and End-End network exchange can be efficiently done.

The IP networks and subnets are grouped by dividing IP addresses by given numbers of bits from the most significant bit, and especially, each subnet is identified by assigning bits called a subnet mask that filters the address to the subnet.

For example, a router, host, or the like is placed at the boundary between a network using a label switch technique and a network using another device, and a designated path is set based on the destination address in the header of the received packet to forward that packet to the next destination.

Furthermore, as one of protocols for setting connections between ATM switches, pNNI (private network interface) is known. In this PNNI, a plurality of nodes are gathered to build a hierarchical peer group, thus attaining hierarchical source routing. On the other hand, routing and connection setups are independently done, and an end-end connection is set according to a host request. In addition, Classical IP over ATM, NHRP (Next Hop Resolution Protocol), and the like are available. In the Classical IP over ATM, ARP (Address Resolution Protocol) servers are set in units of LISs (Logical IP Subnets), and a connection is set by acquiring address information by accessing the server. On the other hand, in the NHRP, NHRP servers are similarly set in units of LISs, but these NHRP servers exchange information between the servers.

The ATM relay device and the network including it have been explained. The aforementioned conventional ATM relay device suffers various problems to be described below.

The first problem will be explained. Even when the CSR scheme is adopted, if hop-by-hop forwarding is concentratedly done by a single processor or a single (signal processing) hardware device, when the data volume from each ATM switch becomes larger in a future high-speed, large-capacity network, hop-by-hop forwarding traffic increases due to an increase in packet traffic, thus bottlenecking communications. Also, since high operation speed and large-capacity processing performance (e.g., address search processes and the like) are required accordingly, cost may increase.

It is, therefore, the first object of the present invention to provide an ATM relay device which can relay large-size packets at high speed by distributing the load on an IP forwarding unit without increasing the operation speed, processing performance, and the like of the IP forwarding function.

The second problem will be explained below. When the aforementioned SVC scheme is used, the signaling load on an IP processing unit that sets up signaling of an ATM switch becomes heavier. If ATM cells for signaling frequently occupy a communication path between the IP processing unit and ATM switch, the bandwidth for forwarding IP packets hop by hop is narrowed down.

Also, a protocol, for example, SNMP (Simple Network Management Protocol) that manages and controls status of the ATM relay device, is mandatory in a communication apparatus. Hence, the processing load upon managing and controlling the ATM switch and IP processing unit becomes also heavy. More specifically, management and control data are also mapped in the ATM switch, and are exchanged between the ATM switch and IP processing unit, thus further narrowing down the forwarding bandwidth of IP packets.

In this manner, the conventional ATM relay device concentratedly makes IP packet, signaling, and management and control communications using a single physical path between the ATM switch and IP processing unit, the software processing load concentrates on an IP relay device, and the forwarding bandwidth itself of IP packets is narrowed down, resulting in poor efficiency of an IP packet relay process. Furthermore, in a future high-speed, large-capacity network, hop-by-hop forwarding traffic is projected to increase due to an increase in packet traffic, thus bottlenecking communications.

It is, therefore, the second object of the present invention to provide an ATM relay device, which can relay large-size data at high speed without increasing the operation speed and processing speed (CPU performance), since it reduces software processes of the IP forwarding process, signaling process, and management and control functions, and can improve efficiency of the IP packet forwarding process, signaling process, and management and control processes.

The third problem will be explained below. The aforementioned CSR scheme supports the ATM UNI signaling process in both the types of connections, i.e., the PVC (Permanent Virtual Connection) and SVC (Switched Virtual Connection), and can be connected to an existing ATM network. Especially, when the CSR scheme supports the SVC, it is required to avoid an increase in signaling traffic volume and to achieve high-speed signaling performance for SVC control. The processes of these two types of traffic and forwarding must be done by a single physical link.

However, the conventional ATM relay device cannot meet such requirements. The conventional ATM relay device processes by software (CPU processes) traffic which is not cut-through forwarded in the CSR scheme, i.e., packets forwarded hop by hop, resulting in considerably low processing performance.

It is, therefore, the third object of the present invention to provide an ATM relay device and router device which can obtain high-speed signaling performance for SVC control while avoiding an increase in signaling traffic volume in case of supporting the SVC, and can improve forwarding performance of packets upon hop-by-hop forwarding. Also, in a network packet relay device based on the CSR scheme, and especially upon processing packets addressed to the self terminal and non-IP packets, forwarding performance of packets hop-by-hop forwarding is greatly improved. Furthermore, upon processing packets addressed to the self terminal and unknown-destination packets, the packets addressed to the self terminal can be reliably received without executing TTL subtractions more than necessary, and the packet forwarding distances upon replacing by a network node can be improved.

The fourth problem will be explained below. In a data system network using, e.g., an IP protocol that uses an ATM as a bearer, a plurality of VPI/VCI values between End-End are acquired by some means upon starting data exchange, and data communications are made using these VPI/VCI values.

In this case, since an IP communication does not indicate the termination time of a communication, a procedure that holds these VPI/VCI values for a while, and releases them when no communication is made for a predetermined period of time, or the like is adopted. For this reason, the VPI/VCI resources are wasted.

This problem will be explained below using a network arrangement example shown in FIG. 15.

Referring to FIG. 15, reference numeral 421 denotes a public line, which is, e.g., a public line such as an NTT network or the like. Reference numerals 422 and 423 denote GWs (gateways), which interconnect systems/networks using different protocols. In the example shown in FIG. 15, the two GWs 422 and 423 are set, and Backbone nets (backbone networks) 424 and 425, and IP-Subnets (subnetworks) 426 to 429 connected thereto build a single network. In this case, the GWs 422 and 423 correspond to gates of this network, and different networks are connected by a carrier dedicated line service or the like.

When such network is built using an ATM, the arrangement shown in FIG. 16 is conventionally adopted. Each VCC (Virtual Channel Connection) in FIG. 16 is a communication route formed by the VCI conversion rule, and many VCC are formed in units of terminals that use the network.

Note that only one example of logical paths (VCCs) characterized by VPI/VCI values is illustrated for the sake of simplicity. In practice, one VPI/VCI in the logical path is normally assigned between physical links, but is simply illustrated in FIG. 16 since it is not essential in the present invention.

Normally, since the dedicated line service is provided by VP switching, one VP (virtual path) is assigned between the GWs 422 and 423. In the network, assignment is done using VCCs. This is to assign VPI/VCI values every time an event, i.e., data exchange, takes place.

However, in this case, as shown in FIG. 16, VCCs used by the IP-Subnets 426 to 429 are simultaneously assigned in the Backbone nets 424 and 425. In practice, since VCCs are assigned in correspondence with the number of terminals in the IP-Subnets 426 to 429, a very large number of VCCs concentrate on the Backbone nets 424 and 425 and GWs 422 and 423.

This problem becomes more serious as the network scale increases and the number of terminals increase. In such case, the number of VCCs exceeds that the GWs 422 and 423 can handle, and a communication is disabled even when line resources remain. That is, VPI/VCI resources are wasted.

In order to solve such problem, conventionally, a method of merging a plurality of VCCs to one VCC or the like has been proposed. However, in order to avoid flows of different data packets from being mixed into a single flow at the level of ATM cells, for example, when two flows are to be merged, control for passing the first packet first and then the next packet is required. When data of one packet is long or when cells that form the packet have a large interval, a long time is required for passing the first packet, and the second packet cannot be readily forwarded.

It is, therefore, the fourth object of the present invention to provide an ATM switch for implementing a VCC merging scheme which combines a plurality of VCCs into a single VCC, reduces the VPI/VCI resource volume especially in a backbone network, and never disturbs packet forwarding.

The fifth problem will be described below. As described above, in the conventional scheme, the processor polls all the connections using passage cell counters in units of connections to release connections.

However, when a connection is released by such method, the time elapsed from when the current counter value has been reached until the processor polls cannot be detected.

Hence, the connection release timing may delay due to the difference between the cell passage timing and polling timing.

More specifically, for example, assume that cells have passed through a connection immediately before polling, and after that, no cells pass at all. In such case, upon polling the next passage cell counter, since the counter value is not zero, the processor determines that the connection is in use, and does not release the connection. More specifically, the connection is released upon polling after the next polling.

Since the processor performs not only polling of the passage cell counters and connection release processes, but also control of the entire ATM switch, when the number of connections to be managed is large, the polling period with respect to a passage cell counter of a specific connection is prolonged (the time interval for checking the count value of that passage cell counter is prolonged). For this reason, although the connection is not used in practice, it cannot be corrected for a long period of time in proportion to the polling period of the passage cell counter for the specific connection. That is, connection resources cannot be effectively used.

Such problem arises from a long polling period of the passage cell counter for a specific connection when the number of connections to be managed is large, since the processor controls the entire ATM switch.

Note that another processor dedicated to polling of the passage cell counters may be prepared. However, in such method, control among processors is complicated very much.

It is, therefore, the fifth object of the present invention to provide an ATM switch which can release a connection, which has become unnecessary, early without requiring any complicated control, and can effectively use connection resources.

The sixth problem will be described below.

In the conventional relay device with the arrangement shown in FIG. 11, the ATM switch 672 and SAR 675 are connected via a pair of input and output lines of the ATM switch 672, and packets to be processed by the processor 676 such as a data packet to be forwarded in the hop-by-hop mode, a trigger packet, a packet containing routing protocol information, signaling cells used in establishment of an ATM connection, and the like are forwarded as ATM cells on these two lines.

The ATM switch 672 outputs cells to the SAR 675 in nearly the same order as the input order of those cells to the ATM switch 672. When a state (congestion) wherein cells addressed to the SAR 675 are input to the ATM switch 672 beyond the bandwidth of the line that connects the ATM switch 672 and SAR 675 continues, cell discard may take place in the ATM switch 672.

In the conventional relay device, since there is no function of controlling the output order of cells addressed to the SAR 675 on the input side of the ATM switch 672, the cell discard takes place independently of cell types. In such case, control/management information between relay devices such as a trigger packet, a packet containing routing protocol information, signaling cells, and the like are discarded as well as data packets forwarded hop by hop. For this reason, discarded packets may adversely influence control between the relay devices, and sharing of management information between the relay devices.

To solve such problem, even when the arrangement in which the SAR 675 has buffer queues in units of cell or packet types in the frame memory 677, higher priority is given to a trigger packet than other packets, and the processor 676 preferentially processes the trigger packet is adopted, since cell discard occurs in the ATM switch 672 independently of cell types, the trigger packet is not always preferentially processed in the entire device.

In the arrangement shown in FIG. 12 as well, packets with high importance such as a trigger packet, a packet including routing protocol information, signaling cells, and the like may be discarded depending on the cell input state.

It is, therefore, the sixth object of the present invention to provide a relay device which can implement priority control according to packet types, and can realize efficient data communications by preferentially outputting packets with high priority.

The seventh problem will be explained below.

The aforementioned VC merging method suffers the following problem. That is, in a VC merging function shown in FIG. 17, when cells (A1 to A4) and (B1 to B4) along two flows are simply merged, they form a mixed flow, as shown in FIG. 17, after switching by an ATM switching function 783. On the AAL 5 level, a cell BOC (Begin of Cell), which should come at the head of a packet, arrives twice, and consequently, a PDU (Protocol Data Unit) cannot be normally reassembled.

It is, therefore, the seventh object of the present invention to provide an ATM relay device which has dual modes that can selectively use cut-through paths in units of communication quality classes by merging cells in units of PDUs in accordance with the required communication quality.

The eighth problem will be described below.

As described above, cut-through trigger information is used as a reference upon determining whether or not cut-through forwarding is done. In the current specifications, the cut-through trigger information must be set in advance by the administrator. However, when the administrator sets cut-through trigger information in accordance with a request from the user, it is difficult for him or her to determine if that request actually reduces the load on the router and is effective for the network.

Confirming whether or not cut-through forwarding is effectively working after the cut-through trigger information is set can become a heavy load on the administrator. For example, if it is set to enable cut-through even upon forwarding a few packets, the delay produced by the process for shifting the control to the cut-through mode may exceed the time saved by the cut-through mode.

In order to design effective cut-through trigger information, the actual IP packet forwarding state must be sufficiently taken into consideration, but it is very hard to do so. This poses a problem in a router that uses the label switching technique including CSR.

It is, therefore, the eighth object of the present invention to provide a packet forwarding state monitoring device which allows efficient use of the network by monitoring the packet forwarding state in the router to set effective cut-through paths.

The ninth problem will be explained below.

In a router or host using the conventional label switch technique, since designated paths are determined to be set or unset irrespective of QOS (Quality of Service) information of packets, even a packet having a QOS request, whose forwarding time cannot be delayed or a packet which cannot be discarded may not reach within a predetermined time or may be discarded.

It is, therefore, the ninth object of the present invention to provide a designated path setup method which can implement packet forwarding in consideration of different service quality classes by assuring the QOS information of a packet.

The 10th problem will be explained below.

When a connection that requires topology information of the network is set in the ATM switch, in case of a pure ATM network, inter-switch connection information must be exchanged using the pNNI and resource management must be simultaneously performed by giving information such as the link capacity, transmission delay, useable bandwidth, assured cell discard ratio, number of passage connections, use link cost, and the like. However, in an ATM-LAN that needs only QOS (Quality of Service) assurance and resource management levels as low as a conventional LAN, and requires large-capacity lines of ATM and high switching speed, a large number of pieces of unwanted information must be saved in the routing table. Also, upon routing, since the pNNI performs source routing using a link state algorithm in each peer group or between peer groups, the switch must generate DTLs (route designation lists) with a large data size in units of topology data.

In the aforementioned Classical IP over ATM, ATM-LANs must be connected via a router, and even in the NHRP, an ARP server is mandatory.

Furthermore, in the above-mentioned protocol, all End-End connections are set in an End-End communication according to a host request although the network topology is known. In order to set all connections in an End-End communication, the number of VCs (Virtual Connections) becomes very large in a large-scale network. If such problem is solved by VC merging, each switch must execute VC merging upon setting connections.

It is, therefore, the 10th object of the present invention to provide a connection setup method in an ATM network, which can achieve high-speed connection setups and a reduction of the number of connections at the same time.

DISCLOSURE OF INVENTION

In order to achieve the first object, according to the present invention, an ATM relay device comprises an ATM switch core for distributing an input ATM cell to a corresponding one of a plurality of output ports on the basis of destination information thereof, a plurality of forwarding means, provided in correspondence with the respective output ports of the ATM switch core and each having a unique forwarding processing function, for executing a predetermined forwarding process for a packet obtained by reassembling ATM cells input via the respective output ports, destination information assignment means for assigning destination information which assumes different values in units of packets to ATM cells that form each of packets having an identical address of packets processed by the plurality of forwarding means, and output means for storing ATM cells of packets assigned identical destination information by the destination information assignment means by a predetermined volume and outputting the ATM cells in a format that stores the ATM cells by the predetermined volume.

In order to achieve the second object, according to the present invention, an ATM relay device comprises an ATM switch for distributing an input ATM cell to at least one of first, second, and third different ports on the basis of destination information thereof, IP forwarding means for executing a forwarding process of an IP packet by receiving an ATM cell indicating that the destination information of the ATM cell is for forwarding via a first path connected to the first port of the ATM switch, signaling means for executing a signal process of an IP packet by receiving an ATM cell indicating that the destination information of the ATM cell is for the signaling process, via a second path which is connected to the second port of the ATM switch and is physically different from the first path, and management/control means for making management/control by receiving an ATM cell indicating that the destination information of the ATM cell is for management/control, via a third path which is connected to the third port of the ATM switch and is physically different from the first and second paths.

In order to achieve the third object, according to the present invention, an ATM relay device comprises a packet forwarding function in a network layer using an ATM switch, comprises signaling processing means, provided in association with an ATM switch, for executing a signaling process by receiving a signaling packet from the ATM switch via a first link, and forwarding processing means, provided independently of the signaling processing means, for executing an IP packet forwarding process by hardware using a predetermined memory by receiving an IP packet via a second link which is physically different from the first link.

According to the present invention, a router device which is provided in association with an ATM switch and comprises an IP packet forwarding function in a network layer, comprises signaling processing means for executing a signaling process by receiving a signaling packet from the ATM switch via a first link, and forwarding processing means, provided independently of the signaling processing means, for executing an IP packet forwarding process by hardware using a predetermined memory by receiving an IP packet via a second link which is physically different from the first link.

In order to achieve the fourth object, according to the present invention, an ATM switch which searches a routing table on the basis of header information of a cell input from an input-port line, rewrites the header information of the input cell to output-port information, and exchanges the cell to a predetermined output line, comprises mask means for masking some bits of the header information of the input cell, table search means for searching the routing table on the basis of the header information masked by the mask means, and information rewrite means for rewriting the header information of the input cell to predetermined output-port information in the routing table on the basis of a search result of the table search means.

According to the present invention, an ATM switch which searches a routing table on the basis of a VPI/VCI value described in header information of a cell input from an input-port line, rewrites the header information of the input cell to output-port information, and exchanges the cell to a predetermined output line, comprises mask pattern storage means for storing a mask bit pattern, mask means for masking some bits of a bit example of the VPI/VCI value described in the header information of the input cell using the mask bit pattern stored in the mask pattern storage means, table search means for searching the routing table on the basis of the VPI/VCI value masked by the mask means, and information rewrite means for rewriting the header information of the input cell to predetermined output-port information in the routing table on the basis of a search result of the table search means.

In order to achieve the fifth object, according to the present invention, an ATM switch comprises cell non-travel time detection means for periodically detecting a time for which no cell travels, in units of connections, storage means for storing cell non-travel times detected by the cell non-travel time detection means, polling means for polling the cell non-travel times stored in the storage means at a predetermined polling cycle, and connection release means for executing a connection release process on the basis of the cell non-travel times polled by the polling means.

In order to achieve the sixth object, according to the present invention, a relay device which executes a routing process in a network layer and a switching process in a data link layer using an ATM switch, comprises priority control means for handling input data in units of packets to determine a packet type prior to the routing and switching processes, and sending a packet to the ATM switch in accordance with priority corresponding to the packet type.

In order to achieve the seventh object, according to the present invention, an ATM relay device, which comprises a high-speed packet forwarding mode by hardware using an ATM switch, and forwards packets having an identical forwarding destination address by sharing a single path, comprises storage means for storing packets having an identical forwarding destination address in different queues in correspondence with communication quality levels of the packets in units of PDUS, and forwarding means for aligning the packets in units of PDUs, which are stored in different queues, in an order of communication quality levels, and forwarding the packets using a single path.

According to the present invention, an ATM relay device, which comprises a high-speed packet forwarding mode by hardware using an ATM switch, and forwards packets having an identical forwarding destination address by sharing a single path, comprises segmentation means for segmenting each of packets having an identical forwarding destination address in units of cells, reassembly means for reassembling the segmented cells into packets in units of PDUs in correspondence with communication quality levels, and forwarding means for aligning the reassembled packets in units of PDUs in an order of communication quality levels, and forwarding the packets using a single path.

In order to achieve the eighth object, according to the present invention, a packet forwarding state monitoring device comprises monitoring means for monitoring a forwarding state of packet to be forwarded to a destination by a routing process in a network layer, prediction means for predicting a forwarding tendency of the packets on the basis of a monitoring result of the monitoring means, and determination means for determining a condition for shifting the forwarding process to a hardware process below a data link layer on the basis of a result predicted by the prediction means.

According to the present invention, a packet forwarding state monitoring device comprises monitoring means for monitoring a forwarding state of packets to be forwarded by a hardware process below a data link layer, determination means for determining based on a monitoring result of the monitoring means whether or not the hardware process is effectively done, and canceling/re-setting means for canceling or re-setting trigger information that instructs the hardware process in accordance with a determination result of the determination means.

In order to achieve the ninth object, according to the present invention, a designated path setting method for a router which is located at a boundary between a network constructed by a label switch and a network constructed by another device, or a router which is located at a boundary between an identical label switch network and another label switch network even in a network constructed by a label switch, comprises the step of referring to QOS information or equivalent information in a header of packet data to be forwarded, and the step of determining based on the referred QOS information or equivalent information whether or not a designated path for the packet data is set.

According to the present invention, a designated path setting method for a router or a label switch host which is located at a boundary between a network constructed by a label switch and a network constructed by another device, or a router which is located at a boundary between an identical label switch network and another label switch network even in a network constructed by a label switch, comprises the step of referring to QOS information or equivalent information in a header of packet data to be forwarded when a designated path has already been set for a specific route, and the step of determining based on the referred QOS information or equivalent information whether a new designated path is set or the already set designated path is used.

In order to achieve the 10th object, according to the present invention, a connection setting method in an ATM network, comprises, upon setting a connection using an ATM switch, which is located in each node of an ATM network and has an IP over ATM function, the step of setting connections for routing information between neighboring ATM switches and ATM terminals by the IP over ATM, and the step of executing routing by a predetermined routing protocol on an IP of the IP over ATM after the connections are set.

According to the present invention, a connection setting method in an ATM network further comprises the step of generating a routing table entry using the routing protocol which runs on the IP of the IP over ATM, and the step of setting a connection on the basis of the routing table entry.

BRIEF DESCRIPTION OF DRAWINGS

FIG. 40A is a view showing the arrangement of a routing table in the table arrangement according to a modification of the fourth embodiment of the present invention, and FIG. 40B is a view showing the arrangement of a mask pattern table in the table arrangement according to a modification of the fourth embodiment of the present invention;

FIGS. 45A and 45B are views for explaining errors in time elapsed from the cell upon applying the method of the present invention;

FIGS. 54A to 54E are views for explaining the operation of the seventh embodiment;

FIGS. 55A to 55E are views for explaining the operation of a modification of the seventh embodiment;

FIGS. 57A to 57C are views for explaining the operation of this modification;

FIGS. 58A to 58C are views for explaining the operation of another modification of the seventh embodiment;

FIG. 65 is a table showing an example of the monitoring results of the forwarding state of IP packets in the CSR;

BEST MODE OF CARRYING OUT THE INVENTION

The present invention will be described in more detail hereinafter with reference to the accompanying drawings.

First Embodiment

The first embodiment of the present invention will be described in detail below with reference to the drawings.

Figure 1:
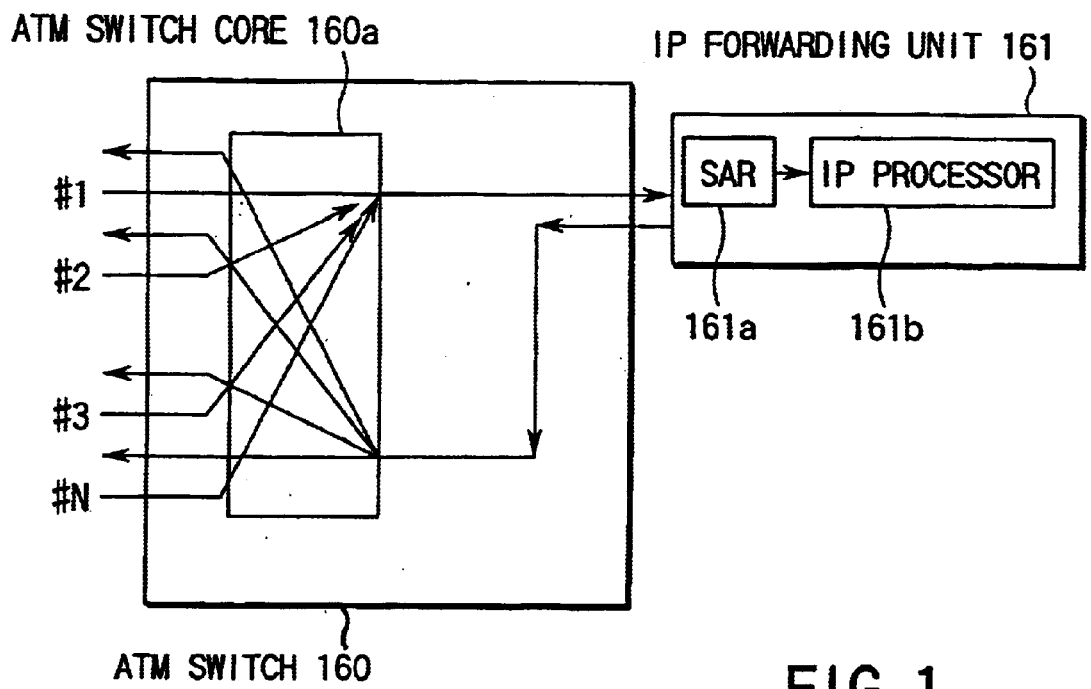
FIG. 1 is a diagram showing the arrangement of a conventional ATM relay device.
Figure 2:
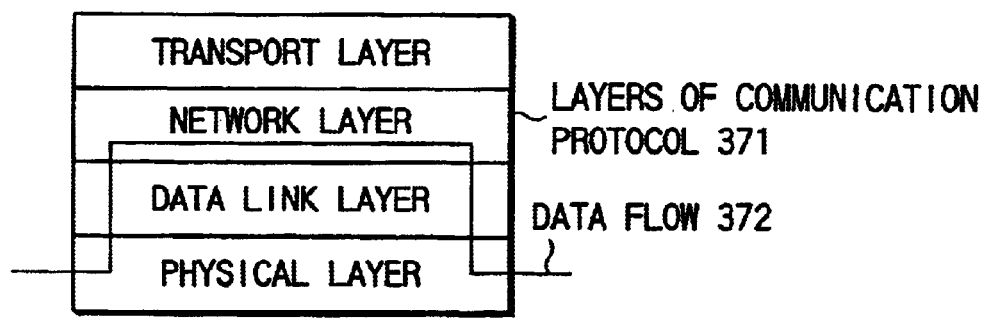
FIG. 2 is a view for explaining route control of packet data using the network layer.
Figure 3:
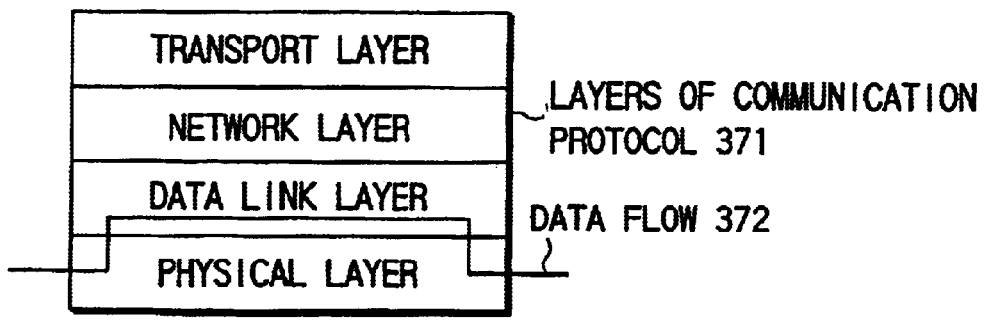
FIG. 3 is a view for explaining high-speed forwarding of packet data using the data link layer.
Figure 4A:
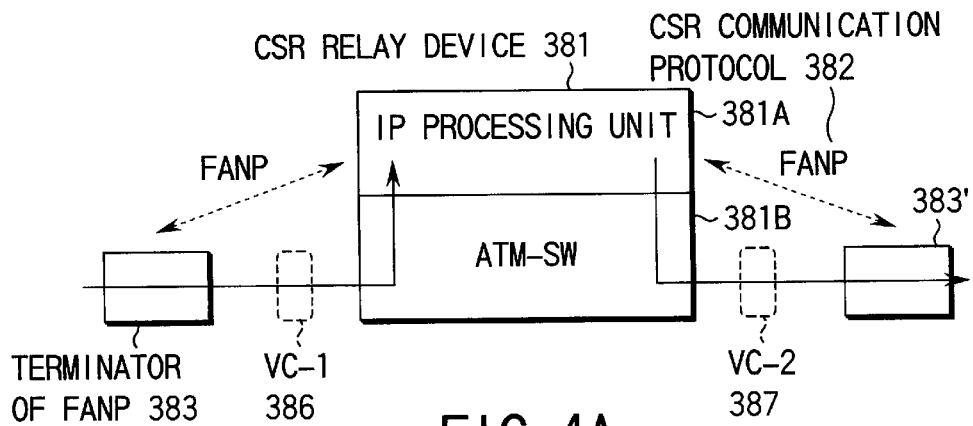
FIGS. 4A and 4B are views for explaining the cell forwarding scheme of a CSR.
Figure 4B:
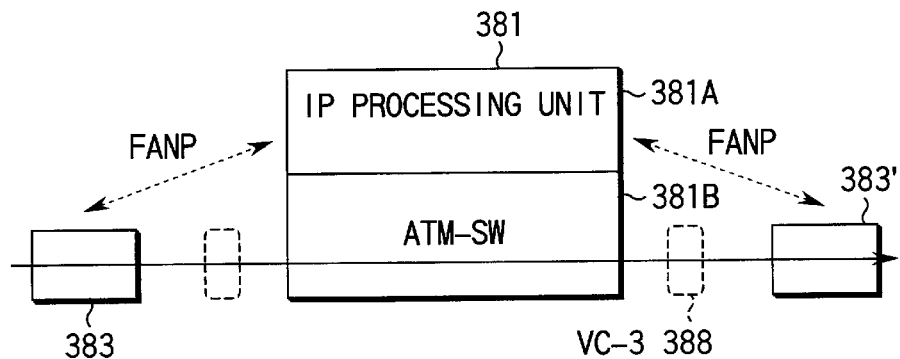
Figure 5:
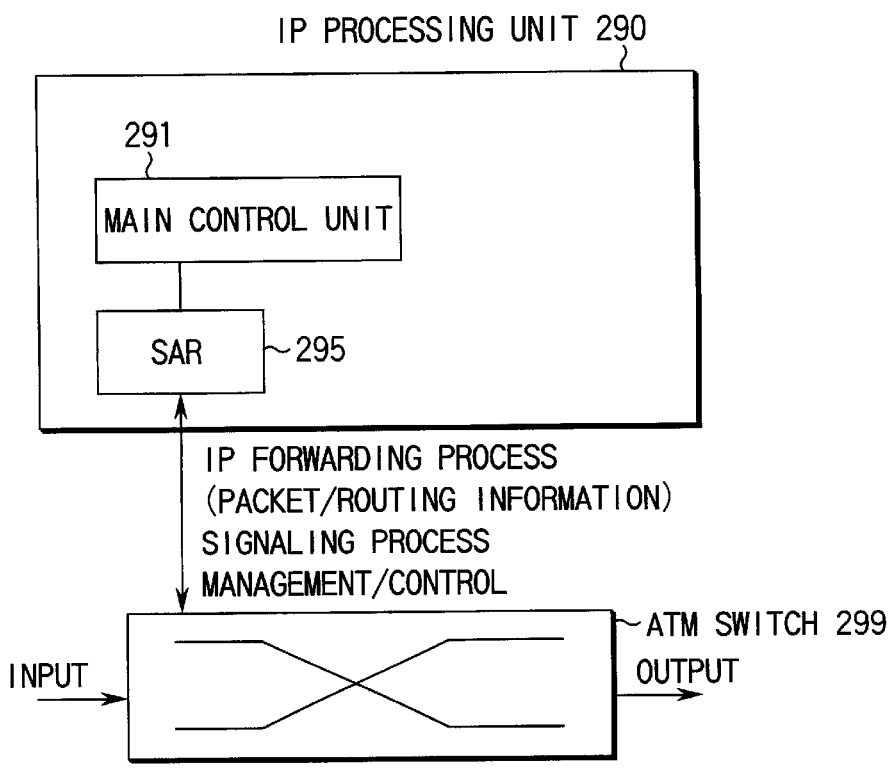
FIG. 5 is a diagram showing the arrangement of a conventional ATM relay device.
Figure 6:
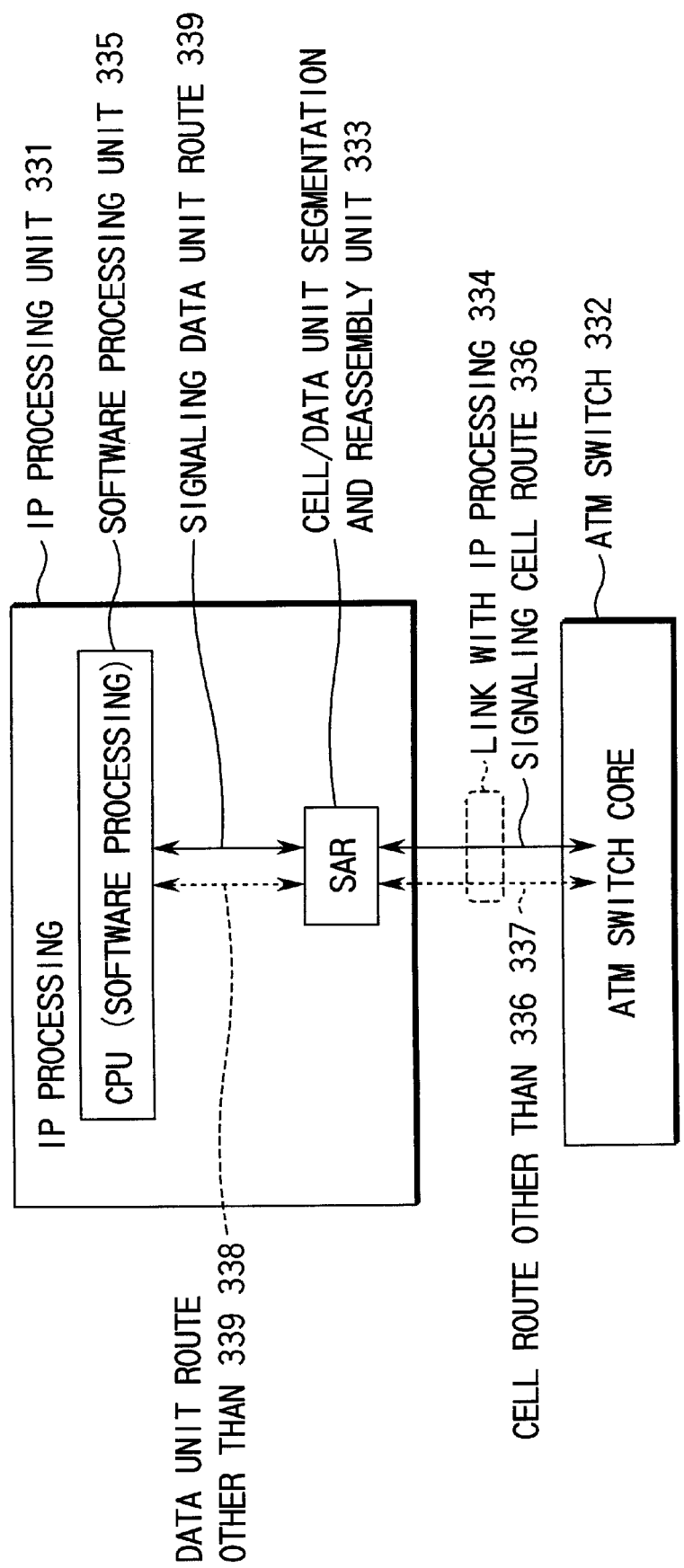
FIG. 6 is a diagram showing another arrangement of a conventional CSR relay device.
Figure 7B:
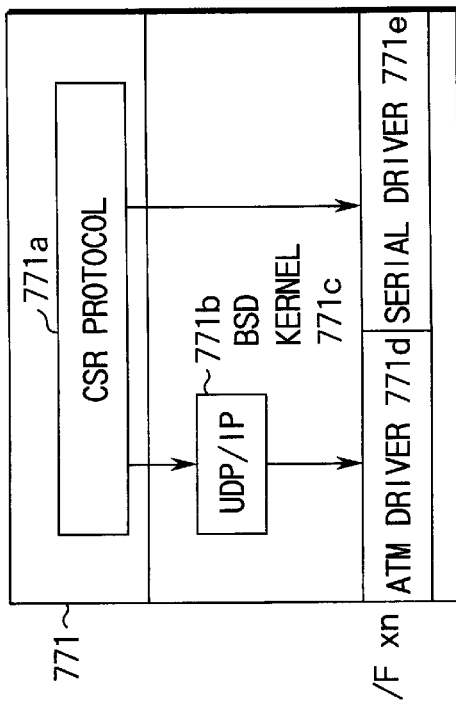
FIGS. 7A to 7D are diagrams showing examples of the arrangement of the CSR.
Figure 7D:
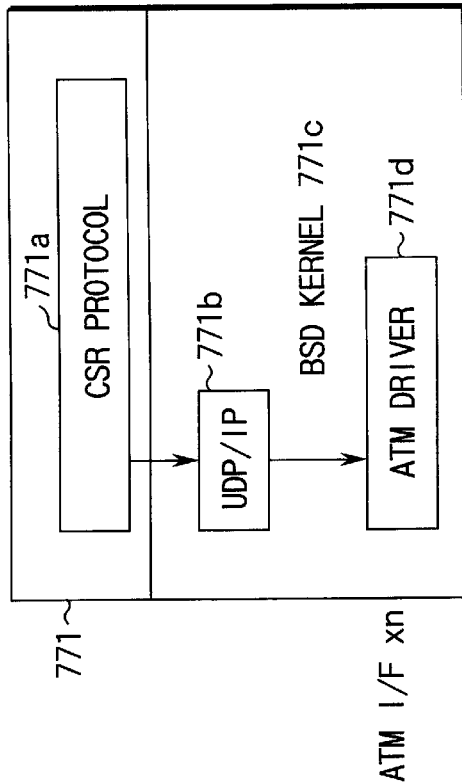
Figure 7A:
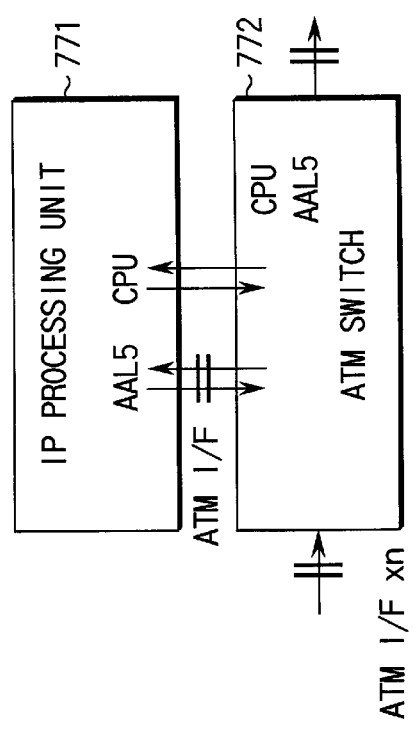
Figure 7C:
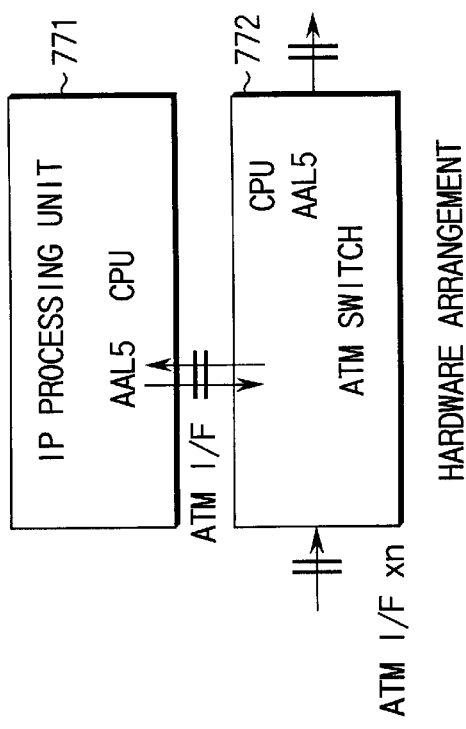
Figure 8:
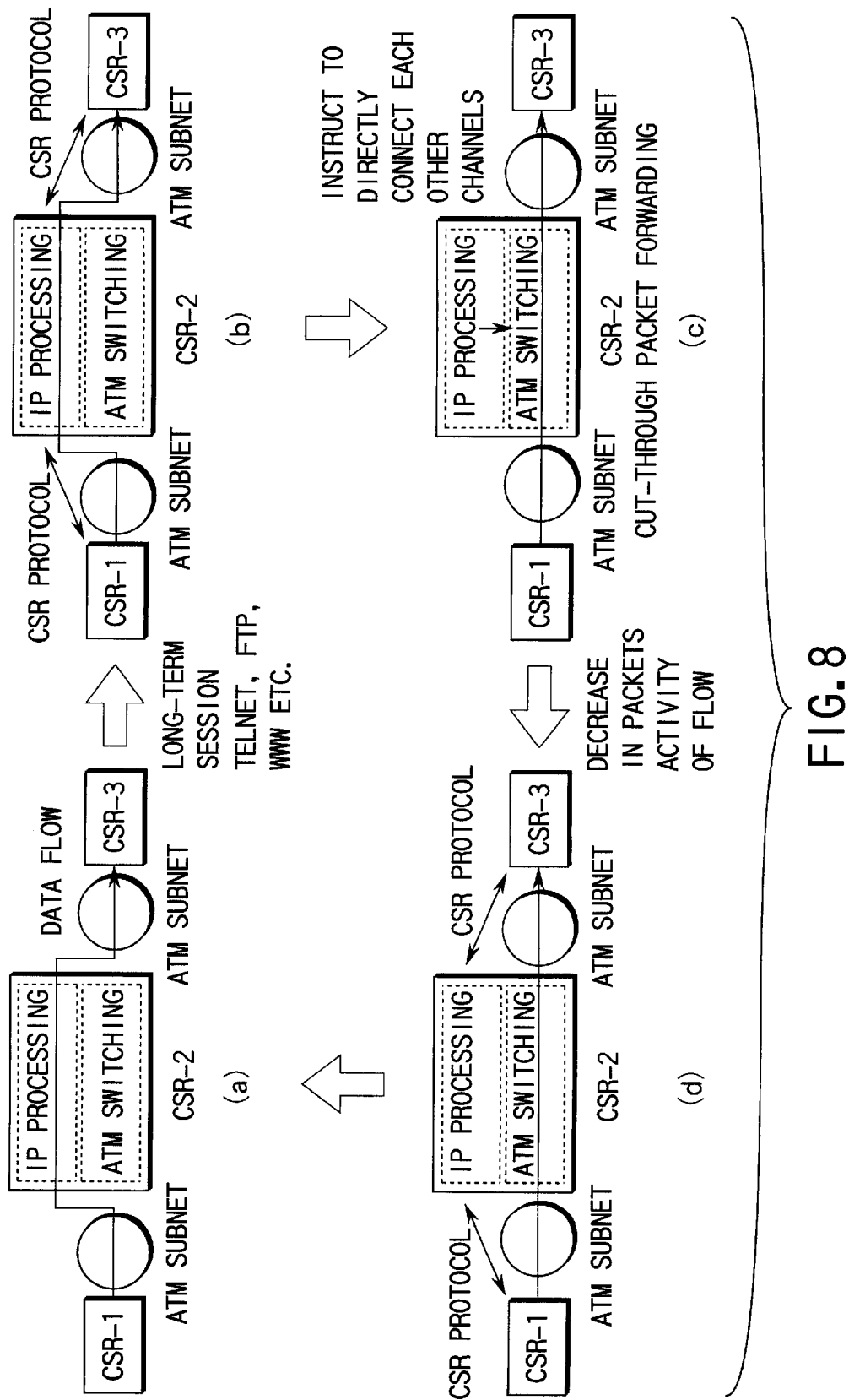
FIG. 8 is a view for explaining the basic operation of the CSR in detail.
Figure 9:
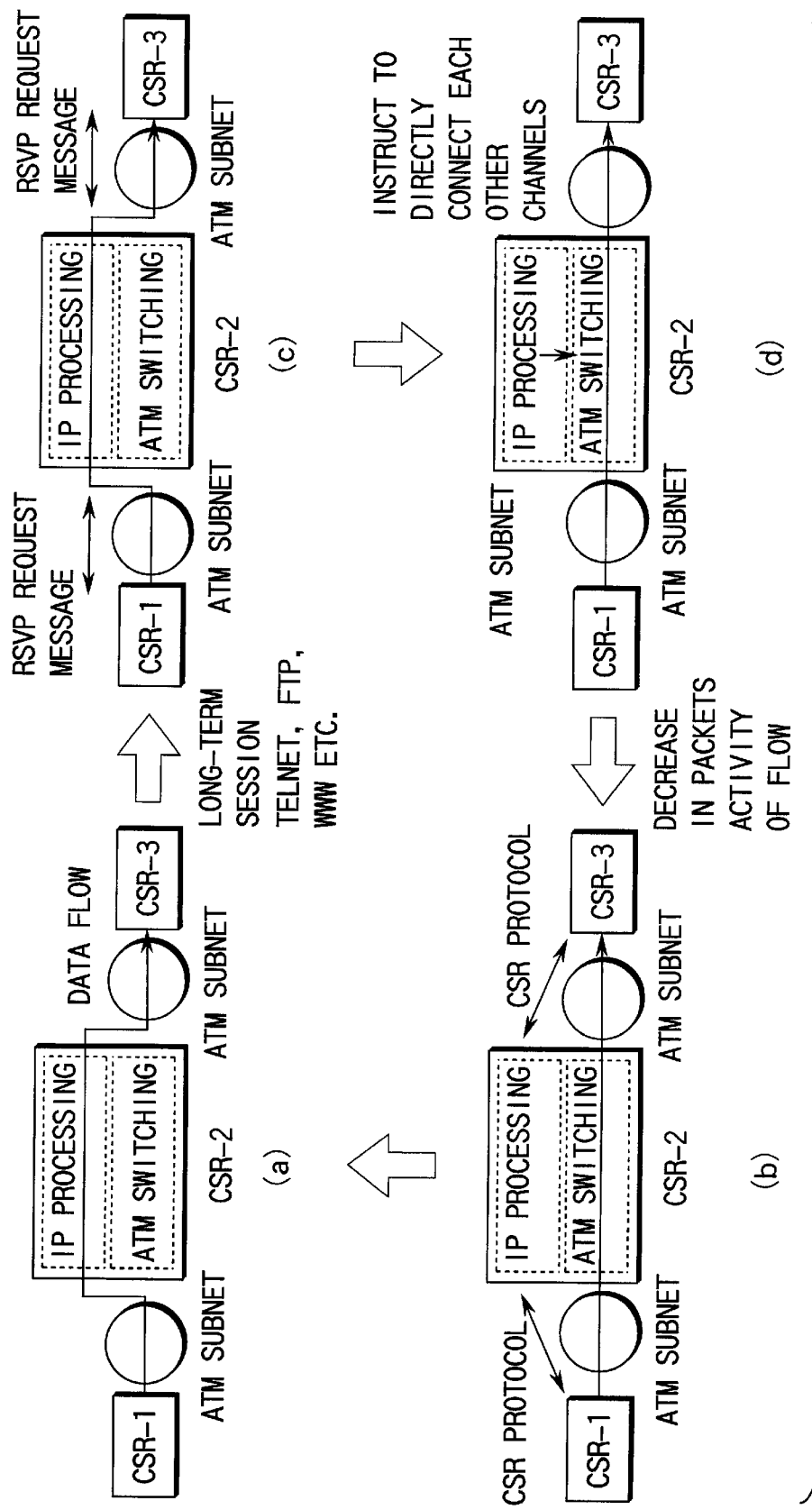
FIG. 9 is a view for explaining the operation of the CSR using an RSVP as a trigger.
Figure 10B:
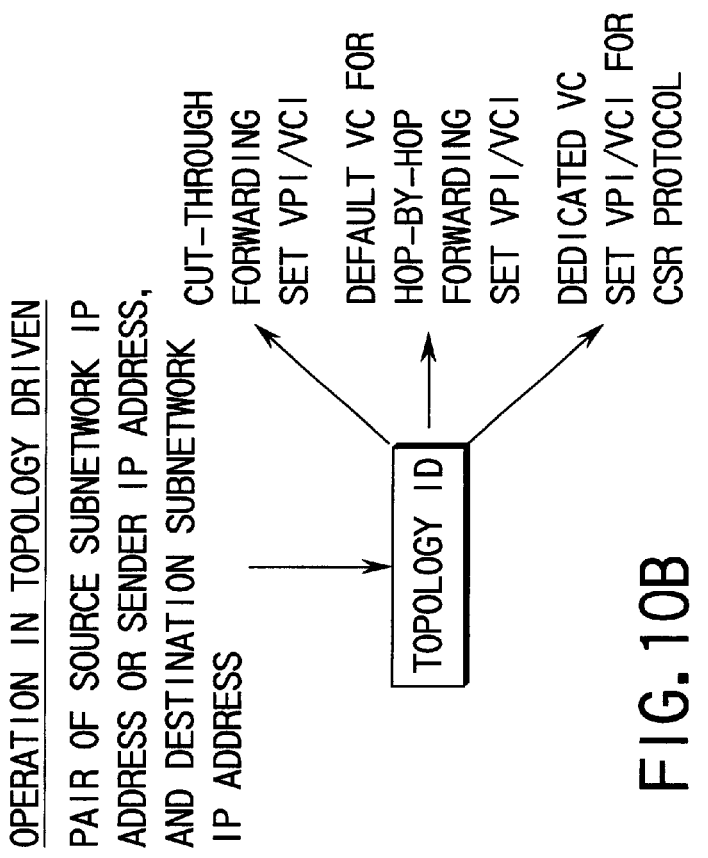
FIGS. 10A, 10B, and 10C are explanatory views of dual modes that support both the topology-driven and flow-driven modes of the CSR.
Figure 10A:
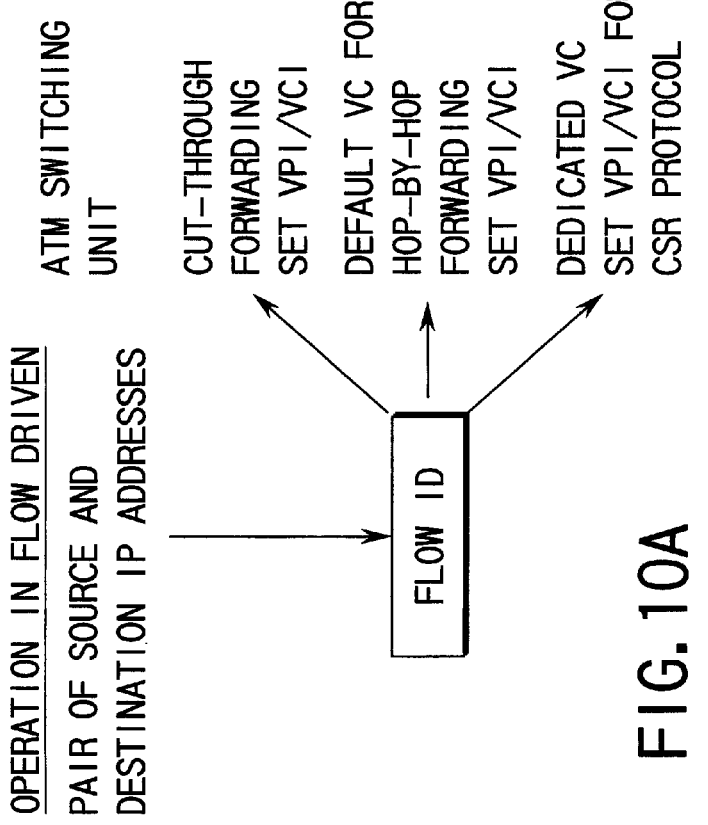
Figure 10C:
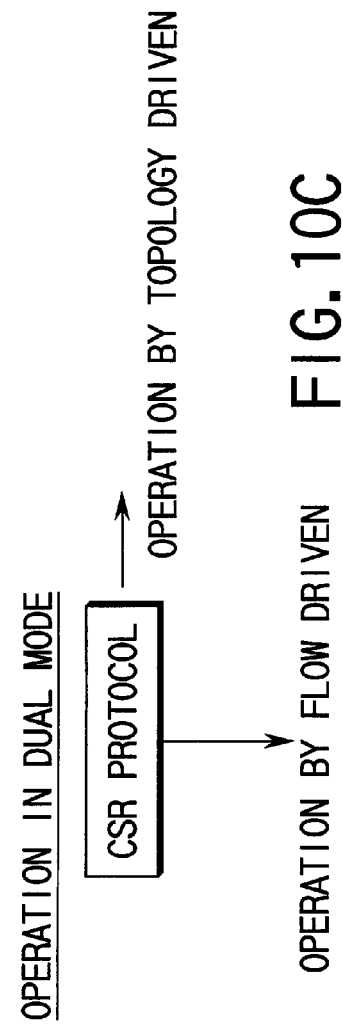
Figure 11:
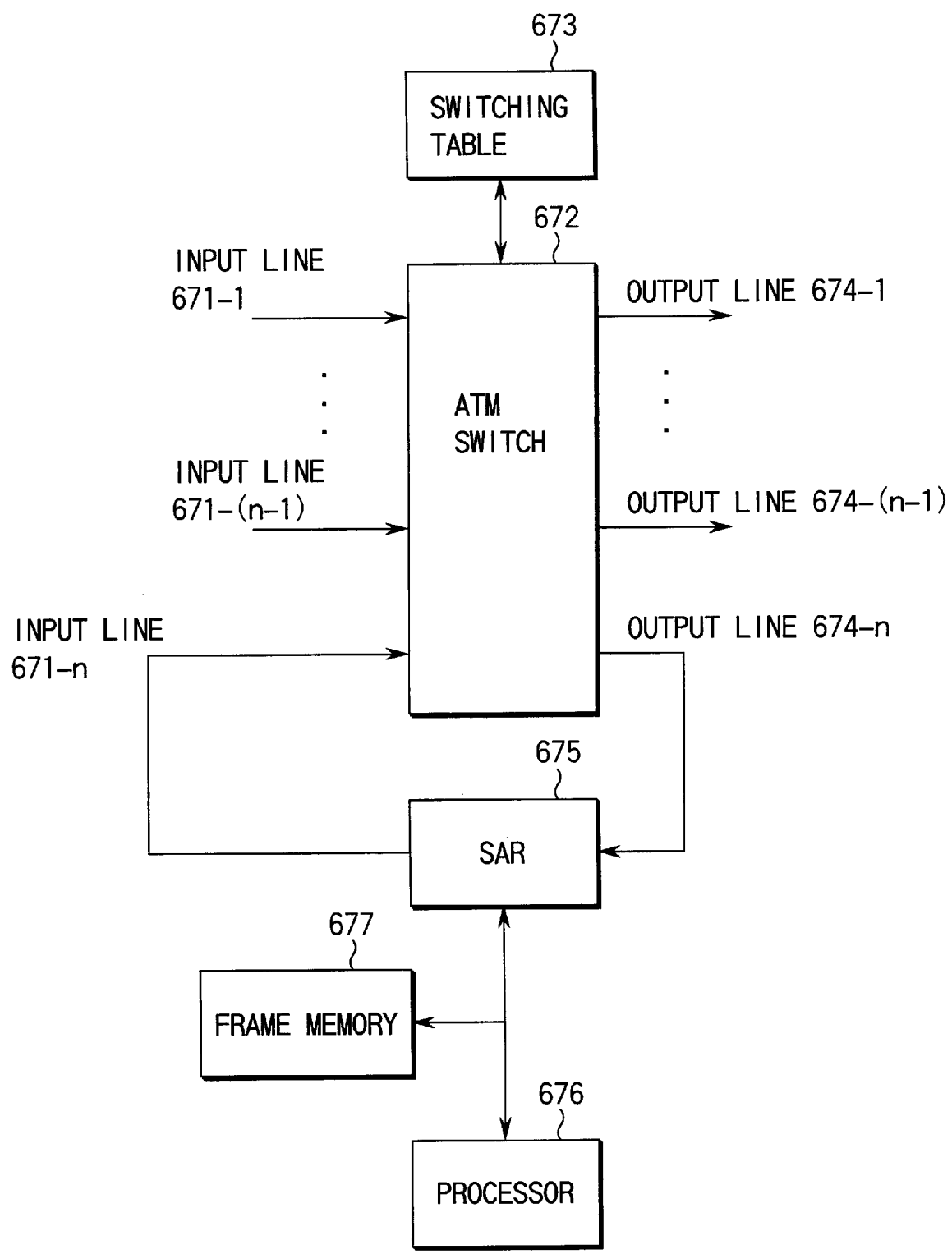
FIG. 11 is a block diagram showing the schematic arrangement of a conventional relay device, which uses an ATM switch as a switch, and implements hop-by-hop forwarding by software.
Figure 12:
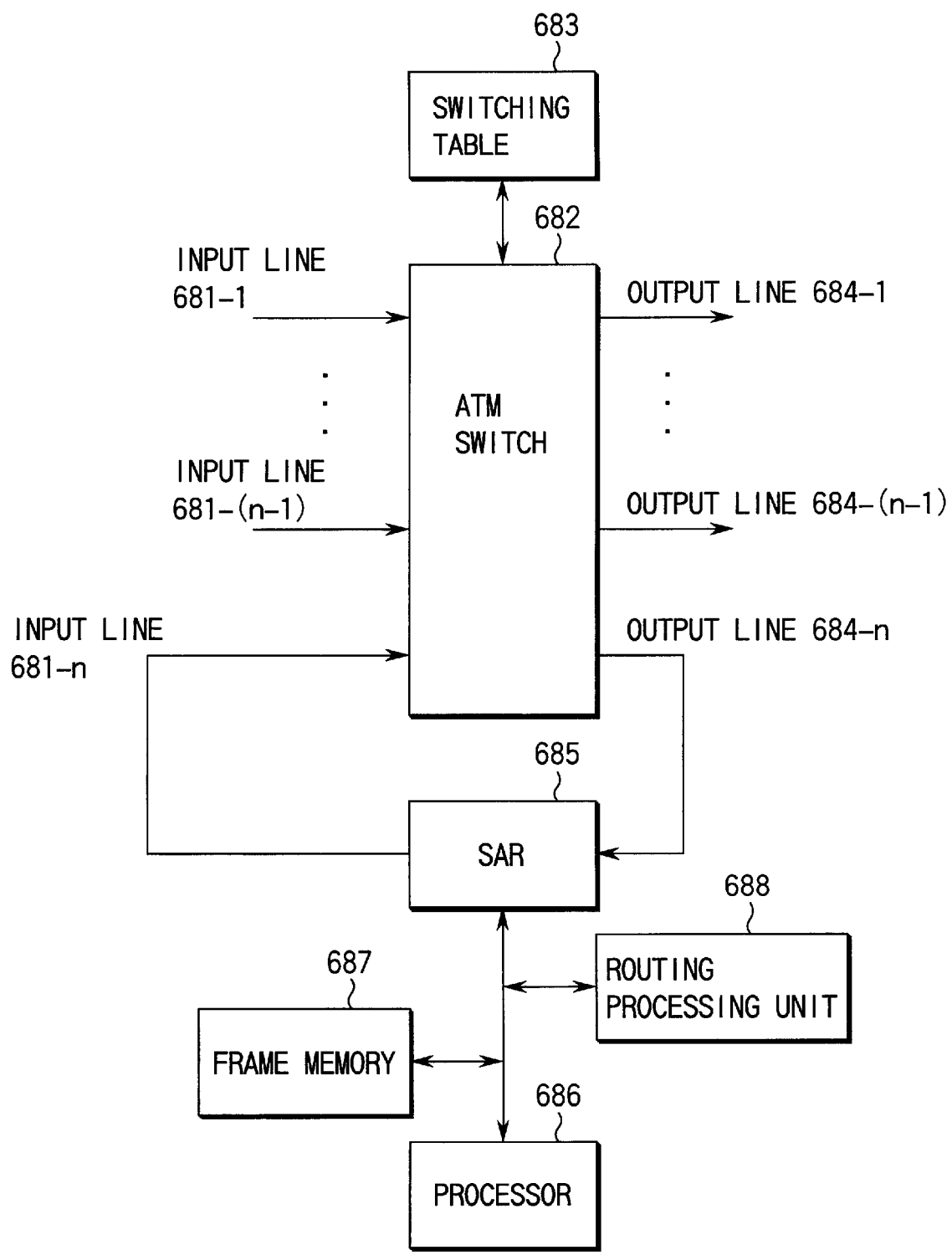
FIG. 12 is a block diagram showing the schematic arrangement of a conventional relay device, which uses an ATM in a switch unit, and implements hop-by-hop forwarding by hardware.
Figure 13:
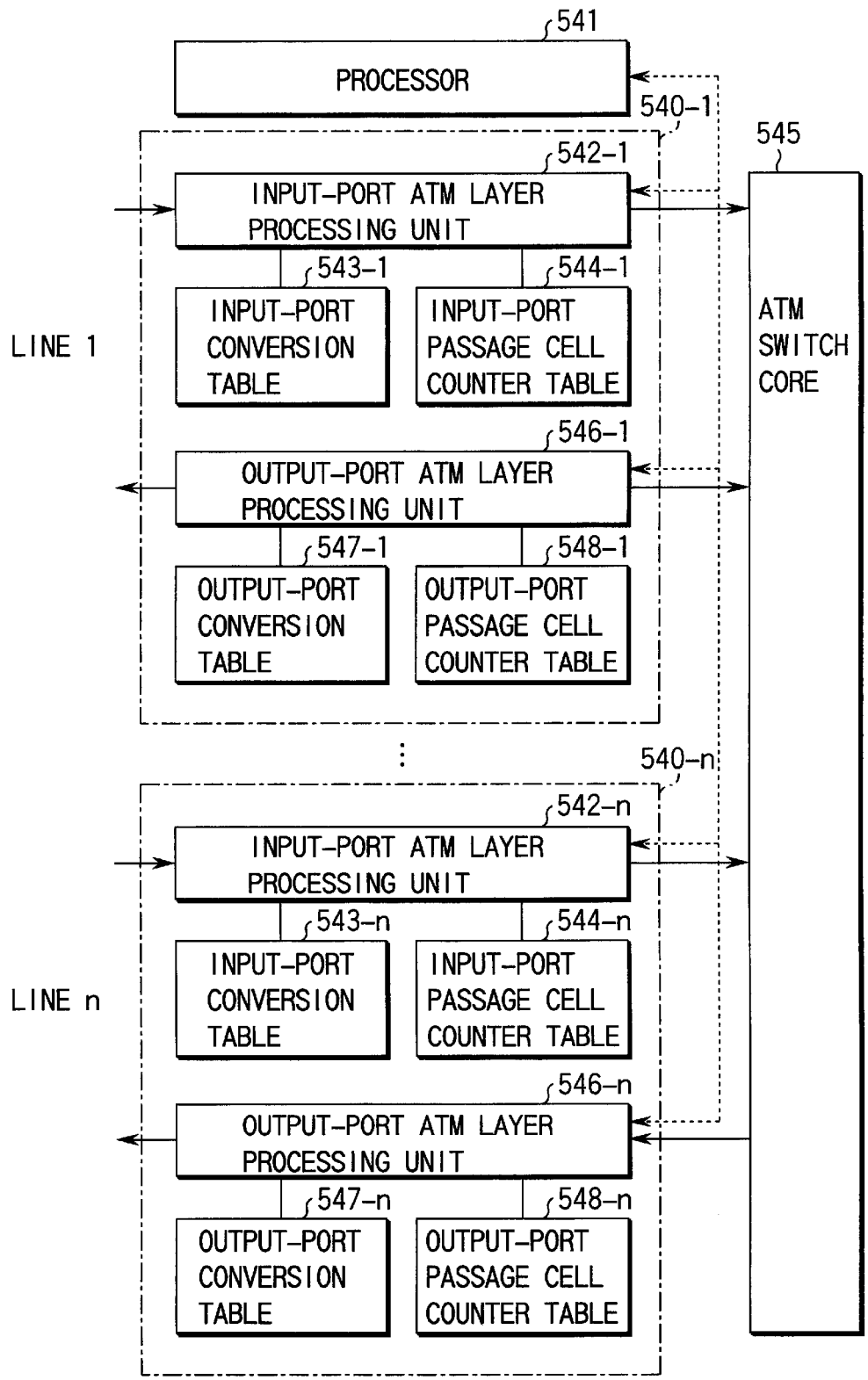
FIG. 13 is a block diagram showing the schematic arrangement of an n×n ATM switch.
Figure 14:
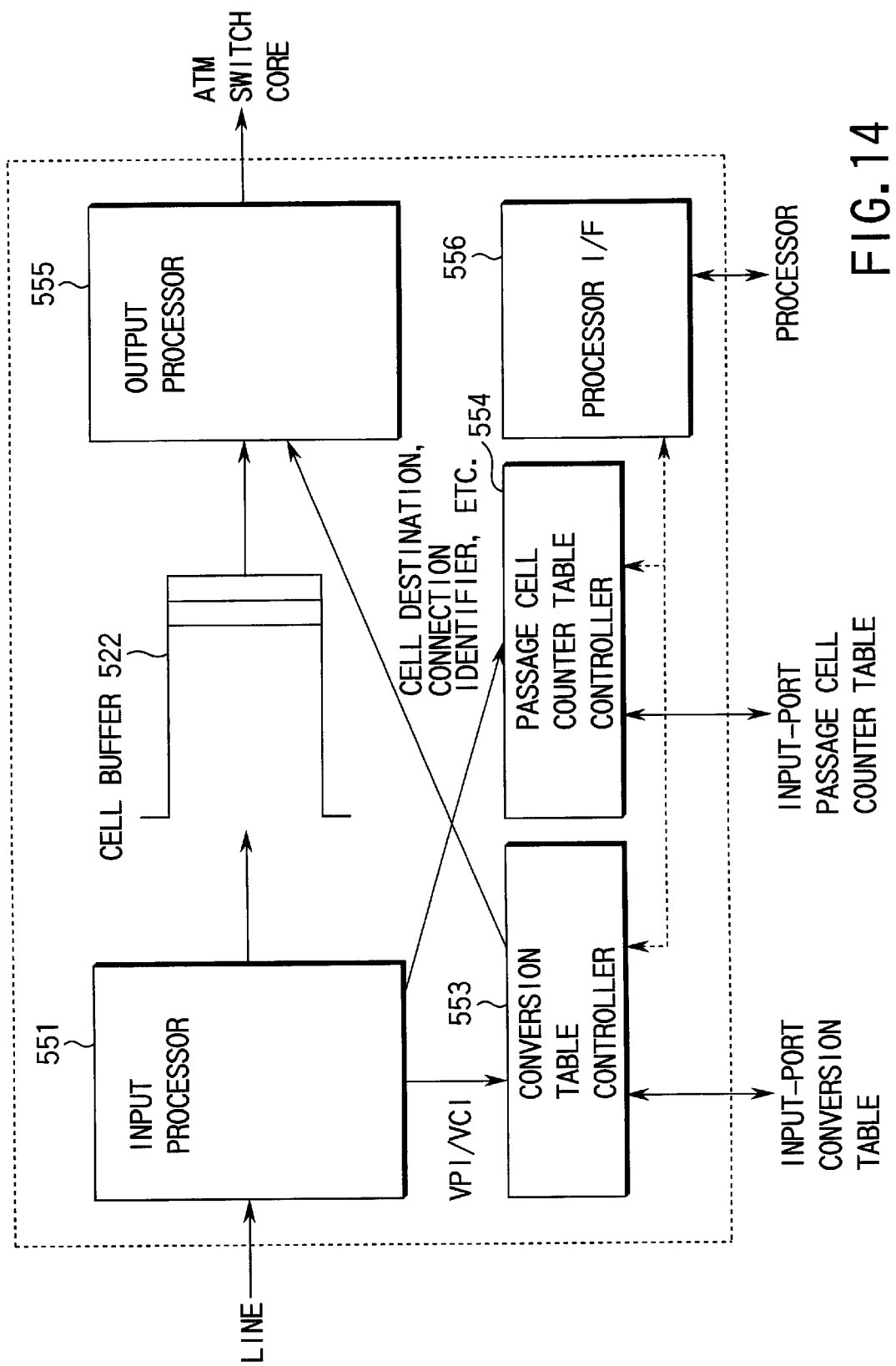
FIG. 14 is a block diagram showing the schematic arrangement of an input-port ATM layer processing unit in the ATM switch.
Figure 15:
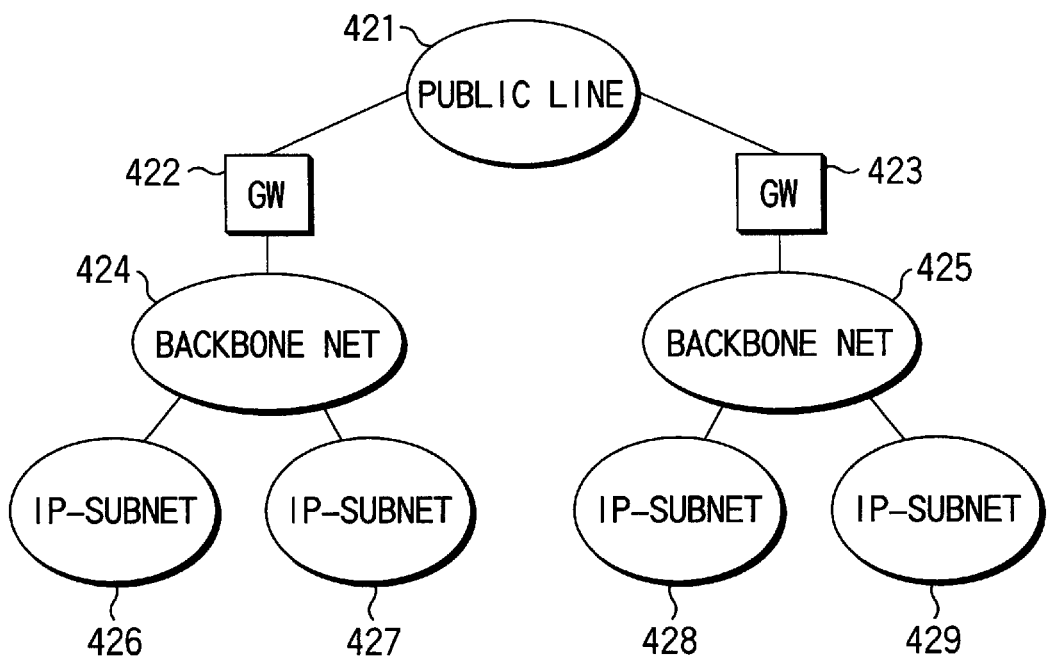
FIG. 15 is a diagram showing an example of the network arrangement.
Figure 16:
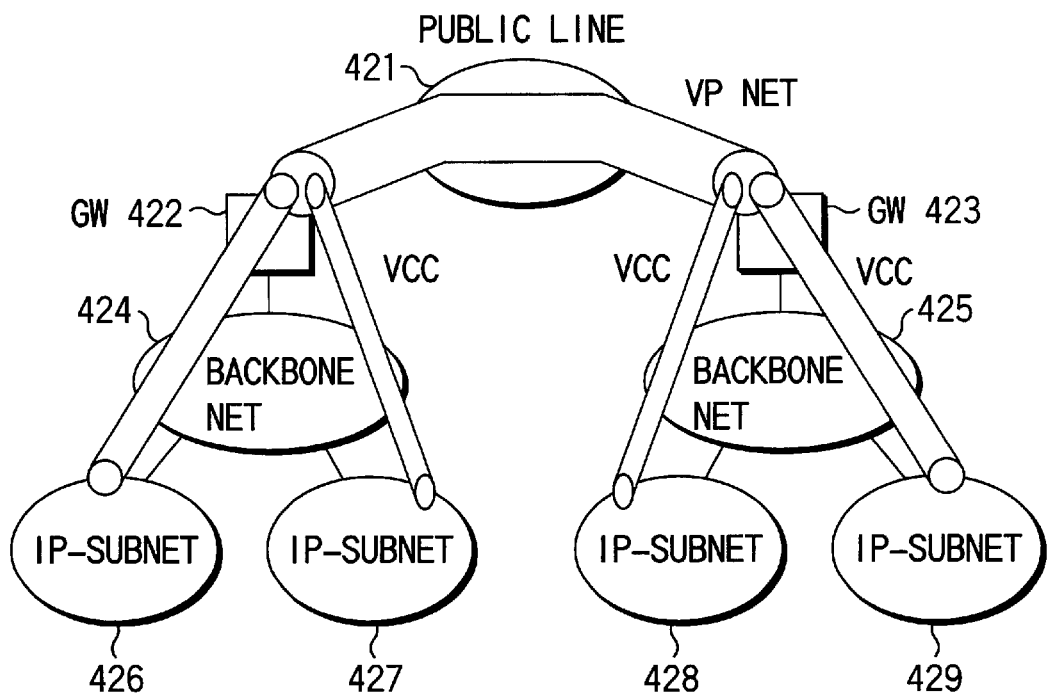
FIG. 16 is a diagram showing an example of the arrangement when the network is built by an ATM.
Figure 17:
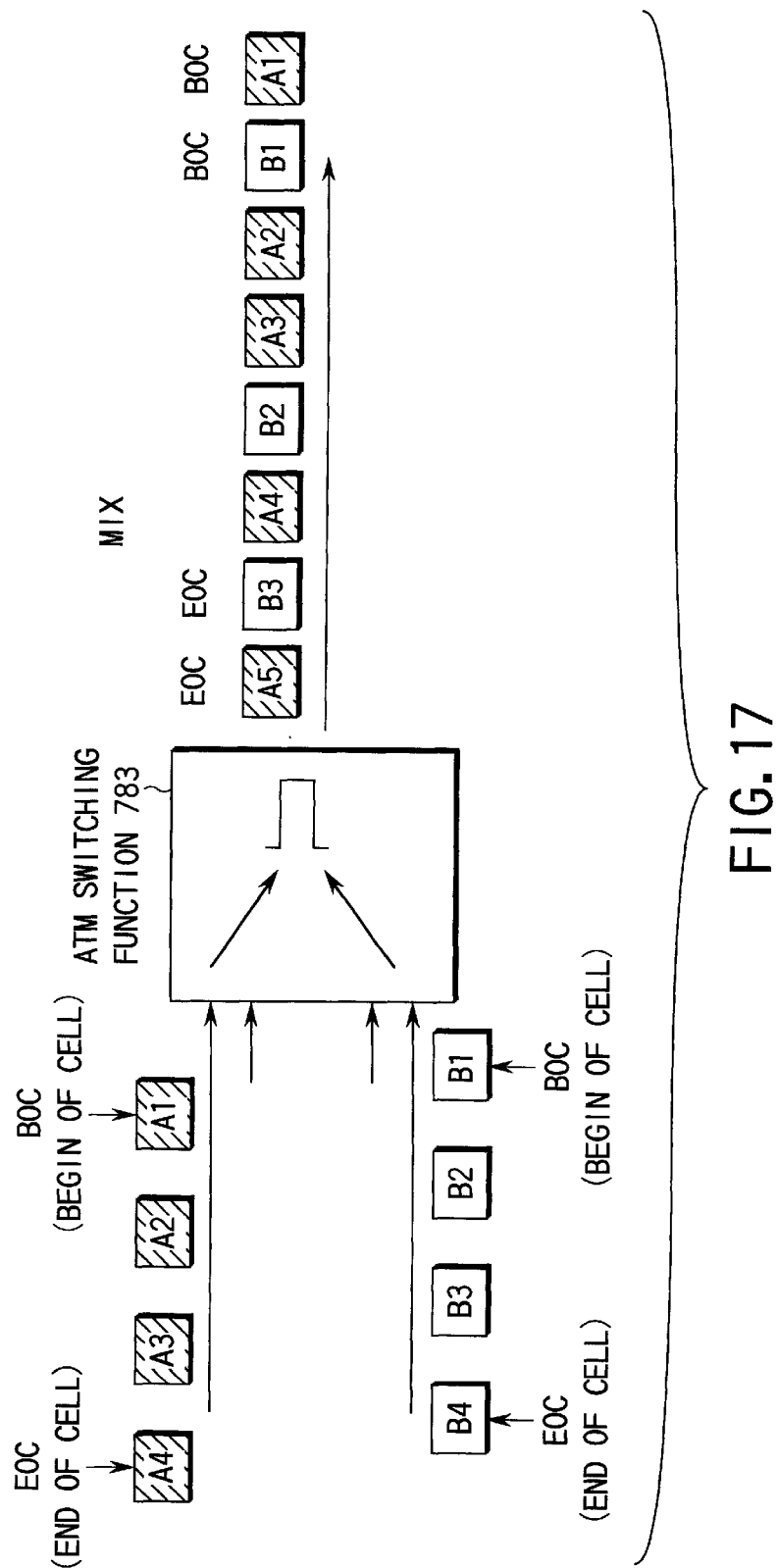
FIG. 17 is a view for explaining the problem in the conventional VC merging method.
Figure 18A:
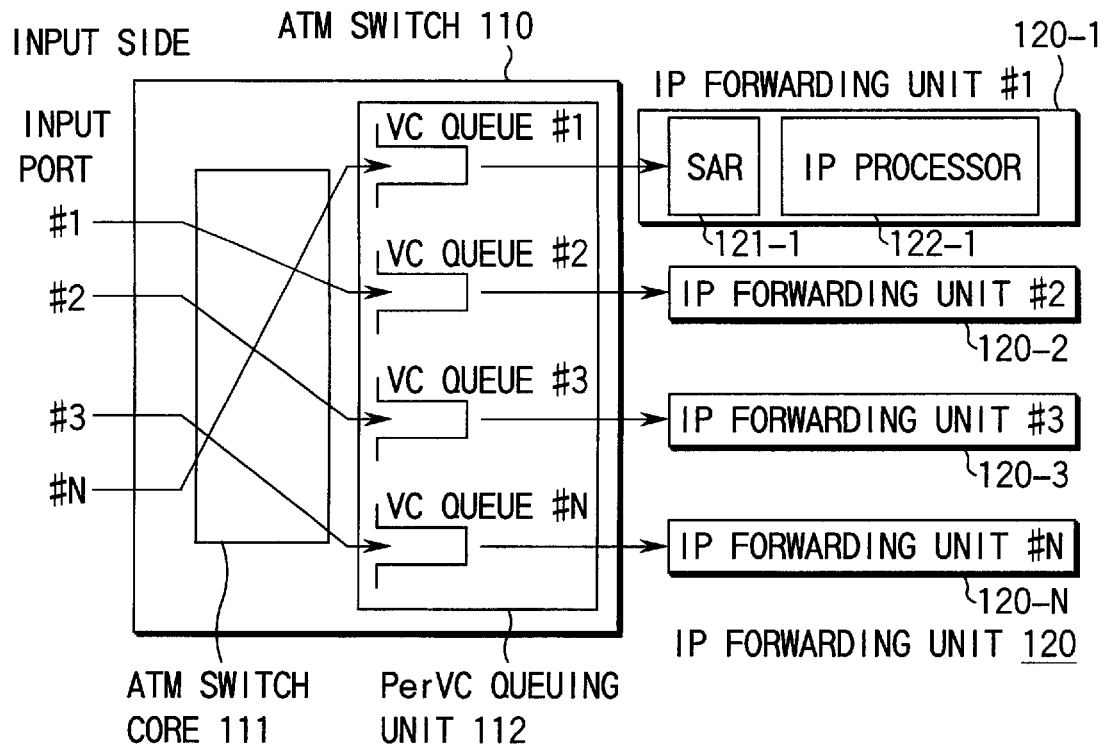
FIG. 18A is a diagram showing the arrangement on the input side of an ATM relay device according to the first embodiment of the present invention.

FIG. 18A is a diagram showing the arrangement on the input side of an ATM relay device according to the first embodiment of the present invention. This ATM relay device comprises a mechanism for searching for a destination IP address by hardware as an IP forwarding function.

The arrangement shown in FIG. 18A is basically constructed by an ATM switch 110 and an IP forwarding unit 120 connected to the output side of the ATM switch.

The ATM switch 110 includes an ATM switch core 111 which has a plurality of input ports, and distributes cells to output queues in units of destinations (VPI/VCI) of ATM cells, and a PerVC queuing unit 112 which has VC (virtual connection) queues #1 to #N, and stores cells in queues corresponding to the respective VCs in the respective output ports.

The IP forwarding unit 120 is constructed by a plurality of IP forwarding sections #1 (120-1) to #N (120-N) connected in correspondence with the VC queues #1 to #N. Each IP forwarding section, e.g., the IP forwarding section #1 (120-1), comprises an SAR 121-1 for segmenting a packet and reassembling ATM cells, and an IP processor 122-1 for forwarding an IP packet.

Figure 18B:
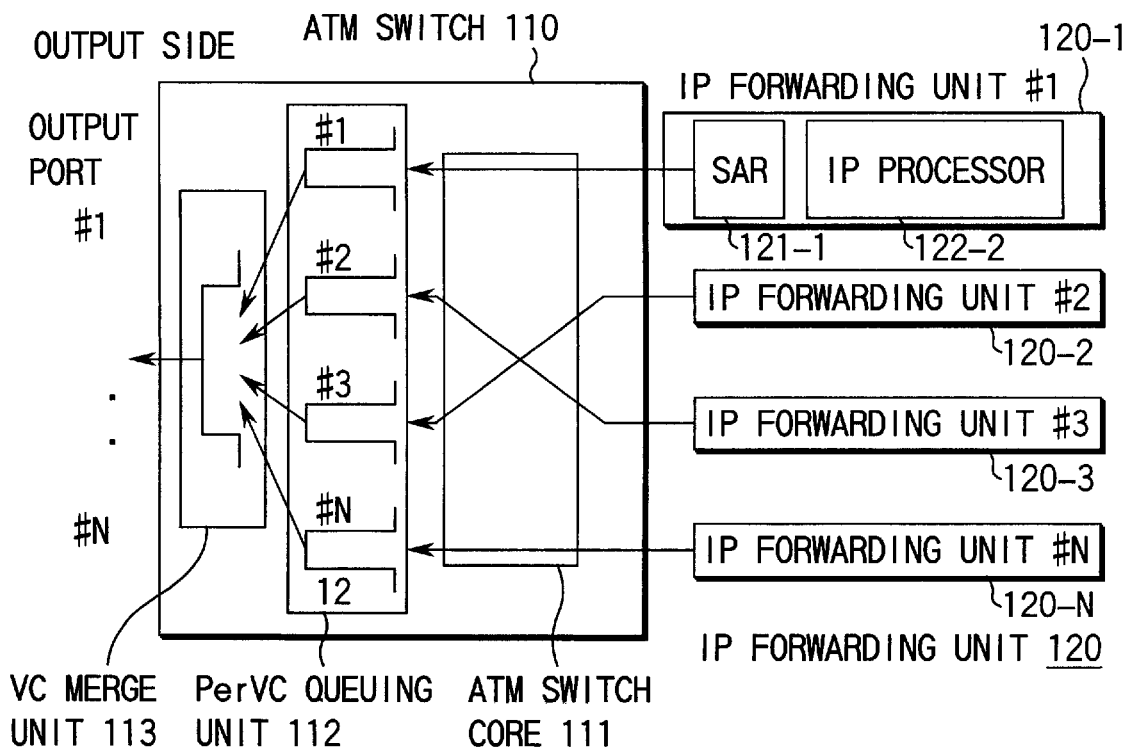
FIG. 18B is a diagram showing the arrangement on the output side of the ATM relay device.

FIG. 18B is a diagram showing the arrangement on the output side of the ATM relay device. In the arrangement on the output side, the ATM switch 110 has a VC merge unit 113, which reads out cells stored in the respective queues with respect to an identical destination while scheduling them, and merges the cells, in addition to the aforementioned ATM switch core 111 and PerVC queuing unit 112. This VC merge unit 113 is connected to output ports #1 to #N of the ATM switch 110.

In the aforementioned arrangement, IP packets mapped in ATM cells are distributed by the ATM switch core 111 on the basis of VPI/VCI values as their destination information. In this case, in this embodiment, the functions of the IP forwarding sections 120-1 to 120-N corresponding to the respective VCs are uniquely determined in advance as load distributed processes, and IP packets are distributed by means of queuing (VC queues #1 to #N) in units of VCs.

Distributed IP packets are reassembled to IP packets by the SARs 121 in the IP forwarding sections 120-1 to 120-N, and the IP processors 122 search for destination IP addresses of those IP packets. The search may be implemented by a software search based on a conventional method or by a table lookup search by hardware.

Figure 19:
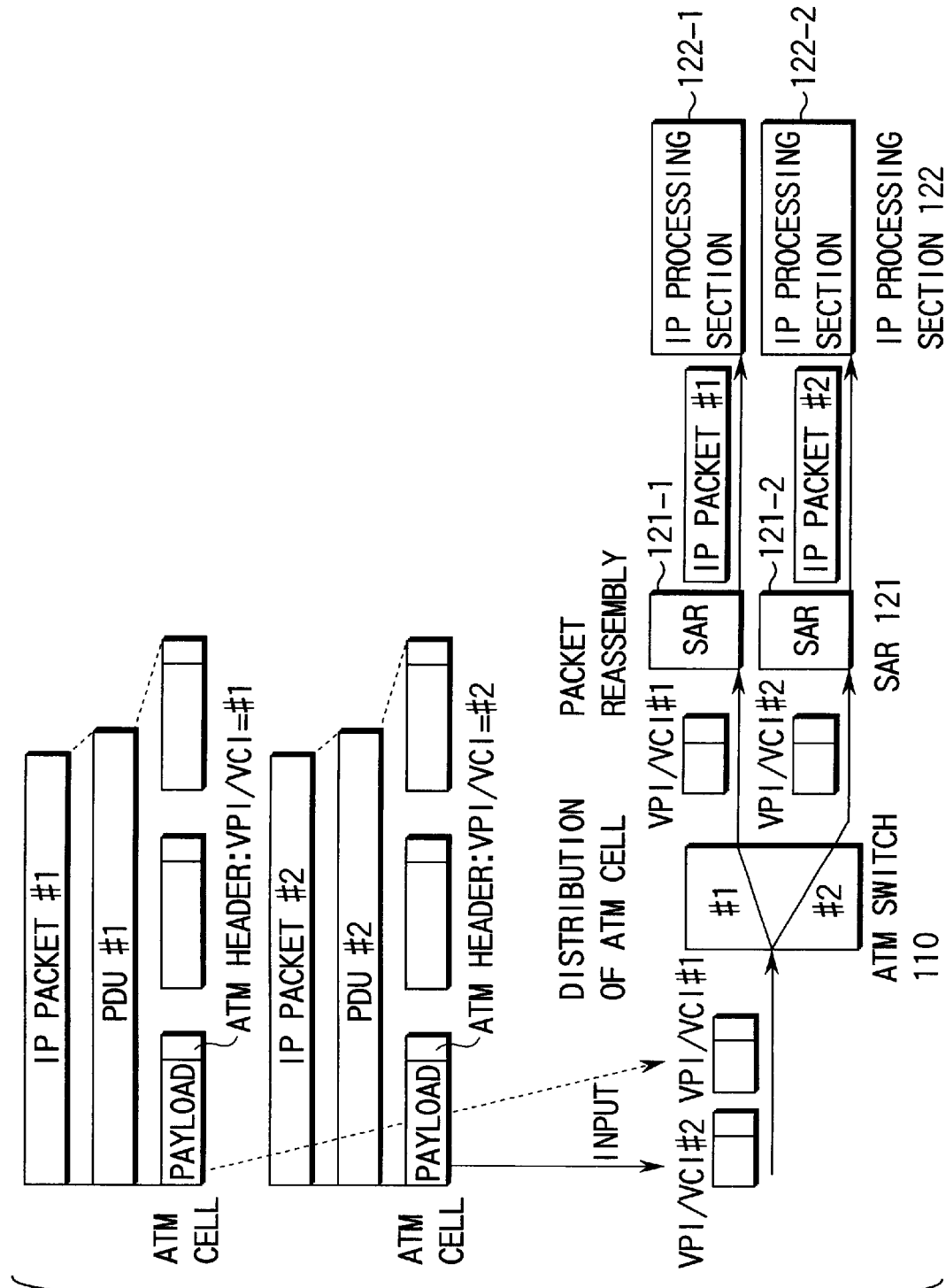
FIG. 19 is a view showing the distributed processes of IP packets.

FIG. 19 is a view showing the distributed processes of IP packets. Referring to FIG. 19, ATM cells with a VPI/VCI=1 and ATM cells with a VPI/VCI=2 are input to the ATM switch 110, and are respectively distributed to VC queues #1 and #2. These ATM cells are reassembled into packets by the SARs 121-1 and 121-2, and the packets are input to the IP processors 122-1 and 122-2 to search for their destination IP addresses.

Data that have acquired forwarding information by search in the IP processors 122-1 and 122-2 undergo output processes to the next relay device.

More specifically, in the arrangement on the output side shown in FIG. 18B, the SARs 121-1 and 121-2 map the packets to ATM cells, which are input to the ATM switch 110. In this embodiment, since IP forwarding is implemented by distributed processes using the plurality of IP forwarding sections 120-1 to 120-N, the next output destination (NEXT HOP) of the respective IP packets may become an identical destination IP address. In this case, different PDUs (protocol data units) are present in an identical VPI/VCI upon outputting of the relay device.

Figure 20:
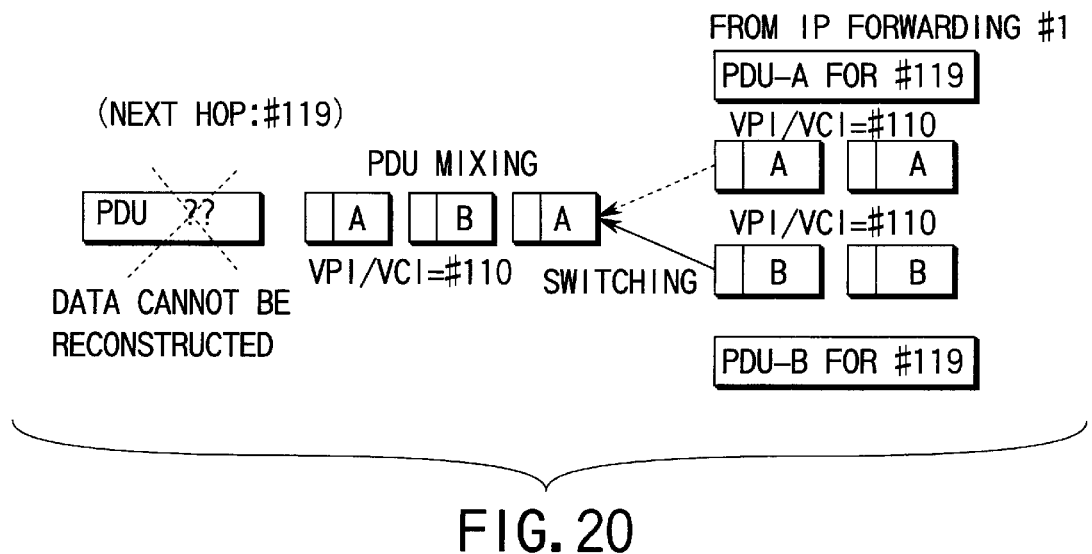
FIG. 20 is a view for explaining the problem of mixing of PDU data resulting from the distributed processes of this embodiment.

However, in the arrangement shown in FIG. 18B, when mapping to ATM cells having identical VPI/VCI is done based on the outputs from the IP forwarding sections 120-1 to 120-N, PDU data mix in the ATM switch, thus destroying IP packet data. FIG. 20 is a view for explaining a problem of mixing of PDU data resulting from the distributed processes.

Referring to FIG. 20, when the next output destinations (NEXT HOP) of IP packets A and B are address #119, if IP packets A and B whose VPI/VCI values have identical destination #110 are segmented into ATM cells and those cells are input to the ATM switch 110, PDUs mix, and PDU-A and PDU-B cannot be normally reconstructed at the next output destination (NEXT HOP) #119.

To solve this problem, in this embodiment, when IP packet data having the same next output destination (NEXT HOP) is obtained by search in the IP forwarding sections 120-1 to 120-N, the SARs 121 serving as destination information assigning means assign different "temporary VPI/VCI values" to ATM cells in units of packets, and PerVC queuing unit 112 serving as output means executes queuing in units of PDUs, thereby avoiding PDUs from mixing in due to switching, and packet data from being destroyed.

Figure 21:
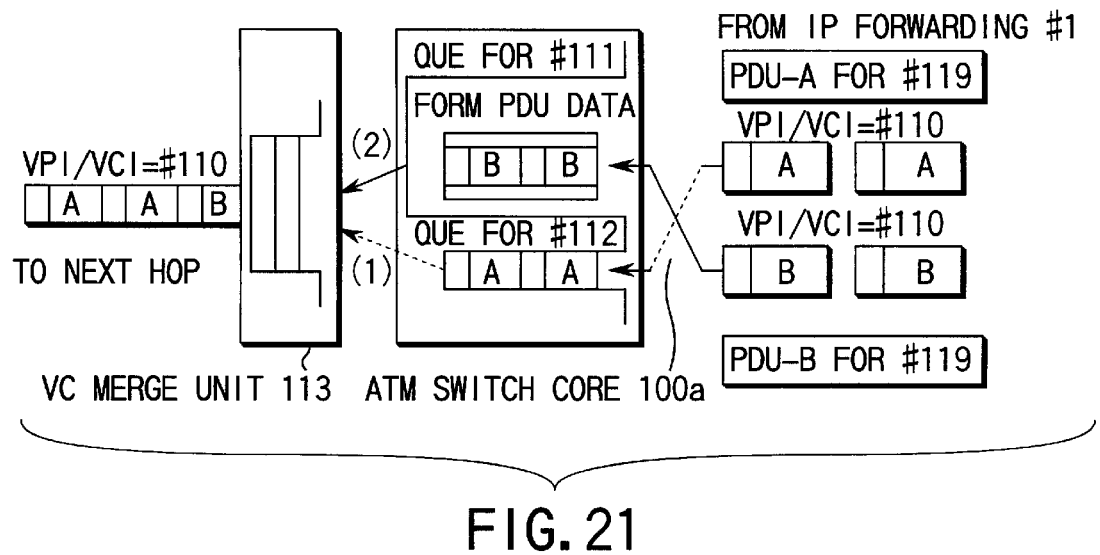
FIG. 21 is a view for explaining the method of solving the problem of PDU mixing resulting from the distributed processes of this embodiment.

FIG. 21 is a view for explaining the method of solving the problem of PDU mixing resulting from the distributed processes according to this embodiment. Assume that IP packets of IP forwarding are handled and mapped as PDU-A and PDU-B, for the sake of simplicity.

In this case, destination information #111 and destination information #112 are assigned to reassembled ATM cells as the aforementioned "temporary VPI/VCI values". Also, the next output destination (NEXT HOP) is #119.

ATM cells input to the ATM switch 110 are switched to arbitrary output ports according to their destinations. In this case, since the PerVC queuing unit 112 enqueues ATM cells in units of "temporary VPI/VCI values" #111 and #112, the corresponding VC queues can independently form and store PDU data (IP packet data).

Referring to FIG. 21, the VC merge unit 113 on the output side of the PerVC queuing unit 112 monitors the state of PerVC queuing, and urges the unit 112 to output cells from the respective VC queues after it has confirmed that PDUs are formed. In FIG. 21, (1) means a PDU-A read, and (2) means a PDU-B read.

In this manner, ATM cells are output from the respective VC queues in units of PDUs, and the VC merge unit 113 merges PDU-A and PDU-B to have an identical VPI/VCI #110, thus ending IP forwarding.

Figure 22:
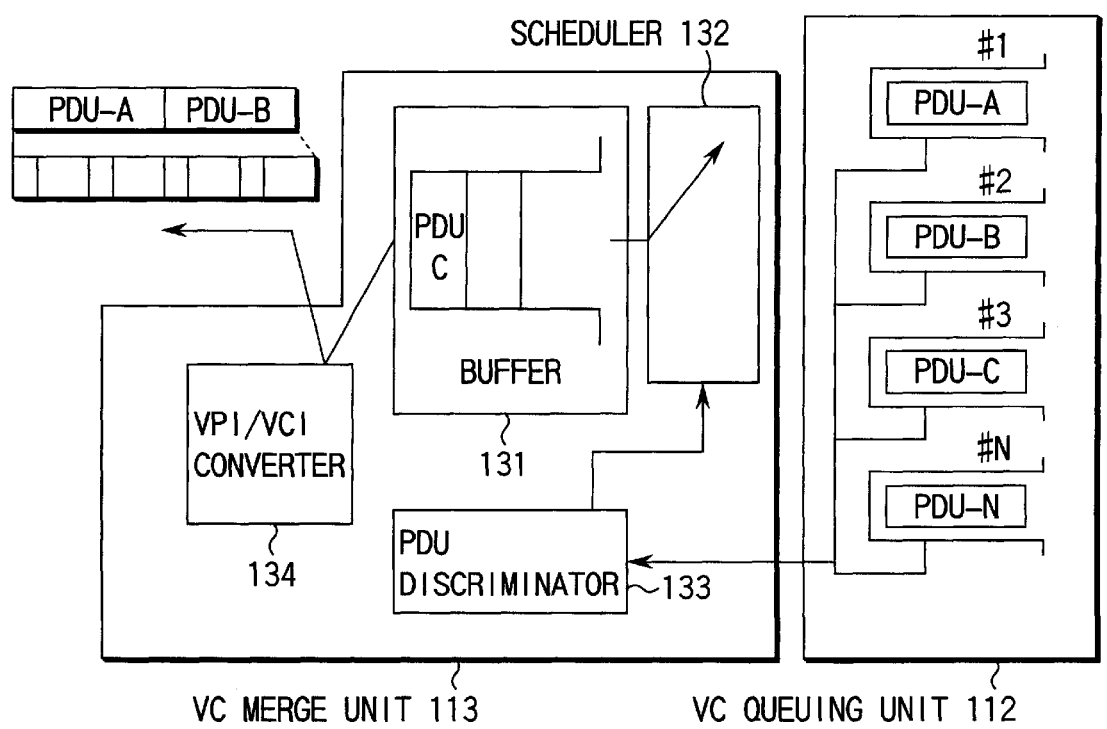
FIG. 22 is a block diagram showing the arrangement of a VC merge unit shown in FIG. 21.
Figure 23:
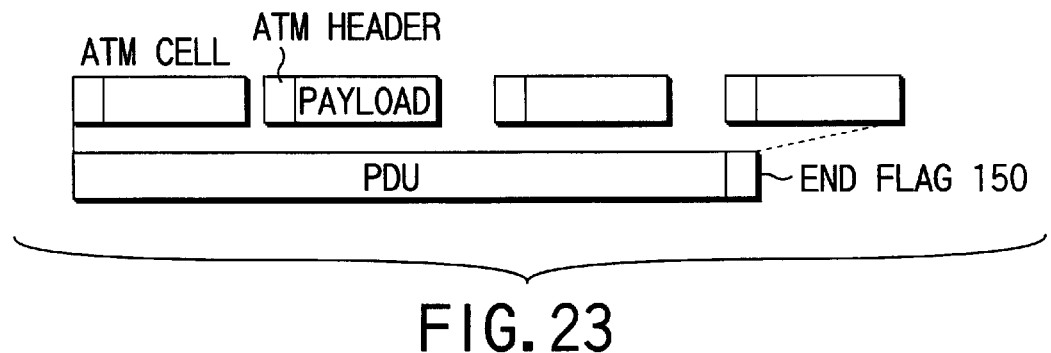
FIG. 23 is a view showing an example of the method of discriminating if cell data input to a PerVC queuing unit form a PDU.

FIG. 22 is a block diagram showing the arrangement of the VC merge unit 113. Referring to FIG. 22, cell data input to the VC queuing unit 112 inform a PDU discriminator 133 of completion of formation of PDUs. In this discrimination, formation of a PDU is recognized by, e.g., a PDU end flag 150 or the like as an AAL (ATM ADAPTATION LAYER), as shown in FIG. 23, and a message is sent.

From a VC queue which is recognized by the PDU discriminator 133 that a PDU has been formed, a scheduler 132 reads out ATM cells in units of PDUs, and stores them in a buffer 131. The scheduler 132 controls the order in units of PDUs to attain VC merge. Data whose PDU sequence is held in the buffer 131 is forwarded after a VPI/VCI converter 134 appends a new VPI/VCI header corresponding to the next output destination (NEXT HOP) to that data in place of an old one.

As described above, in this embodiment, since the plurality of IP forwarding sections are placed after the ATM switch to execute distributed processes, high-speed, large-capacity IP relay processes can be implemented without increasing the operation speed and processing performance (the number of address table entries) of the relay device. On the other hand, by combining with an ATM switch, since load distribution can be attained by queuing in units of PDUS, i.e., ATM connections, an increase in cost can be minimized.

According to the first embodiment described above, since a plurality of IP forwarding sections are placed after the ATM switch in the relay device to execute distributed processes, higher-speed, larger-capacity IP relay processes can be implemented without increasing the operation speed and processing performance of the relay device. By combining with an ATM switch, since load distribution can be attained by queuing in units of PDUs, i.e., ATM connections, an increase in cost can be minimized.

Second Embodiment

The second embodiment of the present invention will be described in detail below with reference to the drawings.

Figure 24:
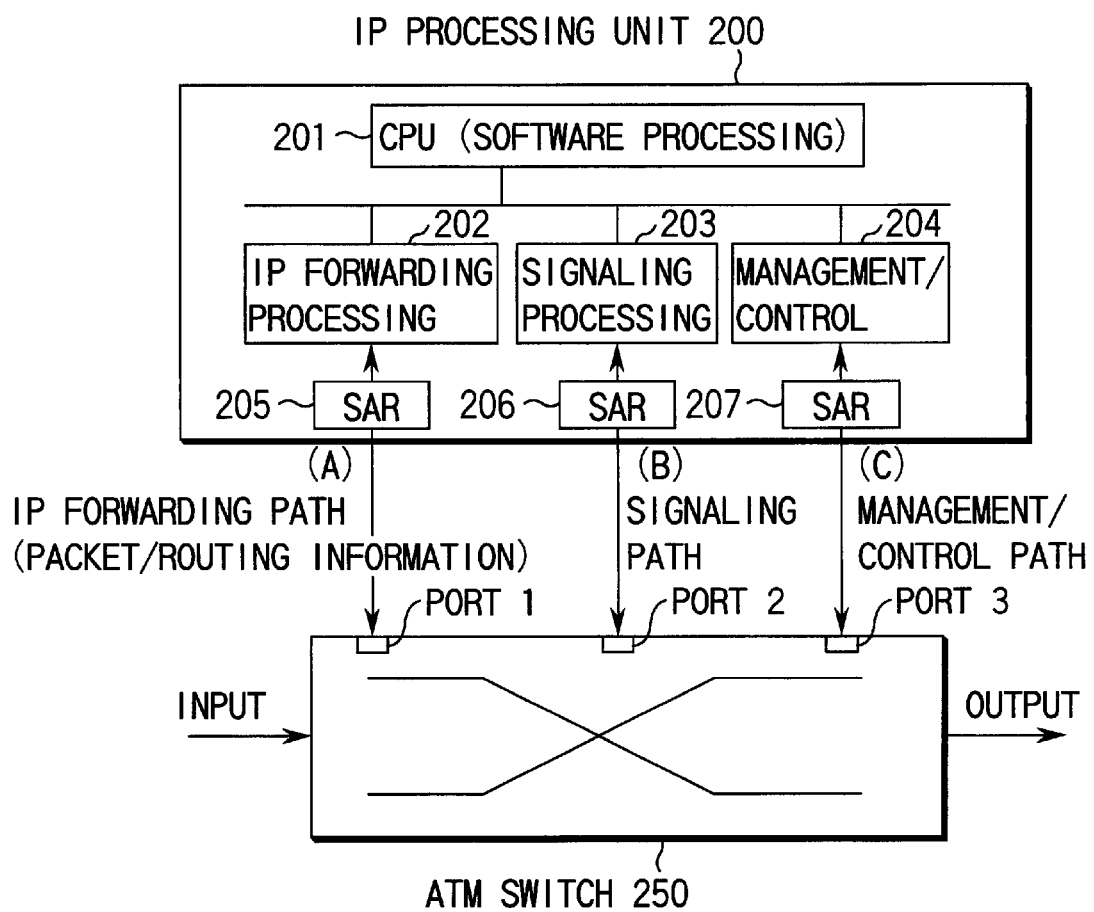
FIG. 24 is a diagram showing the arrangement of an ATM relay device according to the second embodiment of the present invention.

FIG. 24 is a diagram showing the arrangement of an ATM relay device according to the second embodiment of the present invention. The ATM relay device according to this embodiment comprises an IP forwarding function of forwarding IP packets hop by hop by searching for destination IP addresses.

Referring to FIG. 24, an IP processing unit 200 is connected to the output side of an ATM switch 250. The IP processing unit 200 comprises an IP forwarding processing function 202 of performing forwarding processes of IP packets such as hop-by-hop forwarding and the like, a signaling processing function 203 of setting a communication path, a management/control function 204 of managing and controlling the ATM switch 250, SARs 205, 206, and 207 which are respectively connected to the IP forwarding function 202, signaling processing function 203, and management/control function 204, and segment/reassemble cells and data units, and a CPU 201 for executing software processes of data extracted by the respective processing functions 202, 203, and 204. The CPU 201 is shared by the respective processing functions 202, 203, and 204 via individual buses.

Furthermore, the SAR 205 is connected to port 1 of the ATM switch 250 via an IP forwarding path A, the SAR 206 to port 2 of the ATM switch 250 via a signaling processing path B, and the SAR 207 to port 3 of the ATM switch 250 via a management/control path C. Note that the IP forwarding path A, signaling processing path B, and management/control path C are physically different paths.

In the aforementioned arrangement, ATM cells input to the ATM switch 250 via input ports are distributed to output ports by the ATM switch 250 in units of their destinations (VPI/VCI values). IP packets mapped to ATM cells are sent to the IP processing unit 200 to find their next addresses NEXT HOP by search, and are then output from the output ports via the ATM switch 250 again in accordance with the found next addresses.

More specifically, IP packets mapped to ATM cells are distributed to the IP processing unit 200 by the ATM switch 250 on the basis of VPI/VCI values as their destination information. The packets are distributed via the above-mentioned three paths A, B, and C. More specifically, upon forwarding IP packets hop by hop (default), processes are done by the IP forwarding processing function 202 via the IP forwarding path A. On the other hand, in case of data such as a call connection (setup of a communication path) or the like from another node device, the signaling processing function 203 executes signal processes via the signaling processing path B. Furthermore, in case of management/control information, the management/control function 204 executes management or control via the management/control path C.

More specifically, in this embodiment, the IP forwarding processing function 202, signaling processing function 203, and management/control function 204 corresponding to the respective VCs (virtual connections) are uniquely determined in advance to attain load distributed processes, and IP packet data, call setup data, and management/control data are distributed by routing in units of VCs.

Figure 25:
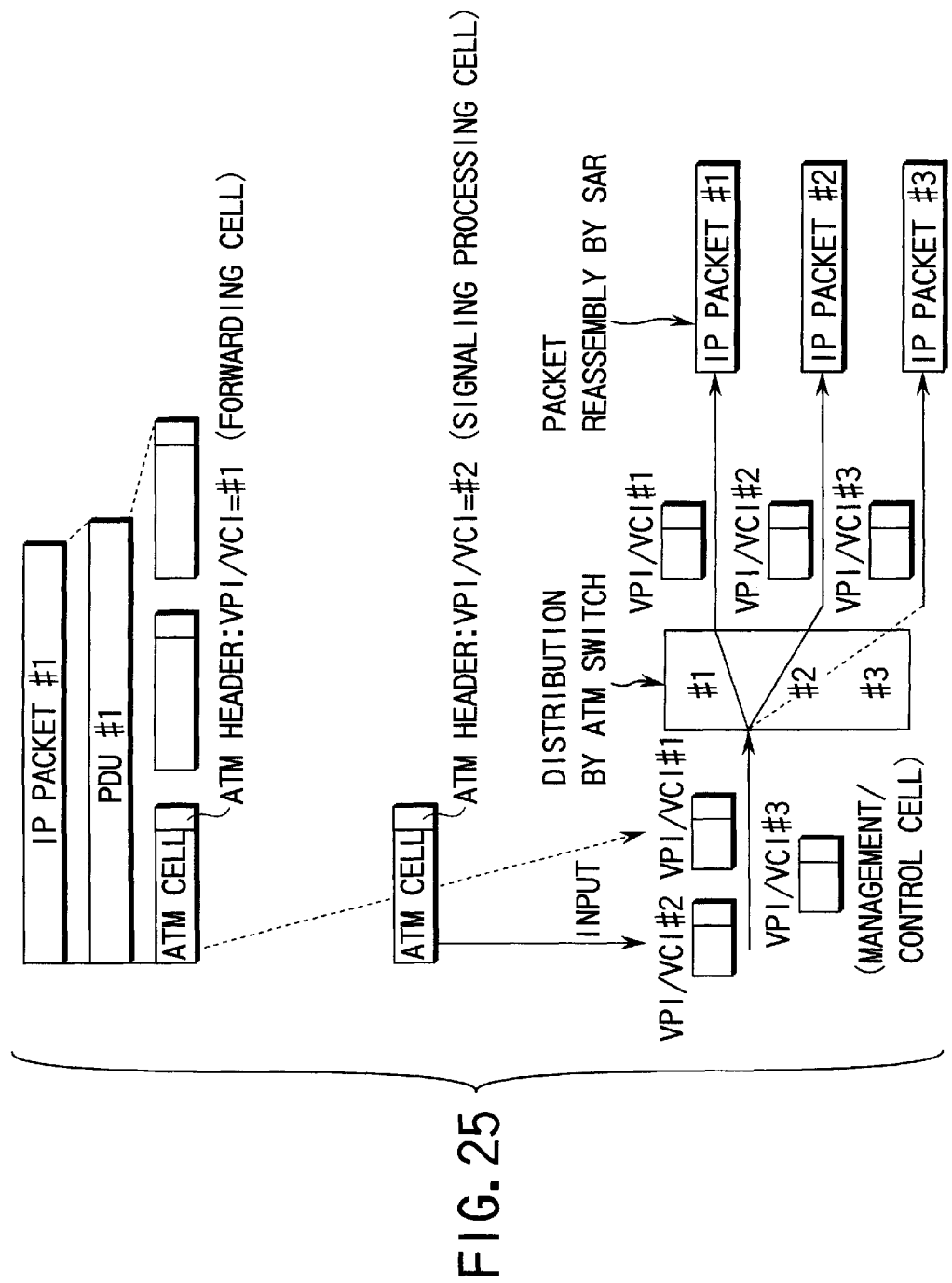
FIG. 25 is a view showing the processes of distribution on the ATM cell level.

FIG. 25 is a view showing the processes of distribution on such ATM cell level. Referring to FIG. 25, forwarding ATM cells: VPI/VCI=#1, signaling processing ATM cells: VPI/VCI=#2, and management/control ATM cells: VPI/VCI=#3 are input to the ATM switch 250, are distributed in units of VPI/VCI values, and are then reassembled to packets by the SARs 205, 206, and 207.

As described above, in this embodiment, since the ATM switch 250 and IP processing unit 200 are connected using physically different communication paths, and the IP forwarding processing, signaling processing, and management/control processing are processed by the independent IP forwarding processing function 202, signaling processing function 203, and management/control function 204, the aforementioned processes can be efficiently done. Since the resources of the CPU 201 are independently used, improvement of the processing performance due to the distribution effect can be expected.

Figure 26:
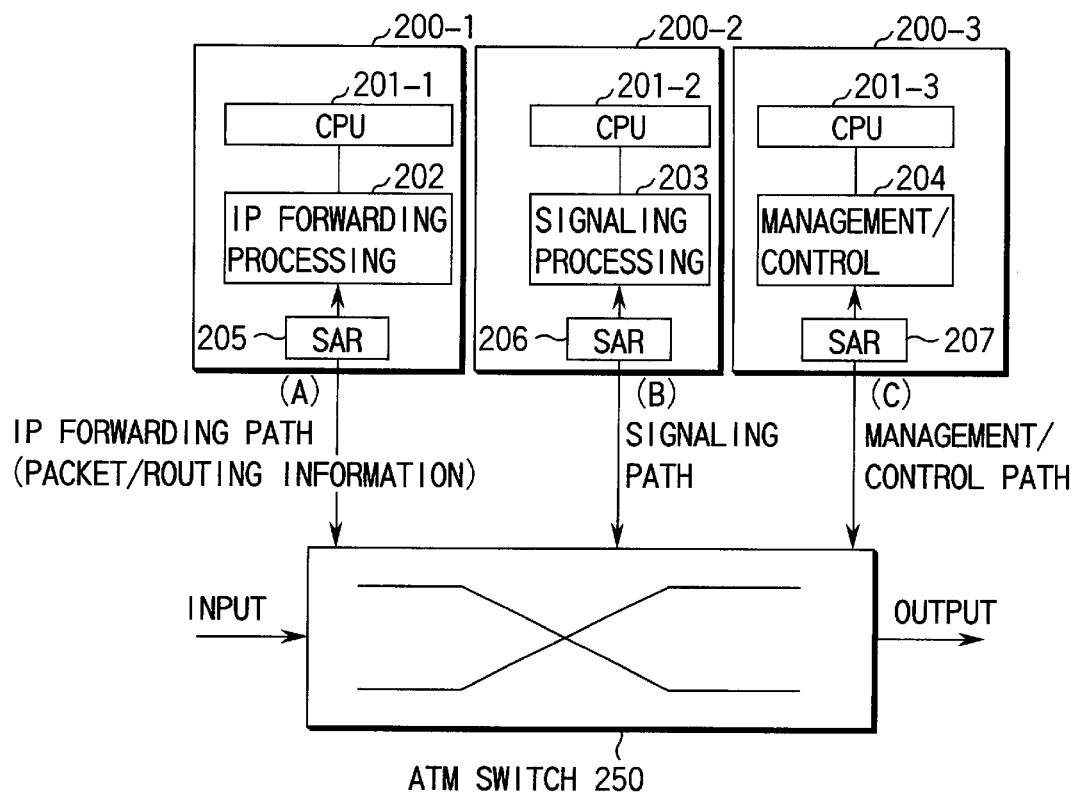
FIG. 26 is a diagram showing a modification of the ATM relay device shown in FIG. 24.

Note that the CPU 201 is shared by the independent buses, as described above. Alternatively, the CPU 201 may be provided in correspondence with each of the IP forwarding processing function 202, signaling processing function 203, and management/control function 204 (CPUs 201-1, 201-2, and 201-3), as shown in FIG. 26.

Furthermore, the communication paths A, B, and C that connect the ATM switch 250 and IP processing unit 200 are not limited to ATM but may use other communication schemes.

A case will be explained below wherein the present invention is applied to a cell switch router (CSR) that adopts cut-through forwarding in place of hop-by-hop forwarding mentioned above.

When the ATM switch and IP processing unit are concentratedly connected via a single physical path, the software processing load concentrates on the IP processing unit 200 upon forwarding IP packets, executing signal processing, and making management/control communications even in the CSR scheme.

The basic principle of the cell switch router (CSR) will be described again using FIGS. 27A and 27B to emphasize the effect of this embodiment, although it has already been described in the background art.

Figures 27A, 27B:
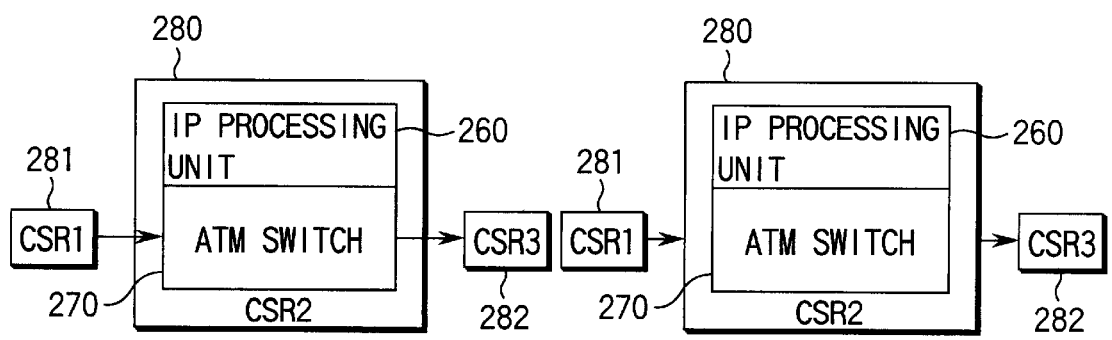
FIGS. 27A and 27B are diagrams for explaining the basic principle of a cell switch router (CSR)

FIG. 27A shows normal IP forwarding, i.e., hop-by-hop forwarding that forwards a packet by finding the next address NEXT HOP by searching for an IP address. More specifically, ATM cells of an IP packet input from CSR1 (281) are routed to an IP processing unit 260 by an ATM switch 270 in CSR2 (280). The IP processing unit 260 generates an IP packet, and finds the next address NEXT HOP by search on the basis of the IP address of that packet. The ATM switch 270 then forwards that packet to the next forwarding destination (CSR3 in this case). In a normal IP or the like, in a communication with a short session time, hop-by-hop forwarding as normal IP routing is done. However, in a communication with a long session time such as FTP, TELNET, or the like, forwarding in the layer-2 level, i.e., cut-through forwarding in an ATM switch is done.

FIG. 27B shows such cut-through forwarding. In this case, the IP processing unit 260 in CSR2 (280) sets a cut-through path between CSR1 (281) and CSR3 (282) with respect to the ATM switch 270 using the CSR protocol. As a result of this setting, a "call" for setting a cut-through communication path is generated with respect to the IP processing unit 260 and ATM switch 270. In this manner, the IP forwarding load is reduced, but a problem of, e.g., signaling processing occurs in the IP processing unit 260, and both the management and control of the ATM switch 270 become the traffic load.

However, in this embodiment, since processes are distributed in units of support functions, even the signaling processing function does not influence IP relay processes.

Figure 28:
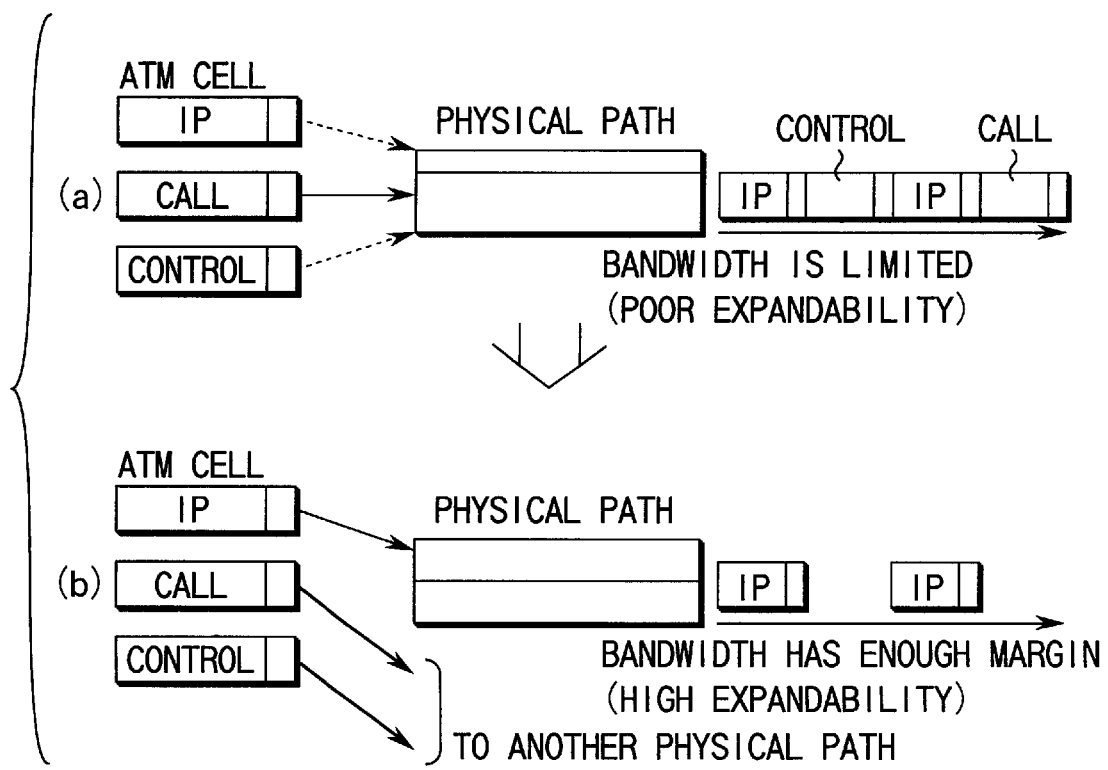
FIG. 28 is a view for explaining bandwidth use of a physical path by a conventional IP relay device and that of this embodiment in comparison with each other.

(a) and (b) of FIG. 28 are views for explaining bandwidth use of a physical path by a conventional IP relay device and bandwidth use in this embodiment in comparison with each other.

Conventionally, as shown in (a) of FIG. 28, communications for forwarding IP packets, signaling processing, and management/control are done via a concentrated physical path in communications between an IP processing unit 240 and ATM switch 200. However, such communications narrow down the forwarding bandwidth itself of IP packets, and the efficiency of IP packet relay processes cannot be improved. In a future high-speed, large-capacity network, since packet traffic increases, efficient hop-by-hop forwarding regains its importance. In such arrangement using a concentrated path, the bandwidth of the physical path is limited as the speed and capacity of the network increase, resulting in a system with poor expandability.

To solve this problem, in this embodiment, as shown in (b) of FIG. 28, since a communication path is physically separated to execute processes in units of functions, the bandwidth can have an enough margin, and by expanding the respective physical paths, an expandable arrangement can be provided.

As described above, in this embodiment, since the communication paths for the IP forwarding processing function, signaling processing function, and management/control function after the ATM switch are physically independently laid out to execute the corresponding processes, the loads of the respective functions are distributed, thus reducing software processes. Since the forwarding bandwidth itself of IP packets is independently assured and a larger bandwidth can be used, the system expandability can be improved. Hence, IP packet forwarding processing, signaling processing, and management/control processing can be efficiently done. In this manner, relay processes of high-speed, large-capacity data can be implemented without increasing the operation speed and processing speed (CPU performance).

By combining with an ATM switch, since load distribution can be realized by queuing in units of ATM connections, IP relay processes in a future high-speed, large-capacity network can be coped with without increasing cost. According to the second embodiment described above, software processes of the IP forwarding processing, signaling processing, and management/control functions can be reduced, and IP packet forwarding processing, signaling processing, and management/control processing can be efficiently done. In this manner, relay processes of high-speed, large-capacity data can be implemented without increasing the operation speed and processing speed (CPU performance).

Third Embodiment

The third embodiment of the present invention will be described in detail below with reference to the drawings.

Figure 29:
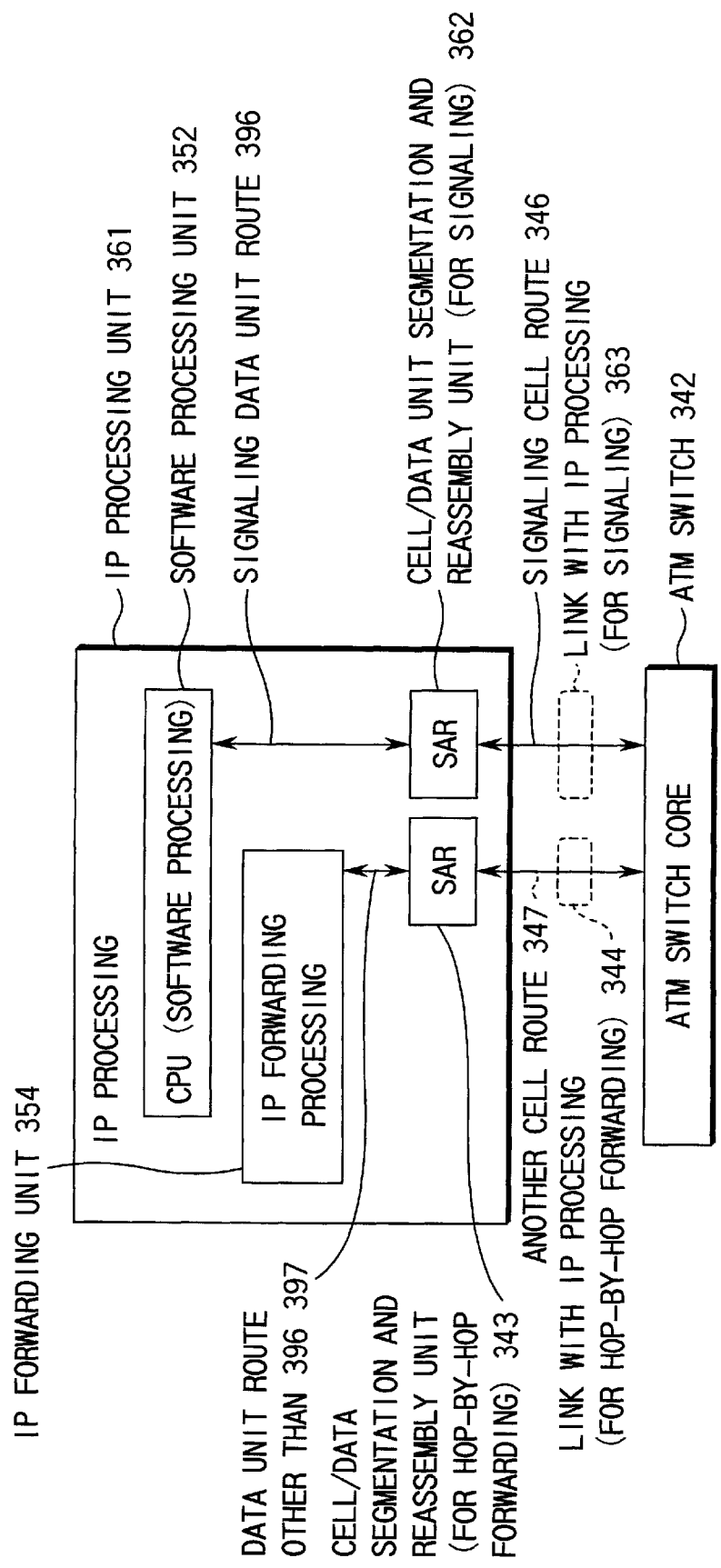
FIG. 29 is a diagram showing the schematic arrangement of a CSR relay device to which an ATM relay device according to the third embodiment of the present invention is applied.

FIG. 29 is a diagram showing the schematic arrangement of a CSR relay device to which an ATM relay device according to the third embodiment of the present invention is applied. In the arrangement of this embodiment, an ATM switch 342 is connected to an IP processing unit 361 via a link 363 with IP processing for signaling and also via a link 344 with IP processing for forwarding, which is physically different from the link 363 with IP processing for signaling. That is, a path for forwarding processing (in this case, hop-by-hop forwarding) is physically different from that for signaling processing.

More specifically, the ATM switch 342 is connected to a cell/data unit segmentation and reassembly unit (to be referred to as a signaling SAR hereinafter) 362 via a signaling cell route 346, and the signaling SAR 362 is connected to a software processing unit 352 including a CPU via a signaling data unit route 396. The aforementioned signaling cell route 346, signaling SAR 362, signaling data unit route 396, and software processing unit 352 construct signaling processing means.

Also, the ATM switch 342 is connected to a cell/data unit segmentation and reassembly unit (to be referred to as a hop-by-hop forwarding SAR hereinafter) 343 independent from the signaling SAR 362, via another cell route 347, which is physically different from the routes for signaling processing. The hop-by-hop forwarding SAR 343 is connected to an IP forwarding unit 354 via a data unit route 397. The aforementioned cell route 347, hop-by-hop forwarding SAR 343, data unit route 397, and IP forwarding unit 354 construct forwarding processing means.

In this embodiment, as means for improving hop-by-hop forwarding performance of forwarding, high-speed packet forwarding is implemented using an IP packet forwarding table that detects the header addresses of the IP and TCP/UDP layer by hardware, and uses both an associative memory and hardware cache search, without executing software processes by the CPU. Such forwarding is described in Japanese Patent Application No. 9-252161 by the present applicant.

The operation of the CSR relay device shown in FIG. 29 will be described below. Cells input to the ATM switch 342 in FIG. 29 are input to the IP processing unit 361 via dedicated links according to their types. More specifically, signaling cells are transferred to the signaling SAR 362, and other cells are transferred to the hop-by-hop forwarding SAR 343. These cells are reassembled to data units by the corresponding SARs.

The data unit reassembled by the signaling SAR 362 is directly transferred to the software processing unit 352 without being input to the IP forwarding unit 354, and undergoes software processes by the CPU.

On the other hand, the data unit reassembled by the hop-by-hop forwarding SAR 343 is transferred to the IP forwarding unit 354, and undergoes hop-by-hop forwarding. More specifically, it is checked if the IP address of the data unit matches that registered in a table in an associative memory. If the two IP addresses match, address information to be sent to the next relay device is replaced according to that address information, and the data unit is segmented into cells by the hop-by-hop forwarding SAR 343 and those cells are output to the ATM switch 342.

Assume that rewrite and management of the table of the associative memory are done by software processes of the CPU.

As described above, according to this embodiment, since signaling cells and other cells are transferred using physically different links and independently undergo their processes, high-speed signaling performance for SVC control can be obtained while avoiding an increase in signaling traffic volume, especially upon supporting an SVC. On the other hand, since hop-by-hop forwarding is done by hardware in the IP forwarding unit 354 in place of forwarding cells to be processed to the CPU of the software processing unit 352, the packet forwarding performance upon hop-by-hop forwarding can be greatly improved.

Figure 30:
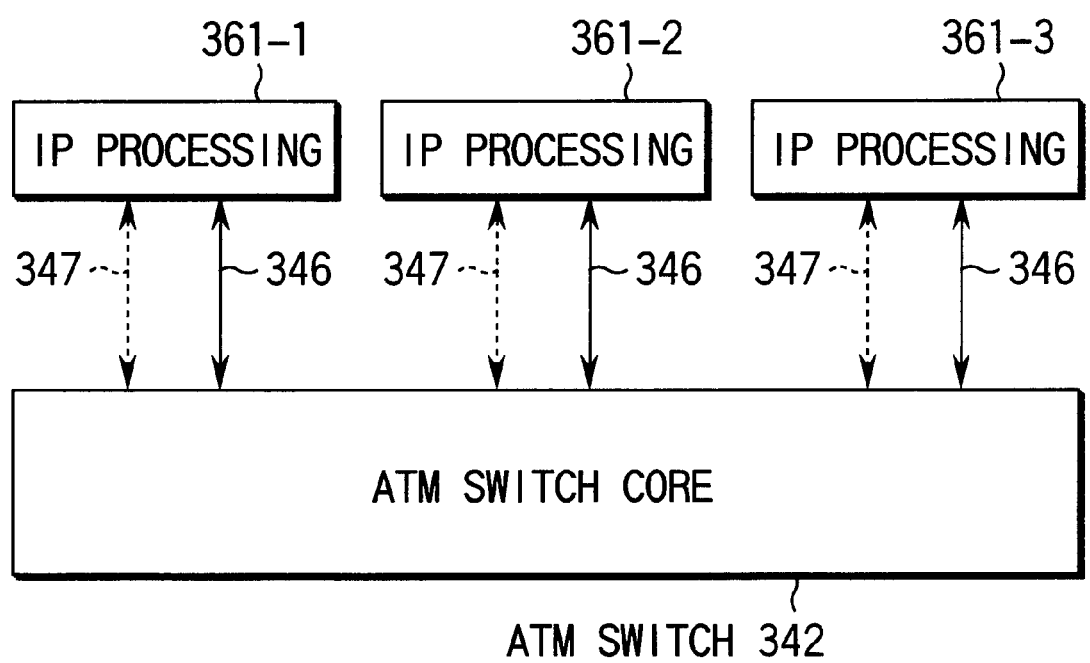
FIG. 30 is a diagram showing a modification of the CSR relay device shown in FIG. 29.

FIG. 30 shows a modification of the aforementioned embodiment. In this modification, a plurality of IP processing units 361-1, 361-2, and 361-3 are connected to the ATM switch 342. Assume that each of the IP processing units 361-1, 361-2, and 361-3 has the arrangement shown in FIG. 29. Since this arrangement has a plurality of arrangements equivalent to that of this embodiment shown in FIG. 29, the aforementioned effects can be synergistically obtained.

According to the third embodiment described above, especially when a network packet relay device based on the CSR scheme supports an SVC, high signaling performance can be obtained, and packet forwarding performance upon hop-by-hop forwarding can be greatly improved.

A modification of the third embodiment of the present invention will be described below. In the CSR relay device described in the third embodiment, the IP forwarding unit 354 is implemented by hardware to improve hop-by-hop forwarding performance, which disturbs essential performance of the CSR. This IP forwarding unit 354 must execute processes for determining an IP packet which includes a protocol and addressed to the self terminal, and a packet whose hop-by-hop forwarding processing method is unknown, and passing these packets to the software processing unit 352, and processes for receiving, from the software processing unit 352, an outbound IP packet from the self terminal, packets of unknown processing methods, or a packet generated as a result of processing that packet.

Furthermore, when a given destination address is not entered in the IP forwarding unit 354, the address entry of the IP forwarding unit 354 is updated. Especially, packets of unknown processing methods include those whose forwarding destination addresses are not entered in the IP forwarding unit 354, and upon outputting the corresponding packet, the address entry of the IP forwarding unit 354 must be updated.

Such processes disturb improvement of hop-by-hop forwarding performance of the IP forwarding unit 354, and make the structure of the IP forwarding unit 354 complicated.

Hence, this modification aims at providing an ATM relay device which can improve essential performance of the CSR by further improving hop-by-hop forwarding performance, and can simplify the structure of the device.

Figure 31:
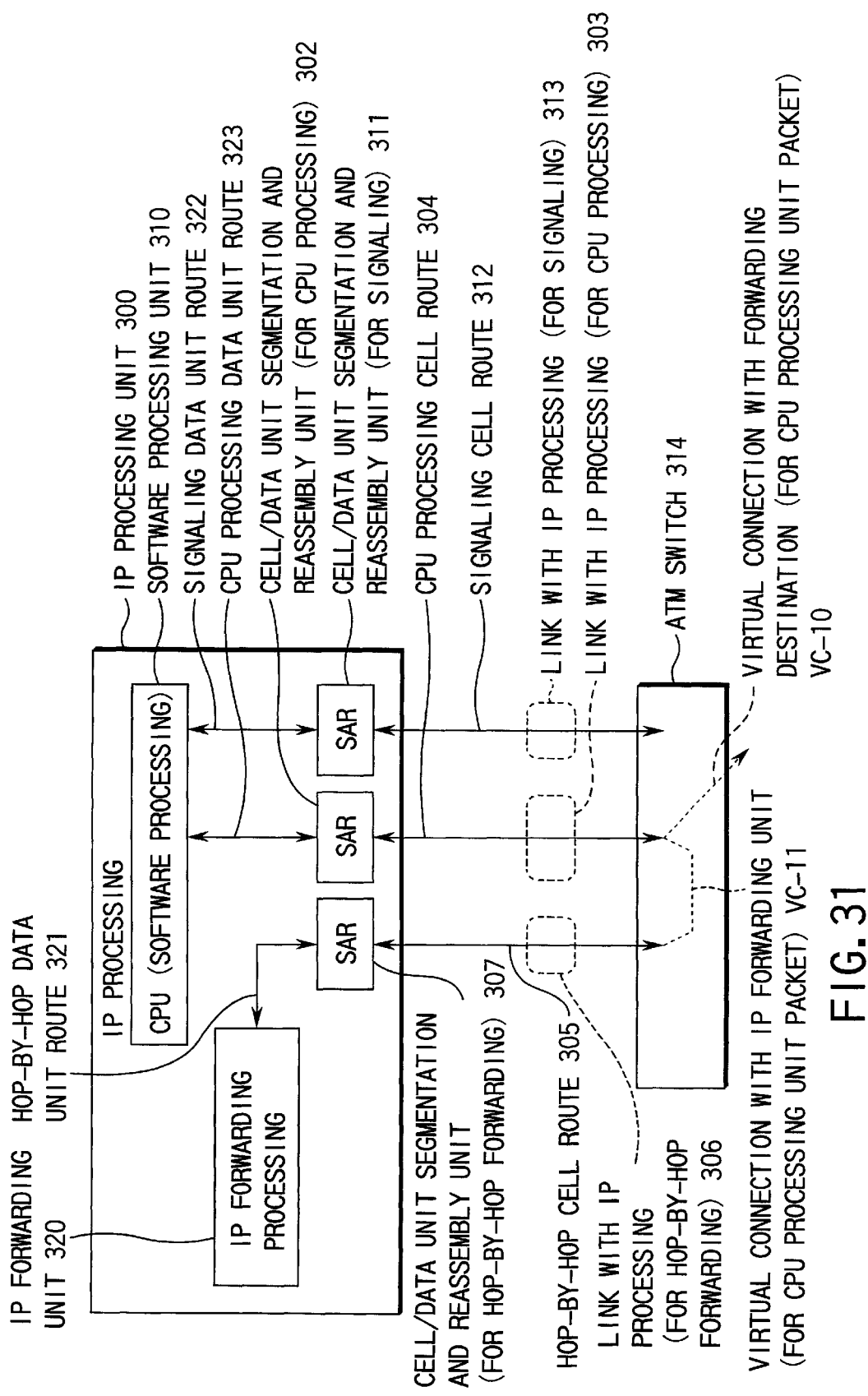
FIG. 31 is a diagram showing the schematic arrangement of a CSR relay device to which an ATM relay device according to a modification of the third embodiment of the present invention is applied.

This modification will be described in detail below with reference to the drawings. FIG. 31 is a diagram showing the schematic arrangement of a CSR relay device to which an ATM relay device according to a modification of the present invention is applied. In the arrangement of this embodiment, an ATM switch 314 is connected to an IP processing unit 300 via a link 313 with IP processing for signaling and also via a link 306 with IP processing for hop-by-hop forwarding, which is physically different from the link 313 with IP processing for signaling.

Furthermore, the ATM switch 314 is connected to the IP processing unit 300 via a link 303 with IP processing for software processing (CPU processing), which is physically different from both the links 313 and 306 with IP processing for signaling and forwarding. In this manner, a path for forwarding processing (in this case, hop-by-hop processing), a path for signaling processing, and a path for software processing are physically different from each other.

More specifically, the ATM switch 314 is connected to a cell data unit segmentation and reassembly unit (to be referred to as a signaling SAR hereinafter) 311 via a signaling cell route 312, and the signal SAR 311 is connected to a software processing unit 310 including a CPU via a signaling data unit route 322. The signaling cell route 312, signaling SAR 311, signal data unit route 322, and software processing unit 310 construct signaling processing means.

On the other hand, the ATM switch 314 is connected to a cell/data unit segmentation and reassembly unit (to be referred to as a hop-by-hop forwarding SAR) 307 via another cell route (hop-by-hop cell route) 305 which is physically different from the aforementioned routes for signaling processing. The hop-by-hop forwarding SAR 307 is connected to an IP forwarding unit 320 via a hop-by-hop data unit route 321. The cell route 305, hop-by-hop forwarding SAR 307, hop-by-hop data unit route 321, and IP forwarding unit 320 construct forwarding processing means.

The ATM switch 314 is also connected to a cell/data unit segmentation and reassembly unit 302 for CPU processing via a CPU processing cell route 304 which is physically different from the aforementioned signaling cell route 312 and hop-by-hop cell route 305. The cell/data unit segmentation and reassembly unit 302 for CPU processing is connected to the software processing unit 310 including a CPU via a CPU processing data unit route 323. In this embodiment, as means for improving hop-by-hop forwarding performance of forwarding, high-speed packet forwarding may be implemented using an IP packet forwarding table that detects the header addresses of the IP and TCP/UDP layer by hardware, and uses both an associative memory and hardware cache search, without executing software processes by the CPU. Such forwarding is described in Japanese Patent Application No. 9-252161 by the present applicant.

The operation of the CSR relay device shown in FIG. 31 will be described below. Cells input to the ATM switch 314 in FIG. 31 are input to the IP processing unit 300 via dedicated links according to their types. More specifically, signaling cells are transferred to the signaling SAR 311, and other cells are transferred to the hop-by-hop forwarding SAR 307. These cells are reassembled to data units by the corresponding SARs.

The data unit reassembled by the signaling SAR 311 is directly transferred to the software processing unit 310 without being input to the IP forwarding unit 320, and undergoes software processes by the CPU.

On the other hand, the data unit reassembled by the hop-by-hop forwarding SAR 307 is transferred to the IP forwarding unit 320, and undergoes hop-by-hop forwarding. More specifically, it is checked if the IP address of the data unit matches that registered in a table in an associative memory. If the two IP addresses match, address information to be sent to the next relay device is replaced according to that address information, and the data unit is segmented into cells again by the hop-by-hop forwarding SAR 307 and those cells are output to the ATM switch 314.

Assume that rewrite and management of the table of the associative memory are done by software processes of the CPU.

Also, this device has a VC table memory in which address information, that is, VC information, is registered, and the address of the VC table memory where corresponding VC information is stored is stored in an area of the associative memory that matches the IP address of a packet. The IP address of a packet addressed to the self terminal is made to correspond to a virtual connection VC-11 to transfer such packet to the software processing unit 310. Furthermore, a data unit whose hop-by-hop forwarding processing method is unknown is also made to correspond to the virtual connection VC-11 to transfer that packet as a non-IP packet to the software processing unit 310. The virtual connection VC-11 may be broken up into a plurality of virtual connections.

When the IP forwarding unit 320 receives an IP packet addressed to the self terminal such as FANP protocol data or the like, that packet is assigned address information corresponding to the virtual connection VC-11 according to its IP address, and is then segmented into cells by the hop-by-hop forwarding SAR 307. The cells are then output to the ATM 314 again. The ATM switch 314 determines that those cells are to be transferred from the virtual connection VC-11 to the software processing unit 310, and transfers the cells to the CPU processing SAR 302 via the CPU processing cell route 304. The CPU processing SAR 302 reassembles the cells to obtain a packet, and the reassembled IP packet is passed to the software processing unit 310 by means of the CPU.

Furthermore, when the IP forwarding unit 320 receives an IP packet whose hop-by-hop forwarding processing method is unknown or a non-IP packet data unit, such packet is assigned address information corresponding to the virtual connection VC-11 as a non-IP packet, and is segmented into cells by the hop-by-hop forwarding SAR 307. The cells are then output to the ATM switch 314 again.

The ATM switch 314 determines that those cells are to be forwarded from the virtual connection VC-11 to the software processing unit 310, and transfers the cells to the CPU processing SAR 302 via the CPU processing cell route 304. The CPU processing SAR 302 reassembles the cells to obtain a packet, and the reassembled IP packet is passed to the software processing unit 310 by means of the CPU.

On the other hand, an IP packet issued by the self terminal from the software processing unit 310 is assigned a destination IP address by the software processing unit 310, and is assigned address information corresponding to the virtual connection VC-11 by the CPU processing SAR 302 to be forwarded by the hop-by-hop forwarding function of the IP forwarding unit 320. Then, that IP packet is delivered to the IP forwarding unit 320 via the ATM switch 314, cell route 305, and SAR 307, and is forwarded hop by hop.

Furthermore, the data unit of a non-IP packet whose hop-by-hop forwarding processing method is unknown in the IP forwarding unit 320 is assigned address information corresponding to a virtual connection VC-10 and is sent to be forwarded to a destination without being transferred to the IP forwarding unit 320.

As described above, in this embodiment, since data forwarding routes between the IP forwarding unit 320 and software processing unit 310 are physically separated to reduce the load on the IP forwarding unit 320, the packet forwarding performance upon hop-by-hop forwarding can be improved, and the arrangement of the IP forwarding unit 320 can be simplified. Also, since the prior art techniques can be directly used, the arrangements of the functions other than the IP forwarding unit 320 can also be simplified.

Figure 32:
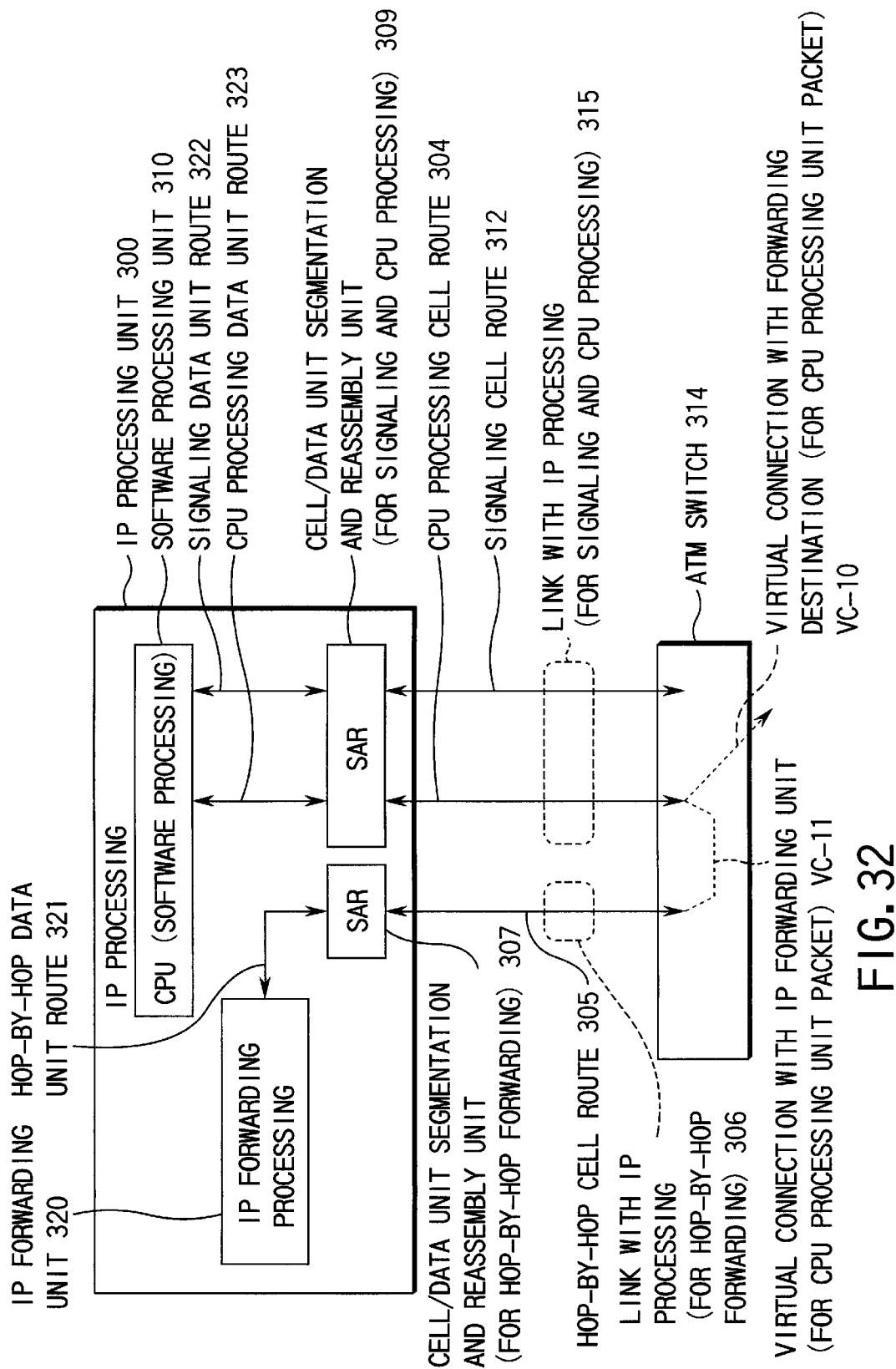
FIG. 32 is a diagram showing a modification of the ATM relay device shown in FIG. 31.

FIG. 32 is a diagram showing a modification of the aforementioned embodiment. In this modification, a link for signaling processing and that for CPU processing are connected to the IP processing unit 300 via a link 315. More specifically, those links are connected to the IP processing unit 300 via a physically identical link. With such arrangement, since the arrangement shown in FIG. 31 can be further simplified, the aforementioned effects can be synergistically obtained in a communication pattern that requires less signaling processing.

According to the aforementioned third embodiment and modification, in a network packet relay device based on the CSR scheme, the packet forwarding performance upon hop-by-hop forwarding can be greatly improved especially in processing of packets addressed to the self terminal and non-IP packets.

Figure 33:
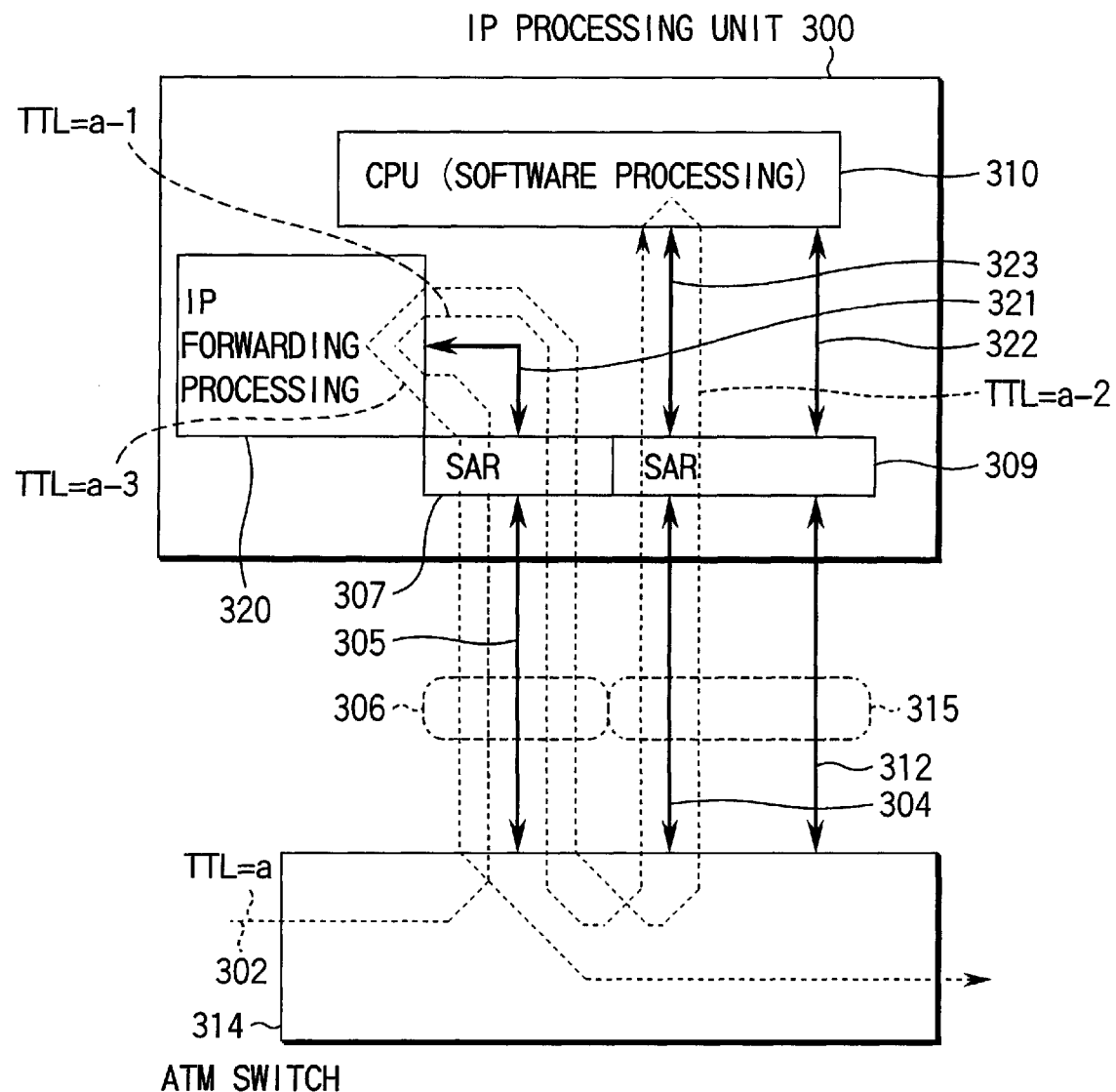
FIG. 33 is a diagram showing the packet flows and TTL arithmetic operations by the schematic arrangement of the ATM relay device shown in FIG. 32.

FIG. 33 is a diagram showing the packet flows and TTL arithmetic operations by the schematic arrangement of the ATM relay device shown in FIG. 32. In the ATM relay device of the aforementioned embodiment, an IP packet that passes through the IP forwarding unit 320 undergoes a TTL (Time To Live) subtraction more than the actual processing time every time it passes through the IP forwarding unit 320. In such case, even through a packet addressed to the self terminal has reached the IP processing unit 300, that packet cannot reach the software processing unit 320 as a result of subtraction of the TTL value. On the other hand, since an IP packet whose destination is unknown undergoes at least three TTL value subtractions, i.e., twice in the IP forwarding unit 320 and once in the software processing unit 310, the forwarding distance may be shortened in terms of the number of network nodes it must traverse to get to the destination, or the packet may be discarded in the ATM relay device. Such shortcomings will be described in more detail below.

FIG. 33 shows an example of TTL subtractions according to the packet flows. When an IP packet addressed to the self terminal is forwarded along the IP packet forwarding route 302, it undergoes one TTL subtraction in the IP forwarding unit 320. In this case, when the subtrahend in the IP forwarding unit 320 is 1 or TTL value a of the IP packet (not shown) is 1, since the TTL value after subtraction becomes 0, the IP packet can no longer be forwarded to the software processing unit 310.

On the other hand, an IP packet whose destination is unknown undergoes TTL subtractions for the first time in the IP forwarding unit 320, for the second time in the software processing unit 310, and for the third time in the IP forwarding unit 320 upon forwarding after destination solution.

When the subtrahend in the IP forwarding unit 320 is 1 and that in the software processing unit 310 is 1, the TTL value after subtractions becomes a−3, as shown in FIG. 33. Note that the IP forwarding unit 320 is implemented by hardware, and can implement such subtraction within a time sufficiently shorter than common unit time of TTL subtraction. Also, the total processing time in the ATM relay device is often less than the unit time, and in such case, the TTL subtrahend in the entire ATM relay device can be set at 1. However, as described above, the subtrahend increases in the ATM relay device of the above embodiment.

Hence, an objective herein is to provide an ATM relay device which can reliably receive a packet addressed to the self terminal without executing TTL subtractions more than required, and can improve the packet forwarding distance in terms of the number of network nodes it must traverse to get to the destination. In order to achieve this objective, IP forwarding processing means and software processing means via a third link in the ATM relay device are provided with means for adjusting TTL subtractions for specific IP packets. This will be explained in detail below.

Figure 34:
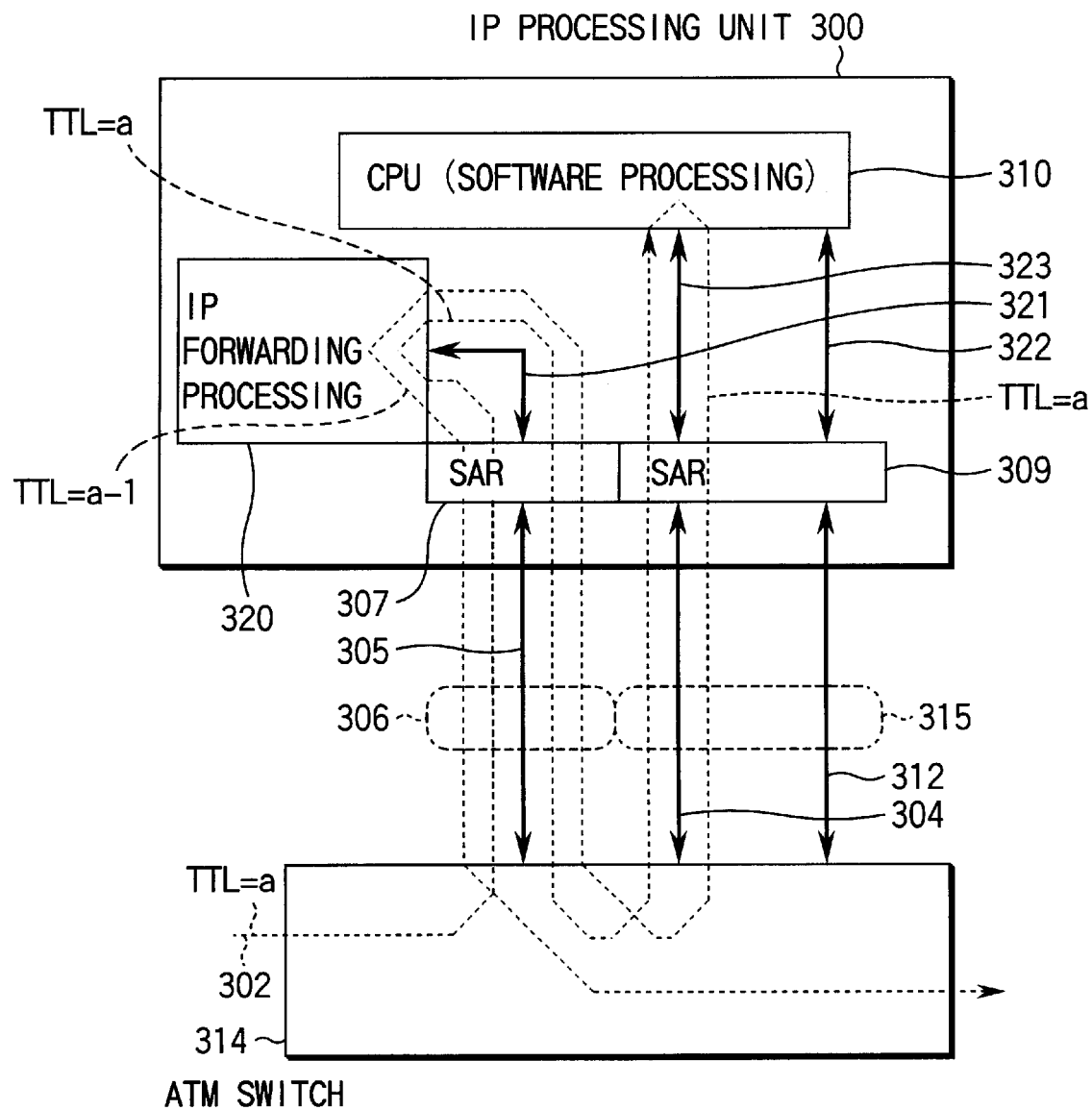
FIG. 34 is a diagram showing an example of the arrangement of the ATM relay device and an example of IP packet forwarding routes and TTL subtractions.
Figure 35:
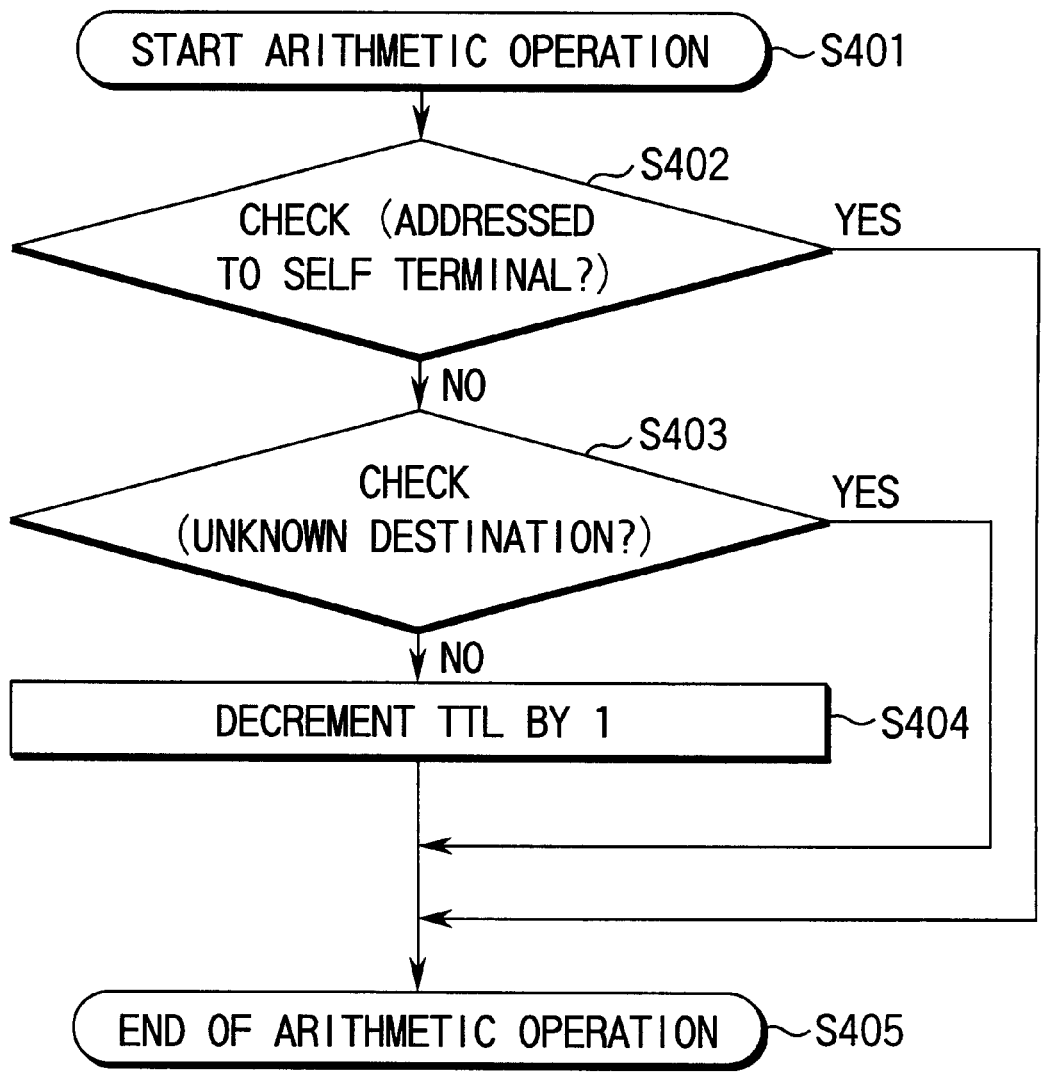
FIG. 35 is a flow chart of TTL arithmetic processes applied to an IP forwarding unit of this embodiment.
Figure 36:
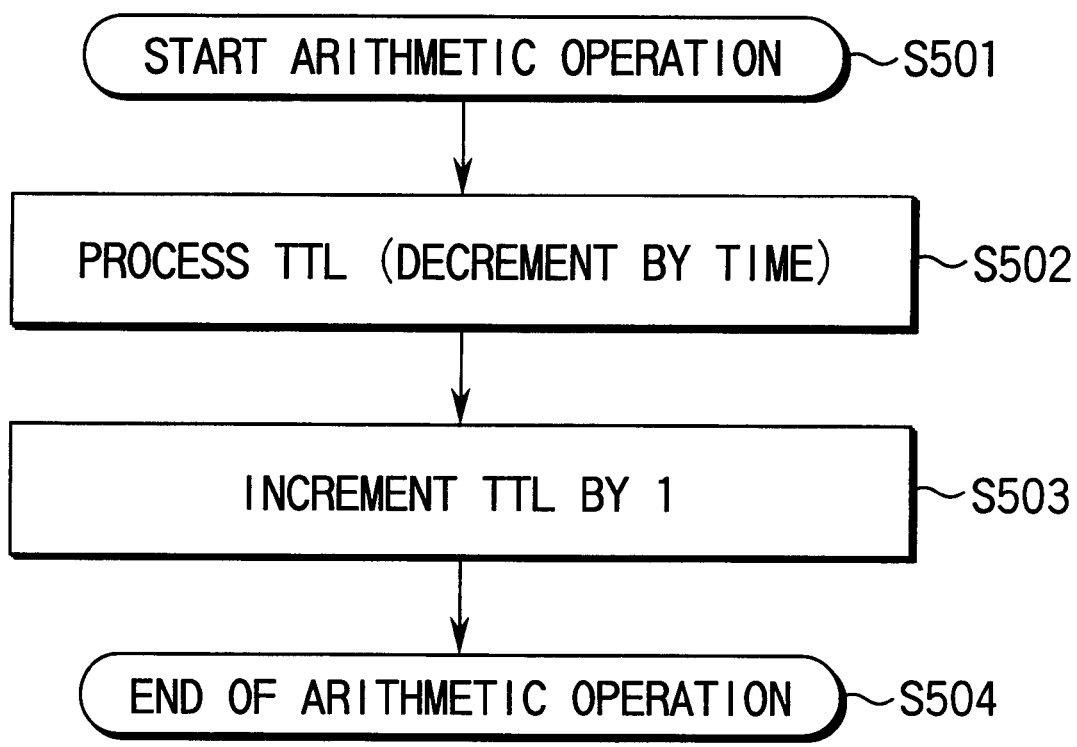
FIG. 36 is a flow chart of TTL arithmetic processes applied to a software processing unit of the present invention.

FIG. 34 shows an example of the arrangement of the ATM relay device and an example of IP packet forwarding routes and TTL subtractions, FIG. 35 shows an example of a flow chart (steps S401 to S405) of TTL arithmetic processing applied to the IP forwarding unit 320, and FIG. 36 shows an example of a flow chart (steps S501 to S504) of TTL arithmetic processing applied to the software processing unit 310.

An ATM switch 314 is connected to an IP processing unit 300 via a link 315 with IP processing for signaling and also via a link 306 with IP processing for hop-by-hop forwarding, which is physically different from the link 315 with the IP processing unit 300.

In other words, a path for forwarding (in this case, hop-by-hop forwarding) and a path for signaling processing and software processing are physically different from each other.

More specifically, the ATM switch 314 is connected to an SAR 309 via a signaling cell route 312, and the SAR 309 is connected to a software processing unit 310 including a CPU via a signaling data unit route 322. The aforementioned signaling cell route 322, SAR 309, and software processing unit 310 construct signaling processing means.

On the other hand, the ATM switch 314 is connected to an SAR 307 independent from the SAR 309 via another cell route 305, which is physically different from the route for signaling processing. The SAR 307 is connected to an IP forwarding unit 320 via a data unit route 321. The above-mentioned cell route 305, SAR 307, and IP forwarding unit 320 construct forwarding processing means.

Furthermore, the ATM switch 314 is connected to the SAR 309 via still another cell route 304 which is different from the routes for signaling and forwarding. The SAR 309 is connected to the software processing unit 310 including a CPU via a data unit route 323. The cell route 304, SAR 309, and software processing unit 310 construct CPU processing means for packets.

In the aforementioned arrangement, the IP forwarding unit 320 checks based on the destination of the received IP packet if that packet is addressed to the self terminal (step S402) or if its destination is unknown (step S403) to determine whether or not a TTL subtraction is executed, and then executes a TTL subtraction (step S404). The software processing unit 310 sends the packet to the IP forwarding unit 320 again. The TTL value of the packet is incremented by a numerical value subtracted by the IP forwarding unit 320.

In this case as well, forwarding by means of hardware processing described in Japanese Patent Application No. 9-252161 above may be done.

The operation of the ATM relay device shown in FIG. 34 will be described below. Cells externally input to the ATM switch 314 are input to the IP processing unit 300 via the dedicated links according to their types. More specifically, signaling cells are transferred to the SAR 309, and other cells are forwarded to the SAR 307. These cells are reassembled to data units by the corresponding SARs.

The data unit reassembled by the SAR 309 is directly transferred to the software processing unit 310 without being input to the IP forwarding unit 320, and undergoes software processes by the CPU.

On the other hand, the data unit reassembled by the SAR 307 is transferred to the IP forwarding unit 320, and undergoes hop-by-hop forwarding including TTL arithmetic operations. More specifically, it is checked if the IP address of the data unit matches that registered in a table in an associative memory. If the two IP addresses match, address information to be sent to the next relay device is replaced according to that address information, and the data unit is segmented into cells again by the hop-by-hop forwarding SAR 307 and those cells are output to the ATM switch 314.

Note that the tables on the associative memory are rewritten and managed by software processes of the CPU. On the other hand, a VC table memory in which address information, more specifically, virtual connection (VC) information is registered is provided, and the address of the VC table memory that stores corresponding VC information is stored in the area of the associative memory that matches the IP address of a packet.

In this case, the IP address of the self terminal corresponds to VC=VC1 as a virtual connection to be transferred to the CPU processor. Furthermore, a data unit with an unknown hop-by-hop forwarding scheme similarly corresponds to VC=VC1 as an unknown IP packet. VC may be divided into a plurality of virtual connections.

Upon receiving an IP packet addressed to the self terminal such as FANP protocol data or the like, the IP forwarding unit 320 does not execute any TTL subtraction. In this case, the packet is assigned address information corresponding to VC=VC1 on the basis of its IP address, and is segmented into cells by the SAR 307. The cells are then sent to the ATM switch 314.

The ATM switch 314 forwards the cells to the SAR 309 via the CPU processing cell route 304 on the basis of VC=VC1. The SAR 309 reassembles the cells to a data unit, and the reassembled IP packet is passed to the software processing unit 310 by means of the CPU without any TTL errors.

When the IP forwarding unit 320 receives the data unit of an IP packet whose hop-by-hop forwarding processing method is unknown, no TTL subtraction is executed, and the packet is assigned address information corresponding to VC=VC1 as an unknown IP packet. The packet is then segmented into cells by the hop-by-hop forwarding SAR 307, and is output again to the ATM switch 314.

The ATM switch 314 transfers the cells to the SAR 309 via the CPU processing cell route 310 on the basis of the value VC=VC1. The SAR 309 reassembles the cells to a data unit, and the reassembled data unit is passed to the software processing unit 310 by means of the CPU.

The software processing unit 310 executes destination analysis of the IP packet. An IP packet addressed to the self terminal and an IP packet whose next hop is unknown are not forwarded any more, and TTL values of other packets are subtracted by a value corresponding to the processing time in the software processing unit 310 (step S502 in FIG. 36) and are added with 1 (step S503) which is to be subtracted by the IP forwarding unit 320. The reason why 1 is added to the TTL value is that 1 is subtracted therefrom by the IP forwarding unit 320.

After destination information of this IP packet is registered in the IP forwarding unit 320, the packet that has undergone the TTL arithmetic processing is transferred to the IP forwarding unit 320 via the ATM switch 314.

For example, assume that the subtrahend of the TTL arithmetic operation is 1 in FIG. 35, the addend of the TTL arithmetic operation is 1 in FIG. 36, and the TTL subtrahend of the software processing unit 310 is 1.

In such case, in FIG. 34, when an IP packet whose hop is unknown is externally forwarded onto the IP packet forwarding path 302, the IP forwarding unit 320 does not execute any TTL subtraction, and the software processing unit 310 subtracts 1 from the TTL value of that packet and adds 1 thereto.

Furthermore, in the IP forwarding unit 320, since a new destination is registered by a series of processes, a process for subtracting 1 from the TTL value is done. More specifically, the TTL value is decremented by only 1 from when the IP packet is input to the ATM relay device of this embodiment until it is output therefrom.

As described above, in a network packet relay device based on the ATM relay scheme, an effect for preventing packet deletion in the packet relay device upon hop-by-hop forwarding and a decrease in forwarding distance in the network is expected especially in processing of packets addressed to the self terminal and IP packets to unknown destinations. More specifically, a packet addressed to the self terminal can be reliably received without executing TTL subtractions more than required, and the forwarding distance of a packet in terms of the number of network nodes it must traverse to get to the destination can be improved.

According to the third embodiment, high-speed signaling performance for Svc control can be obtained while avoiding an increase in signaling traffic volume, especially upon supporting an SVC. In addition, the packet forwarding performance upon hop-by-hop forwarding can be improved.

Also, in a network packet relay device based on the CSR scheme, the packet forwarding performance upon hop-by-hop forwarding can be greatly improved especially in processing of packets addressed to the self terminal and non-IP packets.

Furthermore, a packet addressed to the self terminal can be reliably received without executing TTL subtractions more than required, and the forwarding distance of a packet in terms of the number of network nodes it must traverse to get to the destination can be improved.

Fourth Embodiment

The fourth embodiment of the present invention will be described below with reference to the drawings.

Figure 37:
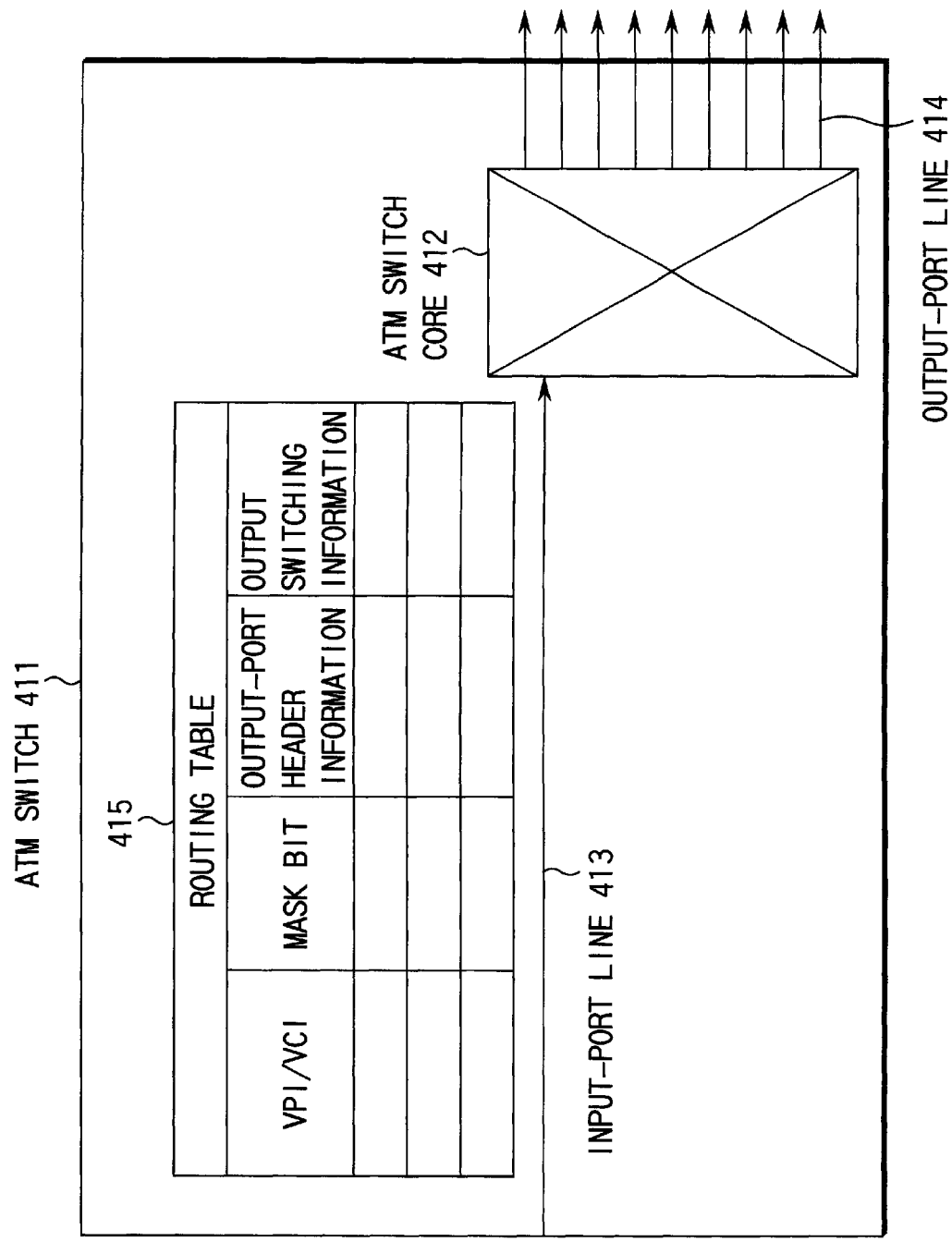
FIG. 37 is a block diagram showing the arrangement of an ATM switch according to the fourth embodiment of the present invention.

FIG. 37 is a diagram showing the schematic arrangement of an ATM switch according to the fourth embodiment of the present invention. Note that FIG. 37 does not illustrate components which are not directly associated with the present invention.

As shown in FIG. 37, an ATM switch 411 of the present invention is constructed by an ATM switch core 412, a plurality of input-port lines 413 and output-port lines 414 for inputting/outputting cells to be exchanged by this module 412, and a routing table 415. In the example of FIG. 37, only one input-port line 413 is illustrated for the sake of simplicity. On the other hand, the routing table 415 is located on each input-port line 413 side, but is illustrated as one example, although the layout of the routing table 415 depends only on the contents of cell switching information and is not directly associated with the present invention.

An ATM segments information to be sent from a transmitting terminal to a receiving terminal in units of 48 bytes, appends 5-byte header information thereto, and transmits information in units of so-called cells each having a fixed length, i.e., a total of 53 bytes. Cells sent onto the ATM network are switched (exchanged) at high-speed by hardware on the basis of their header information. The ATM switch 411 in FIG. 37 is used as a switch fabric that attains switching at that time, and is placed in a relay device of the ATM network.

Upon receiving a cell input from the input-port line 413, the ATM switch 411 reads a VPI/VCI value described in the header of that cell, and determines an output-port line 414 to which the cell is output with reference to the routing table 415.

The routing table 415 stores VPI/VCI information of an input cell, output-port header information to be converted upon outputting onto the output-port line 414, output switching information as information that indicates an output-port line 414 to which the cell is to be exchanged, and a mask bit pattern unique to each VPI/VCI in this embodiment.

More specifically, in the ATM cell switching scheme according to the present invention, the routing table 415 is searched on the basis of the VPI/VCI value described in the header of the input cell. In this case, the header information of the input cell is masked (by the AND of VPI/VCI field bits in the header) using a predetermined mask bit pattern stored in the routing table 415, and after that, the VPI/VCI field in the routing table 415 is searched.

The input cell is exchanged by the ATM switch core 412 according to output switching information in a column which hits at that time, and is output onto the predetermined output-port line 414. Upon cell switching, the cell header value is rewritten by output-port header information in the routing table 415, but only bits masked by the mask bits are written in the VPI/VCI field.

An algorithm at that time will be described below using the flow chart shown in FIG. 38.

Figure 38:
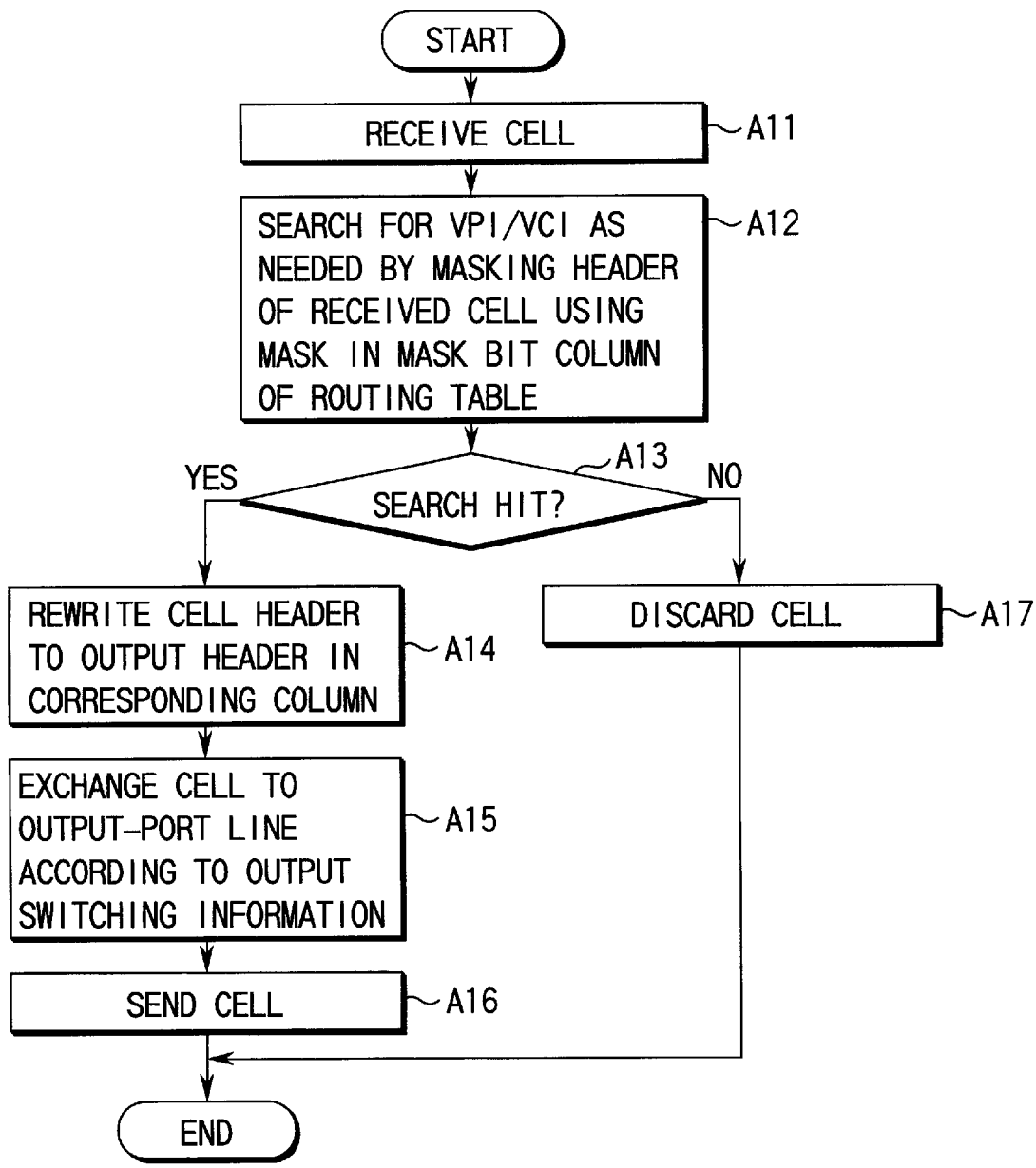
FIG. 38 is a flow chart showing a cell switching algorithm in the fourth embodiment.

FIG. 38 is a flow chart showing the cell switching algorithm. If a cell is input from the input-port line 413 (step A11), the ATM switch 411 extracts the VPI/VCI value from the header of that input cell, and checks that value in units of entries determined in the routing tale 415 (step A12).

In this checking, a mask bit pattern in the routing table 415 and the VPI/VCI value in the input cell header are ANDed, and the AND undergoes pattern matching with a value in the VPI/VCI field in the routing table 415.

As a result, if the two values completely match (the search hits), i.e., the VPI/VCI value masked by the mask bit pattern is present in the routing table 415 (Yes in step A13), the ATM switch 411 rewrites the header information of that cell on the basis of predetermined output header information stored in the routing table 415 (step A14). Note that the information rewriting method at that time will be described later with reference to FIG. 39.

After the header information is rewritten, the cell is switched (exchanged) via the ATM switch core 412 in accordance with predetermined output switching information (output line) stored in the routing table 415 (step A15), and is output onto the predetermined output-port line 414 (step A16).

On the other hand, if the two values do not match (the search mishits), i.e., the VPI/VCI value masked by the mask bit pattern is not present in the routing table 415 (No in step A13), the ATM switch 411 determines that the cell is an unnecessary cell, and discards it (step A17).

In this manner, a search is done as needed while masking the header information (VPI/VCI) of the input cell using predetermined mask bit patterns for each of entries of the routing table 415, and after the header information is rewritten by output header information, the cell is exchanged according to the output switching information. With this process, output-port switching information of cells input via each input-port line 413 can be commonized, and a plurality of VCCs can be multiplexed into one.

A cell multiplexing scheme according to the present invention will be explained below.

Figure 39:
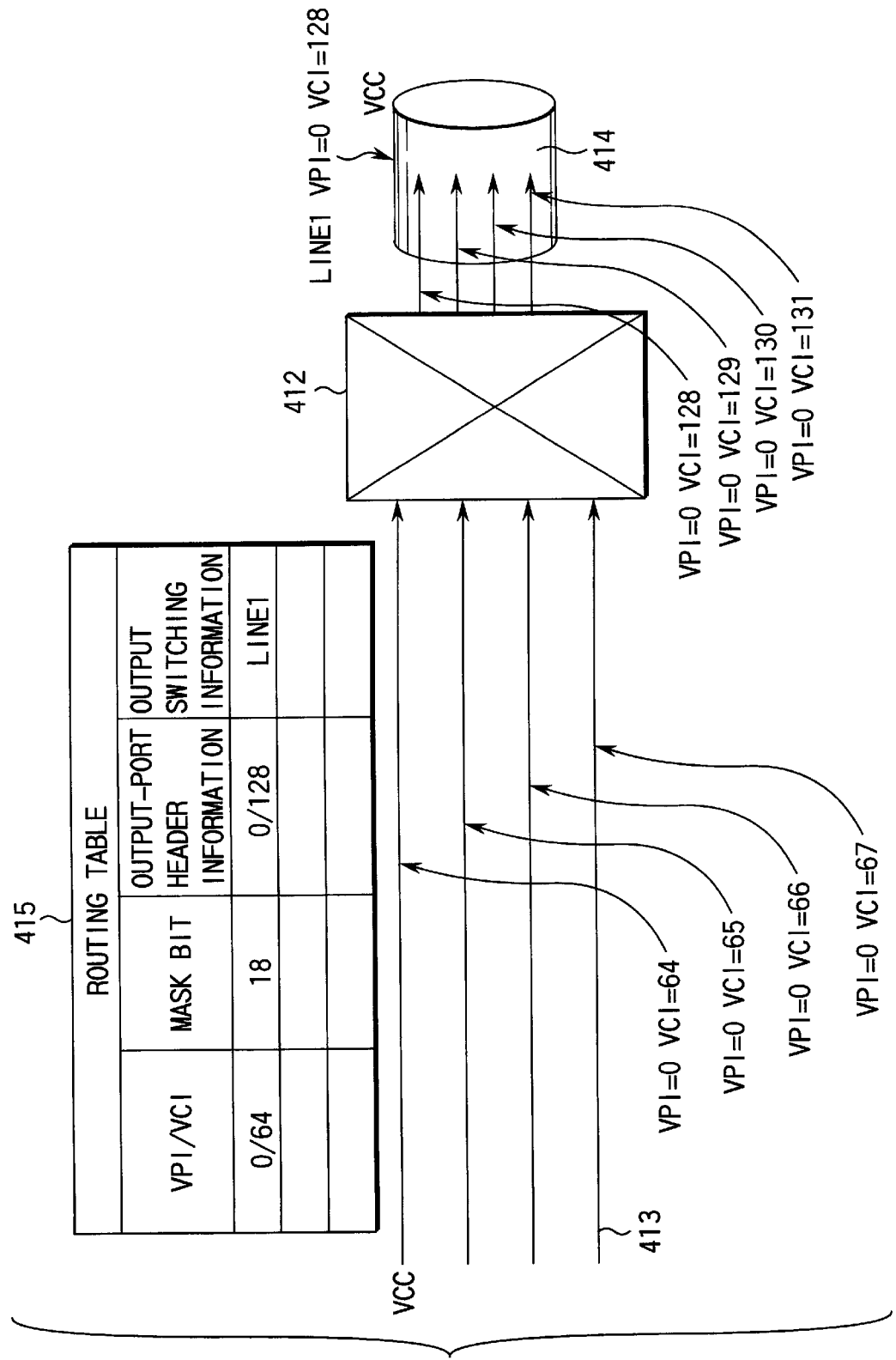
FIG. 39 is a diagram for explaining a cell multiplexing scheme in the fourth embodiment.

FIG. 39 is a diagram for explaining the cell multiplexing scheme in the fourth embodiment. Now assume that four groups of cells respectively having a VPI value="0" and VCI values ranging from "64" to "67" are respectively input via a plurality of input-port lines 413, as shown in FIG. 39. That is, assume that four VCCs (communication routes) are connected to the input side of the ATM switch 411.

Also, assume that the number of physical output-port lines 414 is one, and a single VCC indicated by VPI=0 and VCI=128 and a mask bit value "18" are set in the routing table 415. Note that this mask bit value "18" means to mask 18 bits from the head of the VPI/VCI field of an input cell by all "1"s.

In such arrangement, when cells are input via the respective input-port lines 413, the routing table 415 is searched after the VPI/VCI value in the header of each cell is masked by the mask bit value "18", and the header information of that cell is rewritten according to the search result. In this case, for example, the following logical operations are made:

(ALL "1"* MASK) & VPI/VCI} or output-port header information where MASK: mask bit pattern

*: EX-OR

&: AND or: OR

More specifically, a value obtained by setting all data of VPI/VCI at all "1"s and the mask bit pattern (a bit train consisting of "1"s for 18 bits) are EXORed, and the EXOR and VPI/VCI value of the input cell are ANDed. In this case, in a 5-byte header, an 8-bit VPI field for UNI (User-Network Interface) and 12-bit VPI field for NNI (Network Node Interface) are assured, and 16-bit VPI fields are assured. Hence, a value obtained by setting a VPI/VCI value for 24 bits (UNI) or 28 bits (NNI) at all "1"s, and a mask pit pattern consisting of "1"s for 18 bits are EXORed, and the EXOR and an actual VPI/VCI value are ANDed. The AND is ORed by output-port header information.

As a result, in the example shown in FIG. 39, the VCI values of the headers of the cells input from the input-port lines 413 are respectively rewritten to "128", "129", "130", and "131".

In this manner, the input four VCCs are respectively masked by the mask bit value "18", and are multiplexed on a single VCC indicated by VPI=0 and VCI=128 of LINE1. After that, in an ATM switch that exchanges multiplexed cells, a plurality of VCCs are exchanged using a single VCI by setting an identical mask pattern. The cells can be easily demultiplexed by setting a mask bit pattern as a 24-bit (UNI) or 28-bit (NNI) pattern as a full-bit pattern.

In the above embodiment, the mask bit value "18" has been exemplified, but may be arbitrarily set. For example, when a large mask bit value is set, the number of input VCCs to be multiplexed can be reduced. The range to be masked is not limited to a difference between VPI and VCI. That is, a pattern that can mask the VPI/VCI value of an input cell can be used to multiplex a plurality of VCCs into one.

A modification of the fourth embodiment of the present invention will be explained below.

In the fourth embodiment, unique mask bit patterns are set in units of VPI/VCI values. However, not so many mask bit patterns are required compared to the number of VCCs. Hence, in this modification, an independent table is prepared for only mask bit patterns, and cell header masking is done as needed in units of predetermined mask bit patterns, but routing table search directly uses the conventional scheme.

FIG. 40 shows the table arrangement of this modification. Unlike the fourth embodiment, an independent table is prepared for only mask bit patterns. More specifically, in this modification, a routing table 415a and mask pattern table 415b are independently assured in the ATM switch 411.

As shown in FIG. 40A, the routing table 415a stores VPI/VCI information of an input cell, output-port header information to be converted upon outputting onto the output-port line 414, and output switching information as information that indicates an output-port line 414 to which the cell is to be exchanged. Also, as shown in FIG. 40B, the mask pattern table 415b stores a plurality of different mask bit patterns, e.g., pattern 1, pattern 2, pattern 3, . . . , which are used for masking the VPI/VCI values of an input cell.

Figure 41:
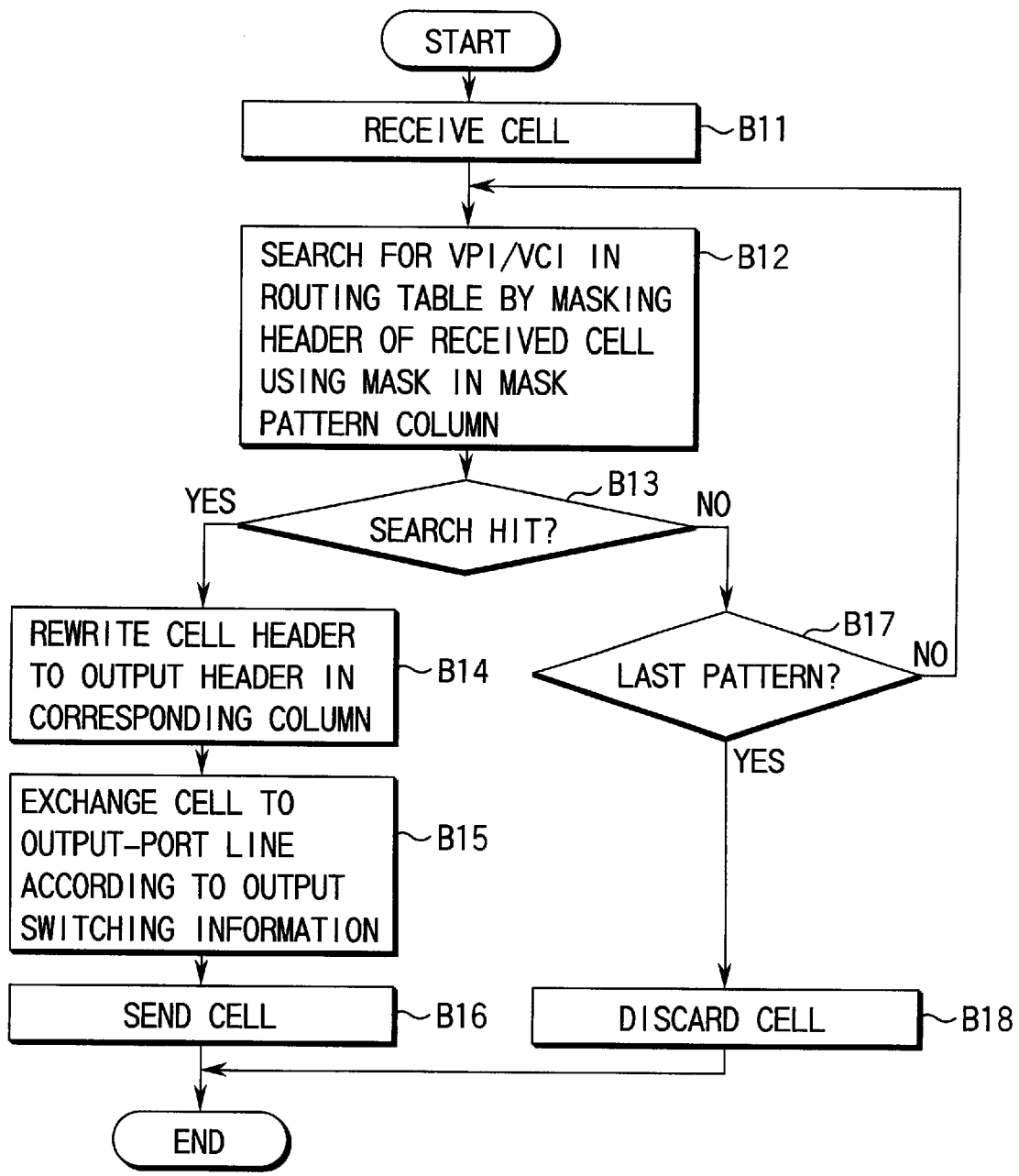
FIG. 41 is a flow chart showing a cell switching algorithm in a modification of the fourth embodiment.

FIG. 41 shows a cell switching algorithm in this modification. In this case, the checking end condition is not the last entry of the routing table 415a but the last entry of the mask pattern table 415b.

More specifically, if a cell is input from the input-port line 413 (step B11), the ATM switch 411 searches the routing table 415b while masking the VPI/VCI field of the input cell by extracting the VPI/VCI value from the header of that input cell to read out mask bit patterns one by one from the mask pattern table 415b (step B12).

If the search hits, i.e., the VPI/VCI value masked by a given mask bit pattern is present in the routing table 415a (Yes in step B13), the ATM switch 411 rewrites the header information of that cell on the basis of predetermined output header information stored in the routing table 415a (step B14), and switches (exchanges) the cell via the ATM switch core 412 according to predetermined output switching information (output line) stored in the table 415a (step B15), thus outputting the cell onto a predetermined output-port line 414 (step B16).

On the other hand, if the search mishits, i.e., the VPI/VCI value masked by a given mask bit pattern is not present in the routing table 415a (No in step B13), the ATM switch 411 reads out the next mask bit pattern from the mask pattern table 415b and conducts a similar search (No in step B17). As a result, if the search mishits even when the last mask bit pattern in the mask pattern table 415b is used (Yes in step B17), the ATM switch 411 determines that the cell is an unnecessary cell, and discards it (step B18).

In case of such algorithm, since routing table search can be implemented by an associative memory, the search logic can be implemented by simple hardware, although the degree of freedom in mask bit patterns is slightly limited. However, in such scheme, since each of a plurality of mask bit patterns must be read out to mask the input cell upon routing table search, it is preferable for starting the network to use a mask pattern uniquely determined for a cell group like in the fourth embodiment.

Figure 42:
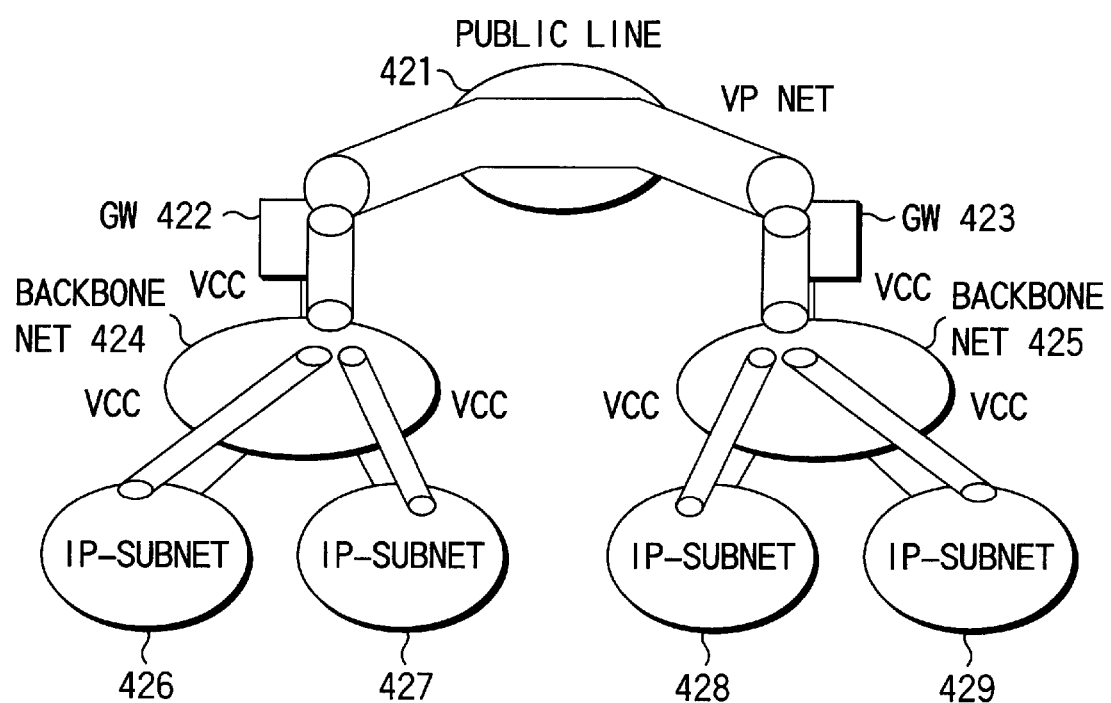
FIG. 42 is a diagram showing an example of the arrangement of an ATM network to which the method of the present invention is applied.

FIG. 42 shows an example in which the scheme of the present invention is applied to an actual network.

As shown in FIG. 42, when two GWs 422 and 423 are placed for a Public line 421 such as an NTT network or the like, and a single network is built by Backbone nets (backbone networks) 424 and 425 and IP-Subnets (subnetworks) 426 to 429 connected thereto, a plurality of VCCs can be multiplexed into one using the scheme for making a search after header information is masked upon searching for cell switching information, as described above. With this scheme, the VPI/VCI resource volume especially in the backbone network can be reduced, and even when different data packet flows are merged, these packets can be efficiently flowed without waiting until another packet forwarding ends.

According to the fourth embodiment described above, upon searching the routing table on the basis of header information of an input cell, since a search is made by masking some bits of that header information, a network which can commonize output-port switching information of the respective cells input via the respective input-port lines and can multiplex a plurality of VCCs into one can be realized. As a result, the VPI/VCI resource volume especially in the backbone network can be reduced, and the VCC merge scheme that never disturbs packet forwarding can be implemented.

Fifth Embodiment

The fifth embodiment of the present invention will be described in detail below with reference to the drawings.

Figure 43:
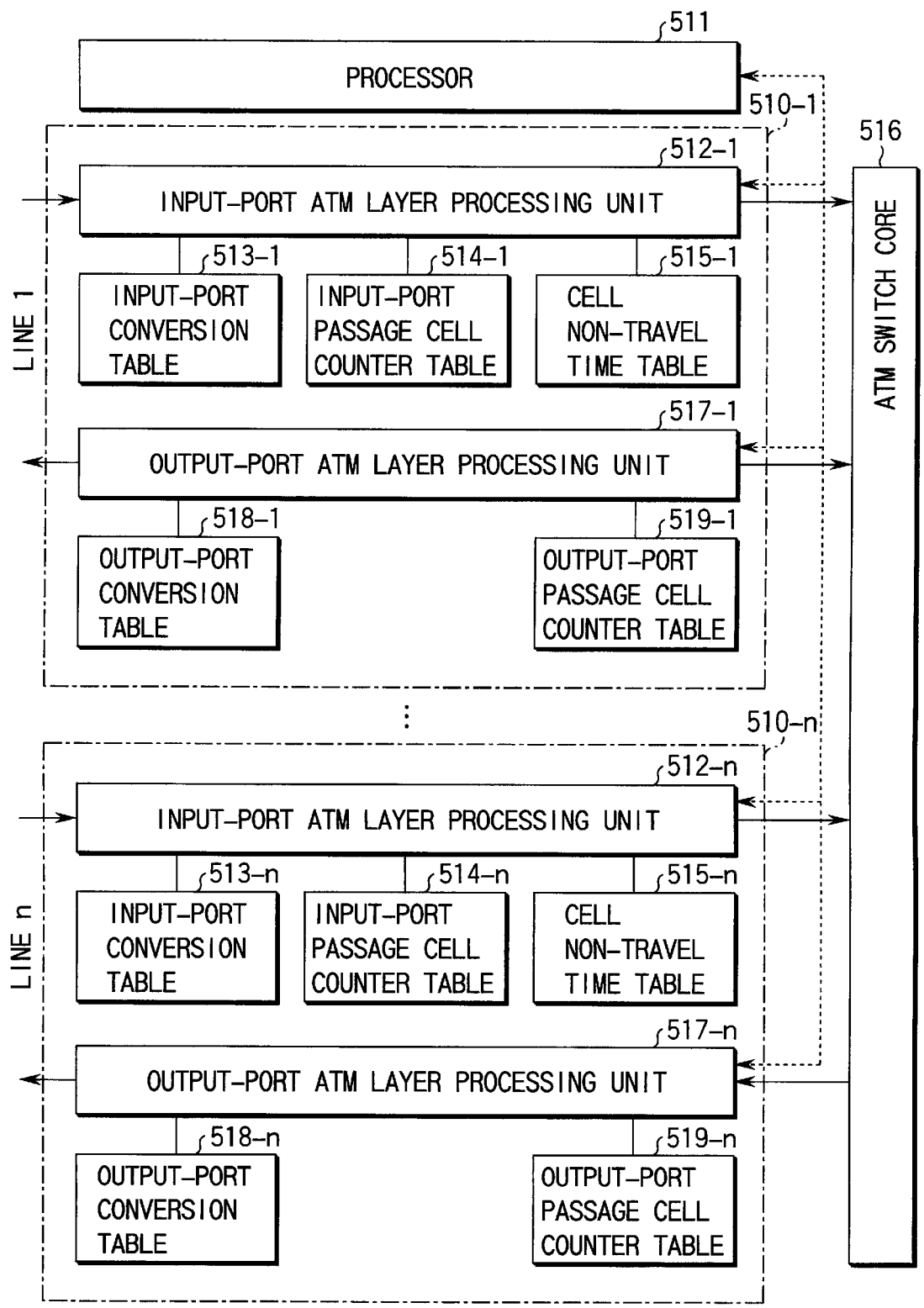
FIG. 43 is a block diagram showing the schematic arrangement of an n×n ATM switch according to the fifth embodiment of the present invention.

FIG. 43 is a block diagram showing the schematic arrangement of an n×n ATM switch according to the fifth embodiment of the present invention. Note that n×n means that there are n inputs and n outputs.

The ATM switch of this embodiment is a switch fabric used in an ATM network, and is mainly constructed by a processor 511 for controlling the entire ATM switch, n ports 510-1 to 510-n connected to the respective lines, and an ATM switch core 516 for systematically controlling these ports 510-1 to 510-n.

The respective ports 510-1 to 510-n have input-port and output-port processing units. The input-port processing units comprise input-port ATM layer processing units 512-1 to 512-n, input-port conversion tables 513-1 to 513-n, input-port passage cell counter tables 514-1 to 514-n, and cell non-travel time tables 515-1 to 515-n. The output processing units comprise output-port ATM layer processing units 517-1 to 517-n, output-port conversion tables 518-1 to 518-n, and output-port passage cell counter tables 519-1 to 519-n.

The input-port ATM layer processing units 512-1 to 512-n execute forwarding processes of incoming cells from their corresponding lines under the control of the processor 511. More specifically, the input-port ATM layer processing units 512-1 to 512-n execute processes for obtaining information such as the output destinations, connection identifiers, and the like of the cells by searching the input-port conversion tables 513-1 to 513-n based on VPI/VCI information and the like of the input cells, and processes for counting the numbers of passage cells in units of connections, and storing the count values in the input-port passage cell counter tables 514-1 to 514-n. Furthermore, in this embodiment, the input-port ATM layer processing units 512-1 to 512-n update the cell non-travel time tables 515-1 to 515-n. The arrangement of the input-port ATM layer processing units 512-1 to 512-n will be described in detail later with reference to FIG. 44.

The input-port conversion tables 513-1 to 513-n are tables for storing information required for input-port forwarding processes such as VPI/VCI information and the like of input cells. The input-port passage cell counter tables 514-1 to 514-n are tables for managing the numbers of input cells (the numbers of input-port passage cells). The cell non-travel time tables 515-1 to 515-n are tables for managing the times for which no cells travel (non-travel times).

Note that the input-port conversion tables 513-1 to 513-n, input-port passage cell counter tables 514-1 to 514-n, and cell non-travel time tables 515-1 to 515-n need not be physically separated, but may physically construct a single table.

On the other hand, the output-port ATM layer processing units 517-1 to 517-n execute forwarding processes of outgoing cells to predetermined lines under the control of the processor 511. More specifically, the output-port ATM layer processing units 517-1 to 517-n execute processes for obtaining new VPI/VCI values by searching the output-port conversion tables 518-1 to 518-n on the basis of connection identifiers transferred together with cells, and processes for appending the new VPI/VCI values to the headers in place of old ones, and outputting packets onto predetermined lines.

Also, the output-port ATM layer processing units 517-1 to 517-n have a function of counting the numbers of passage cells in units of connections, and storing the count values in the output-port passage cell counter tables 519-1 to 519-n, as in the input-port ATM layer processing units 512-1 to 512-n.

The output-port conversion tables 518-1 to 518-n are tables that store information required in output-port forwarding processes, such as output-port header information and the like to be converted upon outputting cells onto the output-port lines The output-port cell counter tables 519-1 to 519-n are tables for managing the numbers of outgoing cells (the numbers of output-port passage cells) onto predetermined lines upon rewriting of header information.

Note that the output-port conversion tables 518-1 to 518-n and output-port passage cell counter tables 519-1 to 519-n need not be physically separated but may physically construct a single table.

Since the number of passage cells are counted at the input-port side, the output-port cell counter tables 519-1 to 519-n are not always necessary. However, when a large number of cells are input, cells sent to the output-port side may be lost. Hence, those counter tables are provided for the purpose of security.

The arrangement of the input-port ATM layer processing units 512-1 to 512-n will be explained below.

Figure 44:
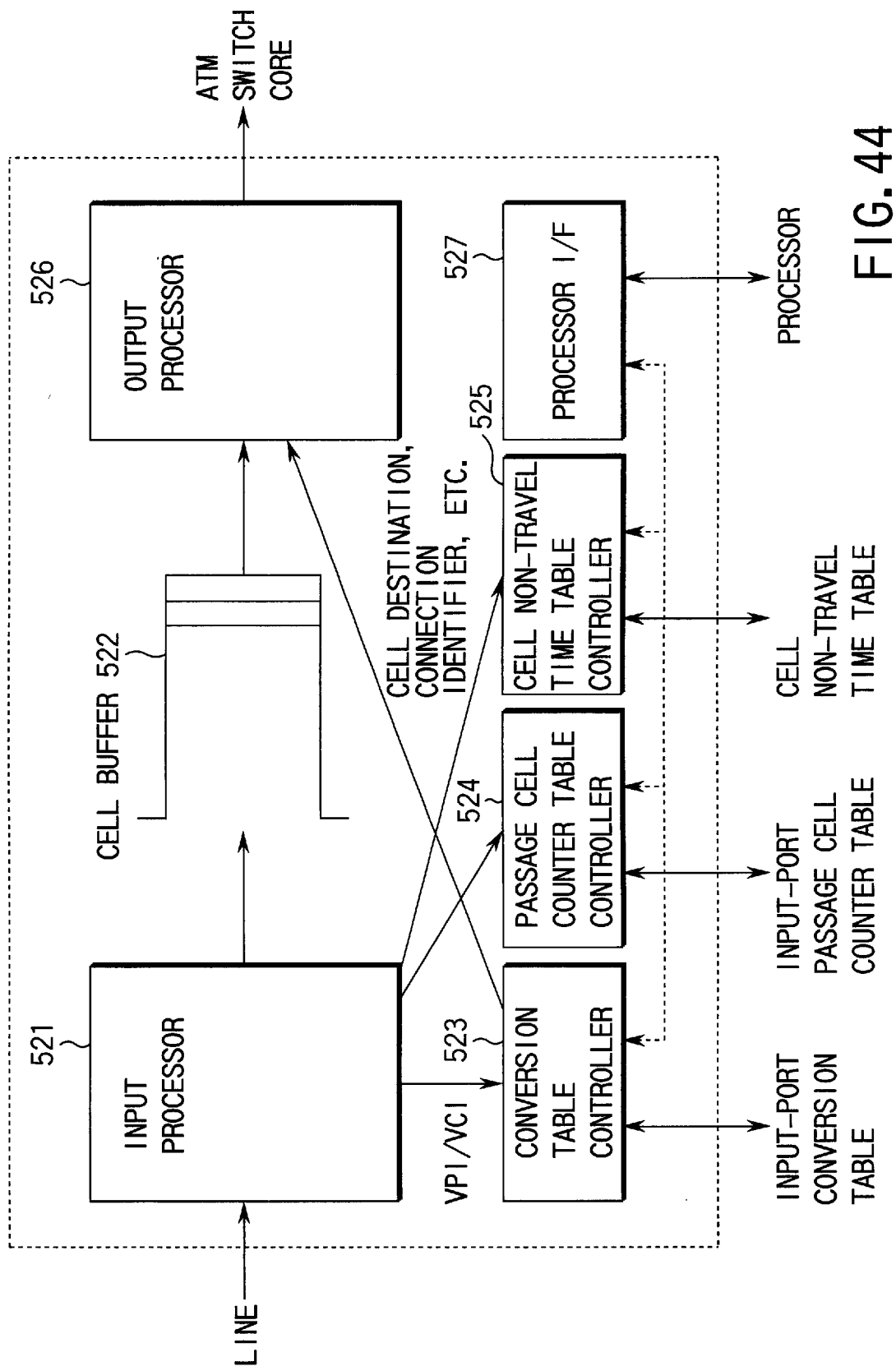
FIG. 44 is a block diagram showing the schematic arrangement of an input-port ATM layer processing unit provided to the ATM switch shown in FIG. 43.

FIG. 44 is a block diagram showing the schematic arrangement of the input-port ATM layer processing unit in this embodiment. Each of the input-port ATM layer processing units 512-1 to 512-n comprises an input processor 521, cell buffer 522, convertible controller 523, passage cell counter table controller 524, cell non-travel time table counter 525, output processor 526, and processor I/F 527.

The input processor 521 extracts a VPI/VCI value and the like from the input cell, and transfers the extracted data to the conversion table controller 523, passage cell counter table controller 524, and cell non-travel time table controller 525. Also, the input processor 521 transfers the cell itself to the cell non-travel time table controller 525. The cell buffer 522 is a memory for temporarily storing a 53-byte cell.

For the sake of simplicity, taking the input-port ATM layer processing unit 512-1 connected to line 1 as an example, the conversion table 523 obtains information such as the output destination, connection identifier, and the like of a cell input via line 1 on the basis of its VPI/VCI value and the like. The passage cell counter table controller 524 refers to the input-port passage cell counter table 514-1 on the basis of the extracted VPI/VCI value. If the input cell has normally been received, the controller 524 writes back a value obtained by adding 1 to the referred counter value to the input-port passage cell counter table 514-1.

The cell non-travel time table controller 525 writes information indicating that a cell has passed in the cell non-travel time table 515. Also, the cell non-travel time table controller 525 has a function of periodically updating an entry of the cell non-travel time table 515 once per cell cycle while no cell is input. The processor I/F 527 controls access from the processor 511.

Note that the output-port ATM layer processing units 517-1 to 517-n have substantially the same arrangement as described above, except for the cell non-travel time table controller 525.

The operation of the ATM switch of the present invention will be describe below.

As shown in FIG. 43, incoming cells from the respective lines are input to the input-port ATM cell layer processing units 512-1 to 512-n in the ports 510-1 to 510-n. The input-port ATM layer processing units 512-1 to 512-n searches the input-port conversion tables 513-1 to 513-n on the basis of their VPI/VCI values and the like of cells input from each corresponding lines and obtains information such as the output destinations, connection identifiers, and the like. Also, the input-port ATM layer processing units 512-1 to 512-n count the numbers of passage cells in units of connections, and store the count values in the input-port passage cell counter tables 514-1 to 514-n. Furthermore, the input-port ATM layer processing units 512-1 to 512-n detect times for which no cells travel in units of connections, and update the cell non-travel time tables 515-1 to 515-n. The updating method will be described in detail later.

The cells are transferred to the ATM switch core 516 together with the information obtained by the input-port conversion tables 513-1 to 513-n. The output destinations obtained from the input-port conversion tables 513-1 to 513-n indicate those for the ATM switch core 516. The ATM switch core 516 transfers cells to desired output-port ATM layer processing units 517-1 to 517-n in accordance with the output destinations obtained by the input-port ATM layer processing units 512-1 to 512-n.

The output-port ATM layer processing units 517-1 to 517-n obtain new VPI/VCI values by searching the output-port conversion tables 518-1 to 518-n on the basis of the connection identifiers transferred together with cells via the ATM switch core 516. Furthermore, the output-port ATM layer processing units 517-1 to 517-n append these new VPI/VCI values to the headers in place of old ones, and output the cells onto predetermined lines. In this case, the output-port ATM layer processing units 517-1 to 517-n count the numbers of passage cells in units of connections, and store the count values in the output-port passage cell counter tables 519-1 to 519-n, as in the input-port ATM layer processing units 510-1 to 510-n.

Taking the port 510-1 connected to line 1 as an example, as shown in FIG. 44, a cell input via line 1 is input to the input processor 521 in the input-port ATM layer processing unit 512-1. The input processor 521 extracts a VPI/VCI value and the like, which serve as keys upon searching the input-port conversion table 513-1, input-port passage cell counter table 514-1, and cell non-travel time table 515-1, from the cell, and transfers it to the conversion table controller 523, passage cell counter table controller 524, and cell non-travel time table controller 525. The processor 521 transfers the cell itself to the cell buffer 522.

The conversion table controller 523 obtains information such as the output destination, connection identifier, and the like of the cell by searching the input-port conversion table 513-1 on the basis of the VPI/VCI value and the like extracted from the cell. The passage cell counter table controller 524 refers to the input-port passage cell counter table 514-1 on the basis of the VPI/VCI value. If the input cell has normally been received, the controller 524 writes back a value obtained by adding 1 to the referred counter value to the input-port passage cell counter table 514-1. The cell non-travel time table controller 525 writes information indicating that cell has passed (0 in this case) in the cell non-travel time table 515-1.

In this case, the cell non-travel time table controller 525 has a function of periodically updating an entry of the cell non-travel time table 515 once per cell cycle while no cell is input. Updating of table entries is done for all entries supported by hardware while switching an entry to be updated for each cell cycle, by a method of writing back a value obtained by adding 1 to the read entry value. In this manner, when cells have passed periodically, a given entry of the cell non-travel time table 515-1 remains zero. However, when no cell has passed for a long period of time, that entry of the cell non-travel time table 515-1 monotonously increases in proportion to that time.

More specifically, when the cell non-travel time table 515-1 is constructed by an SRAM in an ATM switch that supports, e.g., 32K connections, since entries can be updated by incrementing the SRAM addresses in unitary increments for each cell cycle, updating of entries of all the connections requires around 90 ms (2.7 $\mu$s×32K).

More specifically, since an entry of a specific connection is updated at around 90-ms intervals, if the entry value is 1, this indicates that the last cell has passed through that connection 90±90 ms before; if the entry value is 2, this indicates that the last cell has passed through that connection 180±90 ms before.

However, the time elapsed after the last cell has passed may have an error depending on the entry updating timing. This state will be explained below with reference to FIGS. 45A and 45B.

For example, assume that the entry value is 1. As shown in FIG. 45A, when periodic updating of an entry is done immediately after the last cell has passed, nearly no time has elapsed after the last cell has passed.

On the other hand, when periodic updating of an entry is done immediately before the last cell passes, as shown in FIG. 45B, the entry is updated to 0 upon passage of the cell. For this reason, this entry is updated to 1 upon the next period updating around 90 ms later; the entry is updated to 2 around 180 ms later.

In this manner, an error of ±90 ms is produced between the entry updating timings immediately after and before passage of the last cell. However, an error of ±90 ms is negligible compared to the polling cycle of the processor 511.

In this fashion, the input-port ATM layer processing unit 512-1 periodically detects the time for which no cell input via line 1 flows (cell non-travel time), and that information is stored in the cell non-travel time table 515-1. The output processor 526 outputs the cell transferred from the cell buffer 522 and information transferred from the conversion table controller 523 together to the ATM switch core 516.

The processor I/F 527 controls access from the processor 511. The processor 511 accesses the input-port conversion table 513-1, input-port passage cell counter table 514-1, or cell non-travel time table 515-1 via the processor I/F 527, the conversion table controller 523, passage cell counter table controller 524, or cell non-travel time table controller 525.

The same applies to the operations of other input-port ATM layer processing units 512-n. Also, substantially the same operations are done in the output-port ATM layer processing units 517-1 to 517-n, except for the cell non-travel time table controller 525.

The processor 511 periodically polls entries of the cell non-travel time tables 515-1 to 515-n of all connections to be managed, and determines based on the read value whether or not the connection of interest is released. In this case, if cells periodically travel, entries of the cell non-travel time tables 515-1 to 515-n assume zero; otherwise, they assume larger values in proportion to the non-travel time. Hence, by comparing the non-travel time of each entry with a reference cell non-travel time set for all the connections or in units of connections, it is determined that a connection whose non-travel time is equal to or larger than the reference cell non-travel time is not used currently, thus immediately executing a connection release process.

In this manner, since the time elapsed after the last cell has passed is managed in units of connections, even when the last cell has passed immediately after polling of the processor 511, the cell non-travel time has increased by the time of the next polling, and a connection release process can be done based on the cell non-travel time. Hence, a connection which becomes unnecessary can be released early, and connection resources can be effectively used.

In the above embodiment, the cell non-travel time is managed at the input port (input-port ATM layer processing unit) connected to each line. However, a similar time table and controller can be provided also at the output port (output-port ATM layer processing unit) and the cell non-travel time may be managed at both the input port and the output port.

For example, when a large number of cells are input from the respective lines at the same time, the processes in the ATM switch core 516 cannot catch up with them, and cells sent to the output-port unit may be lost, and output-port reliability is lower than that at the input-port side. Therefore, the non-travel times in units of connections are preferably managed by at least the input-port side.

According to the fifth embodiment described above, since the cell non-travel times are managed in units of connections and connections are released based on the cell non-travel times, a connection which becomes unnecessary can be released early independently of the polling cycle of the processor. As a result, connection resources can be effectively used.

Sixth Embodiment

The sixth embodiment of the present invention will be described in detail below with reference to the drawings.

A relay device of the present invention is used as a switch fabric of an ATM network, and implements high-speed packet routing by executing switching in the data link layer (cut-through forwarding) by hardware alone without the intervention of software using a bypass forwarding path (cut-through forwarding path) established according to protocols in layers higher than the transport layer exchanged between neighboring relay devices, in addition to software or hardware implementation of routing in the network layer (hop-by-hop forwarding).

The arrangement of the relay device will be explained below in the order of (a) software implementation of hop-by-hop forwarding, and (b) hardware implementation of hop-by-hop forwarding.

(a) Software Implementation of Hop-by-hop Forwarding

Figure 46:
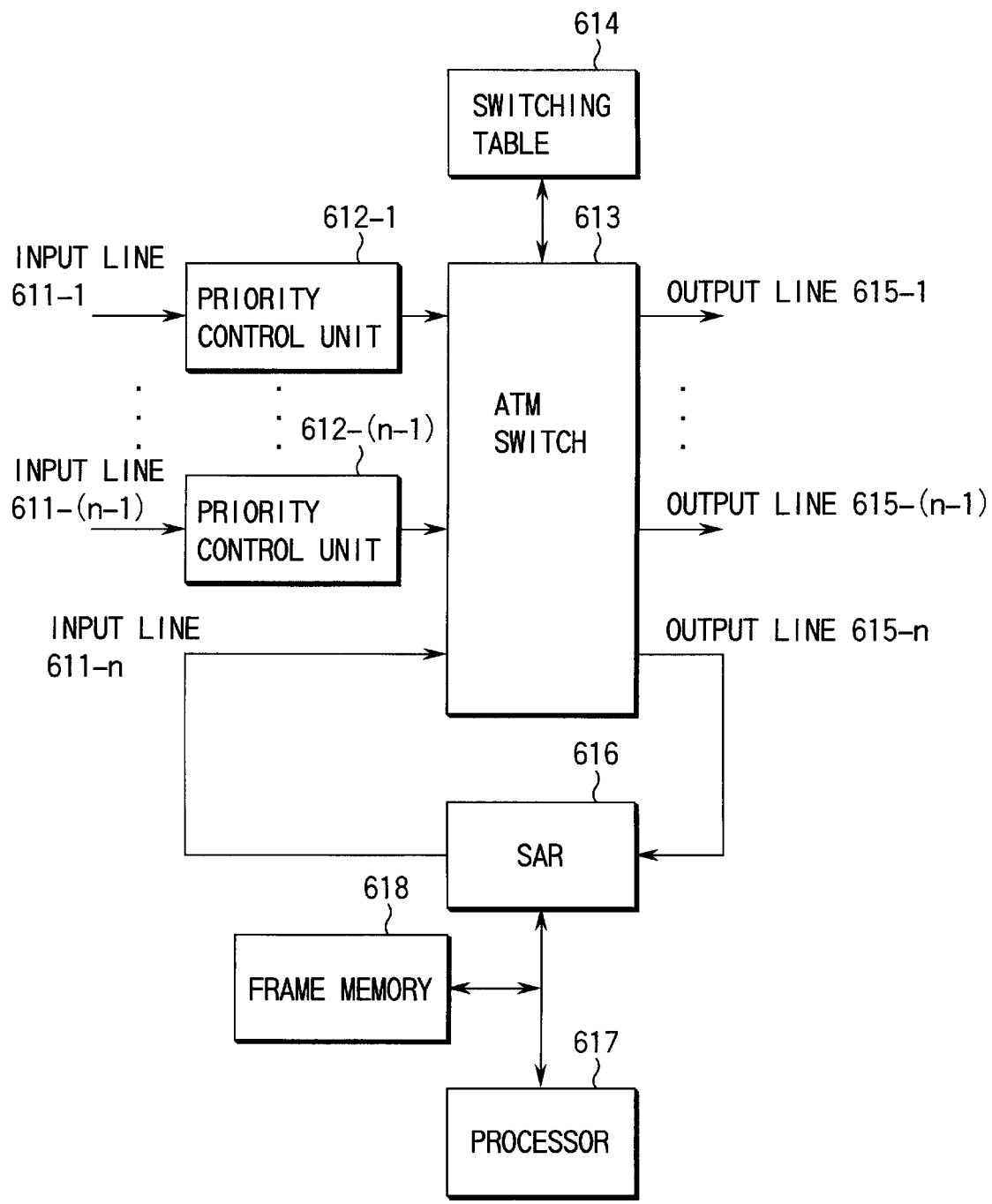
FIG. 46 is a block diagram showing the schematic arrangement of a relay device according to the sixth embodiment of the present invention, which uses an ATM switch as a switch, and implements hop-by-hop forwarding by software.

FIG. 46 is a block diagram showing the schematic arrangement of a relay device according to the present invention, which uses an ATM switch as a switch, and implements hop-by-hop forwarding by software. Referring to FIG. 46, reference numerals 611-1 to 611-n denote input lines; 612-1 to 612-(n-1), priority control units; 613, an ATM switch; 614, a switching table; 615-1 to 615-n, output lines; 616, an SAR; 617, a processor; and 618, a frame memory.

The difference between the arrangement shown in FIG. 46 and the conventional arrangement is that the priority control units 612-1 to 612-(n-1) are provided. The priority control units 612-1 to 612-(n-1) are inserted at the input side of the ATM switch 613, handle input data in units of packets, and execute priority control according to the packet types.

The types of packets (ATM cells in practice) input from the input lines 611-1 to 611-(n-1) are checked by the priority control units 612-1 to 612-(n-1), and those packets are enqueued in units of packet types. In the priority control units 612-1 to 612-(n-1), buffer queues 623-1 to 623-m (see FIG. 47) provided in units of packet types are assigned priority levels in association with the output order to the ATM switch 613. Packets are output to the ATM switch 613 by scheduling the buffer queues 623-1 to 623-m with priority levels. Note that the operation of the priority control units 612-1 to 612-(n-1) will be described in detail later with reference to FIG. 47.

When a packet is input to the ATM switch 613 in the ATM cell format, the ATM switch 613 switches that packet (ATM cells in practice) by hardware with reference to the switching table 614. In the switching table 614, information indicating the relationship between packets and output lines is set in advance. Also, the switching table 614 is set to output a packet, which flows in a flow which is not determined to be forwarded hop-by-hop or cut-through, to the output line 615-n.

A packet output to the output line 615-n is input to the SAR 616. Since the packet is input while being segmented into ATM cells, the SAR 616 reassembles the ATM cells to obtain an original packet on the frame memory 618 so that the processor 617 can process. That is, what kind of application data is used and the data length cannot be determined by checking only one cell. Therefore, the cells are gathered in units of packets so that the processor 617 can process.

Upon completion of reassembly of the packet, the SAR 616 informs the processor 617 of arrival of a trigger packet of the flow together with the address and the like of the frame memory 618 where the packet is stored. The processor 617 compares the received data with a trigger condition, and determines if the flow in which the packet flows is forwarded by cut through.

As a result, if the flow is forwarded by cut through, the processor 617 sets the switching table 614 to implement routing of the packet which flows in the flow by only switching of the ATM switch 613. On the other hand, if the flow is forwarded hop by hop, the processor 617 does not change the switching table, and forwards a packet, which flows in that flow, hop by hop by software.

Processes of a cut-through packet (a packet to be forwarded by cut through) and a hop-by-hop packet (a packet to be forwarded hop by hop) will be explained below.

When a cut-through packet is input to the ATM switch 613, an output line is determined in accordance with the switching table, and that cut-through packet is output onto the determined output lines 615-1 to 615-(n-1).

The switching table 614 is set to switch a hop-by-hop packet to the output line 615-n. The packet output onto the output line 615-n of the ATM switch 613 is transferred to the SAR 616.

The SAR 616 reassembles ATM cells to obtain an original packet on the frame memory 618, so that the processor 617 can process. Upon completion of packet reassembly, the SAR 616 informs the processor 617 of arrival of the hop-by-hop packet together with the address and the like of the frame memory 618 where the packet is stored.

Upon receiving the message, the processor 617 executes routing on the basis of header information (source address, destination address, and the like) of the packet. Upon completion of routing, the processor 617 informs the SAR 616 that a packet to be sent is present on the frame memory 618. The SAR 616 reads out the packet to be sent from the frame memory 618, segments it into ATM cells, and inputs these cells to the input line 611-n of the ATM switch 613. The packet input from the input line 611-n is output onto the output lines 615-1 to 615-n determined according to the switching table 614.

The priority control units 612-1 to 612-(n-1) will be explained below.

Figure 47:
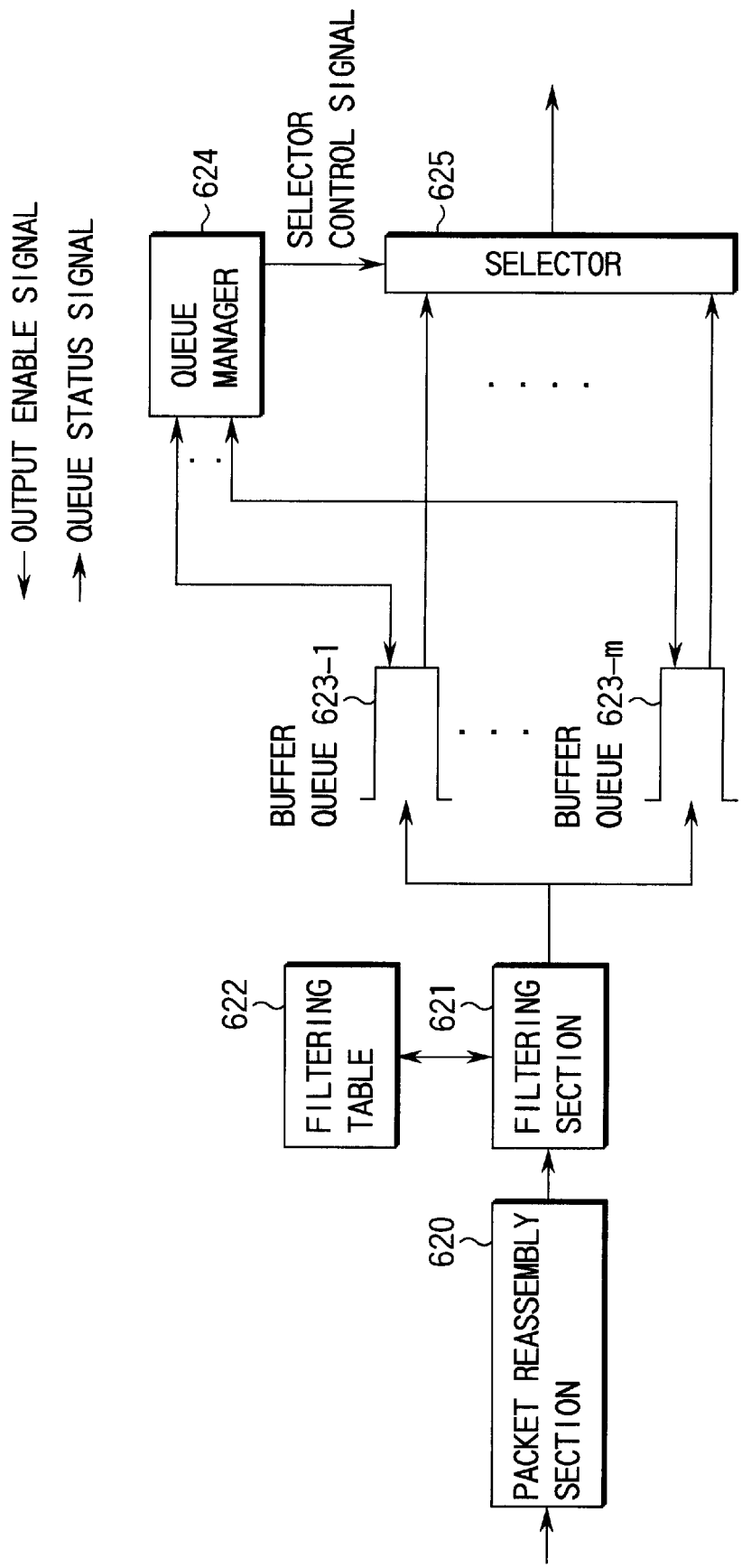
FIG. 47 is a block diagram showing the schematic arrangement of a priority control unit used in the relay device of this embodiment.

FIG. 47 is a block diagram showing the schematic arrangement of the priority control units 612-1 to 612-(n-1). The priority control units 612-1 to 612-(n-1) are inserted at the input side of the ATM switch 613 in correspondence with the input lines 611-1 to 611-(n-1), and each comprise a packet reassembly section 620, filtering section 621, filtering table 622, buffer queues 623-1 to 623-m, queue manager 624, and selector 625.

The packet reassembly section 620 reassembles segmented incoming cells in the ATM cell format into a packet format. In this case, information indicating the type of packet is written in a predetermined one of these cells, and the packet reassembly section 620 reassembles the cells in units of packets on the basis of this information.

The filtering section 621 determines the type of packet obtained by the packet reassembly section 620, and assigns that packet to the buffer queues 623-1 to 623-m in accordance with the determined type with reference to the filtering table 622. As the method of determining the type of packet, a method of using, e.g., a VPI/VCI value is known.

More specifically, in an ATM network some virtual paths (VPs) are set, and some virtual channels (VCs) for actually sending data are set in units of virtual paths. For this reason, a VPI (Virtual Path Identifier) is assured in the header field of a cell to identify a VP to be used. Furthermore, a VCI (Virtual Channel Identifier) is assured in the header field of the cell to identify a VC in the VP to be used upon sending data to the partner. The VPI/VCI determine VPs and VCs to be selected upon communicating with the partner. Note that a cell consists of 53 bytes, 5 bytes of which are used as a header, and the remaining 48 bytes of which are used as user information.

Note that an 8-bit VPI field and 16-bit VCI field are prepared in, e.g., UNI (User-Network Interface), but fields to be actually used are often limited. Also, a use method of some values is limited in advance, and as one of such values, a signaling VCC (Virtual Channel Connection) for setting a connection is known. The signaling VCC is assigned to VCI=1, 2, or 5 depending on, e.g., signaling purposes.

Therefore, upon determining the type of input packet, if VCI=1, 2, or 5 is set in a predetermined cell in the packet, it can be determined that the packet is the one for setting a connection.

Note that 1, 2, and 5 indicate the following types.

VCI=1: meta signaling

VCI=2: broadcast signaling

VCI=5: point-to-point signaling

In the filtering table 622, selection conditions of the buffer queues according to such packet types are pre-set. The buffer queues 623-1 to 623-m are memories for storing packets filtered by the filtering section 621, and priority is given in the order of, e.g., the buffer queues 623-1, 623-2, 623-3, . . . .

The queue manager 624 makes output control of packets stored in the buffer queues 623-1 to 623-m by a fixed priority scheme (FIG. 48) or round-robin scheme (FIG. 49) to be described later. The selector 625 operates under the control of the queue manager 624, and selectively outputs packets stored in the buffer queues 623-1 to 623-m to the ATM switch 613.

The processing operation of the relay device including the priority control units 612-1 to 612-(n-1) will be explained below.

Packets (ATM cells in practice) input via the input lines 611-1 to 611-(n-1) are input to the ATM switch 613 after they undergo priority control by the priority control units 612-1 to 612-(n-1).

In the priority control units 612-1 to 612-(n-1), incoming cells in the form of ATM cells are reassembled into a packet format by the packet reassembly section 620, and the packet is supplied to the filtering section 621. The filtering section 621 checks if the input packet is a normal one. If the filtering section 621 determines a normal packet, it then determines the type of packet. The packet type is determined by reading information written in a predetermined one of cells that form the packet.

Packet types include control/management information between relay devices such as a trigger packet, a packet containing routing protocol information, signaling cells, and the like, and data packets of the user.

After the packet type is determined, the filtering section 621 determines one of the buffer queues 623-1 to 623-m, which is to store the packet of the determined type, with reference to the filtering table 622. In this case, when the buffer queues 623-1 to 623-m are simply assigned in units of packet types, the packet types and buffer queues 623-1 to 623-m may have one-to-one correspondences therebetween. However, in this embodiment, since flexibility such as assignment of the buffer queues 623-1 to 623-m under conditions that combine the packet types and other kinds of information (for example, the source or destination of the packet, the flow in which the packet is to be forwarded, and the like) is taken into consideration, the filtering table 622 is allocated.

After one of the buffer queues 623-1 to 623-m, which is to store the packet, is determined by searching the filtering table 622, the filtering section 621 stores the packet in the determined one of the buffer queues 623-1 to 623-m. The buffer queues 623-1 to 623-m are FIFO (First In, First Out) buffers which output packets in turn in order they were stored. The operations on the input side of the priority control units 612-1 to 612-(n-1) have been explained.

On the output side of the priority control units 612-1 to 612-(n-1), the buffer queues 623-1 to 623-m input signals (queue status signals), each indicating if one or more packets to be output to the ATM switch 613 are stored, to the queue manager 624. The queue manager 624 determines one of the buffer queues 623-1 to 623-m, which stores the next packet to be output to the ATM switch 613, on the basis of the queue status signals, and activates a signal (output enable signal) that permits only the corresponding one of the buffer queues 623-1 to 623-m to output a packet.

At the same time, the queue manager 624 switches the selector 625 to output a packet coming from the corresponding one of the buffer queues 623-1 to 623-m to the ATM switch 613. How to make priority control depends on the algorithm of the queue manager 624. In this embodiment, two schemes, i.e., a fixed priority scheme (FIG. 48) and round-robin scheme (FIG. 49) will be exemplified.

Note that a queue status (#x) signal indicates if one or more packets are stored in buffer queue #x, and when the signal is at "H" level, it indicates that one or more packets are stored. An output enable (#x) signal indicates if a buffer queue (#x) is permitted to output a packet, and when the signal is at "H" level, it permits the output. Also, the highest priority is given to a buffer queue (#1), and the lowest priority is given to a buffer queue (#m).

In the fixed priority scheme, upon determining the next packet to be output to the ATM switch 613, a buffer queue having the highest priority of those which store one or more packets is permitted to output a packet.

Figure 48:
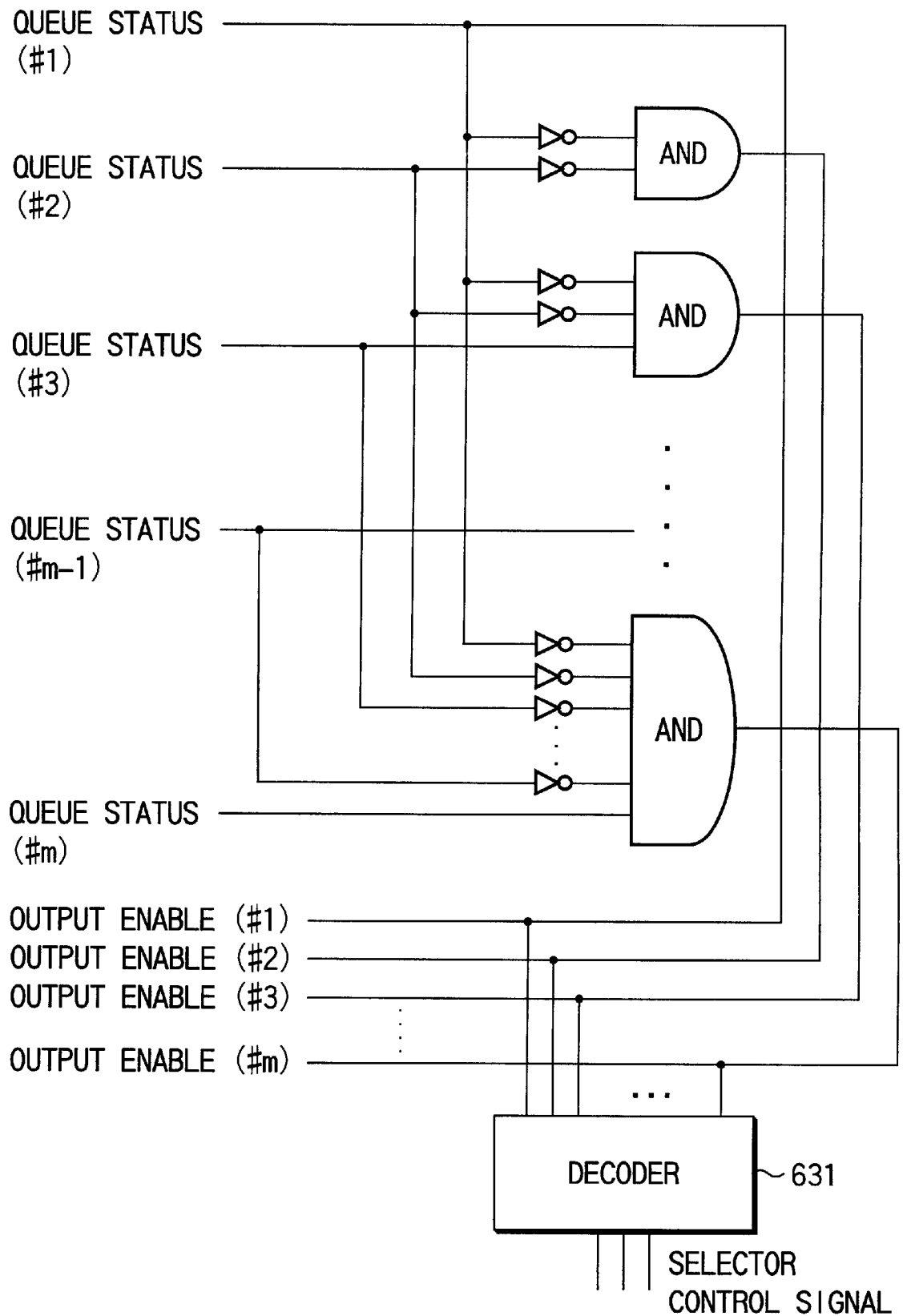
FIG. 48 is a block diagram showing the schematic arrangement when a queue manager in the priority control unit is implemented by fixed priority scheduling.

More specifically, the queue manager 624 has an arrangement shown in FIG. 48, and always permits the buffer queue (#1) to output a packet (output enable (#1)="H" level) if it stores a packet (queue status (#1)="H" level). An output enable (#2) that permits a buffer queue (#2) to output a packet changes to "H" level when the buffer queue (#1), which has higher priority than the self buffer queue, stores no packet (queue status (#1)="L" level).

A decoder 631 decodes the output enables (#1) to (#m) to generate a signal (selector control signal) for controlling the selector 625 to output a packet, which is output from the output-enabled buffer queue, to the ATM switch 613.

In this manner, in the fixed priority scheme, a packet is always output from the buffer queue with the highest priority.

In the round-robin scheme, upon determining the next packet to the output to the ATM switch 613, the right of outputting a packet is given to a buffer queue having priority next to that of the buffer queue that previously output a packet to the ATM switch 613. In this case, since the right of output is merely assigned to the buffer queue, if the buffer queue given the right stores no packets to be output, the right is given to a buffer queue having the next highest priority.

In this manner, in the round-robin scheme, a buffer queue which is given the right of outputting a packet to the ATM switch 613, and stores a packet to be output, outputs a packet.

Figure 49:
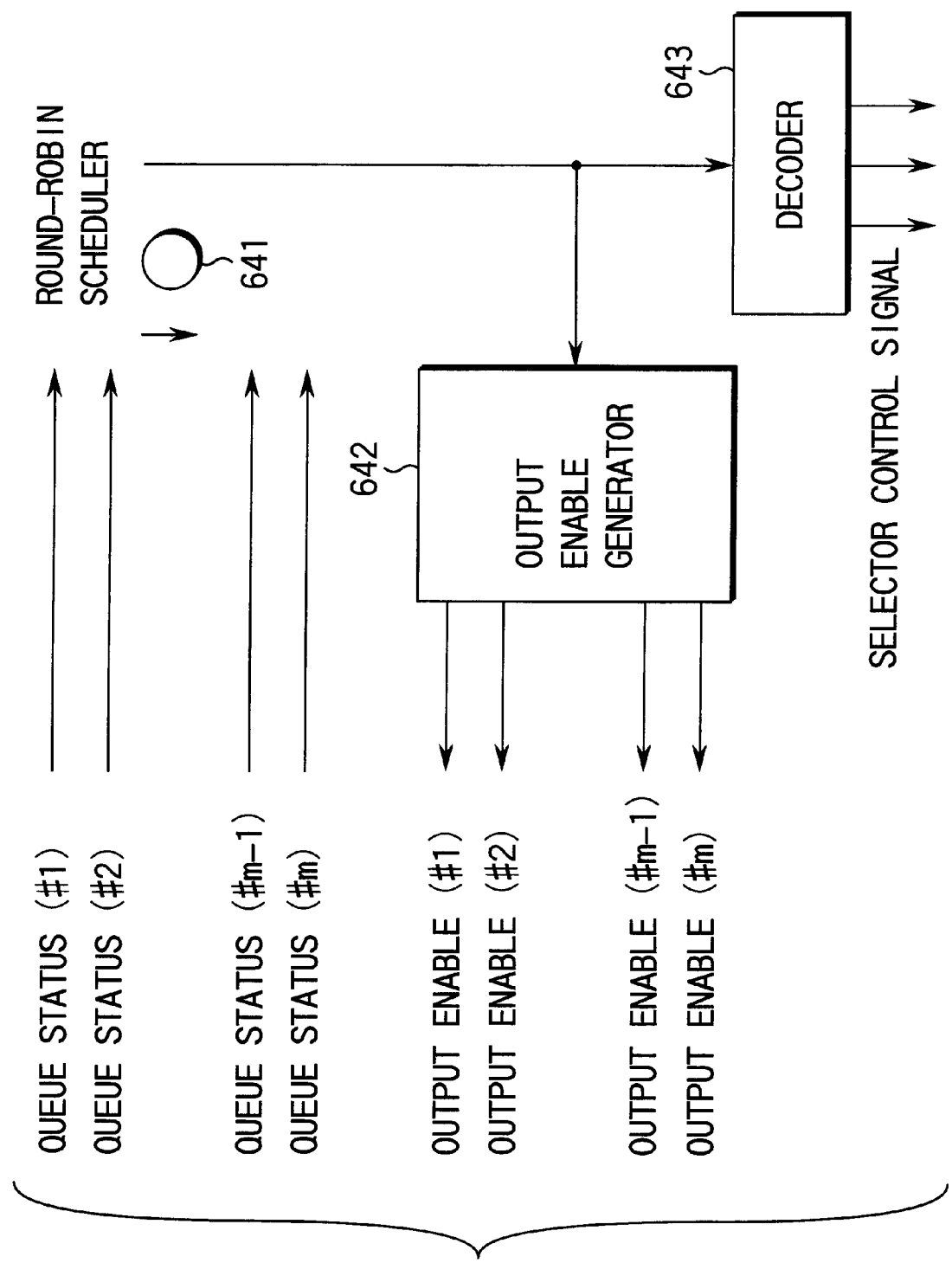
FIG. 49 is a block diagram showing the schematic arrangement when a queue manager in the priority control unit is implemented by round robin scheduling.

More specifically, the queue manager 624 has an arrangement shown in FIG. 49. For example, when the buffer queue (#1) previously output a packet, it is checked if the buffer queue (#2) stores a packet to be output. If the buffer queue (#2) stores a packet to be output, a round-robin scheduler 641 permits the buffer queue (#2) to output a packet, and an output enable generator 642 sets only an output enable (#2) at "H" level and outputs it.

A decoder 643 generates a signal (selector control signal) for controlling the selector 625 to output a packet, which is output from the buffer queue (#2), to the ATM switch 613.

If the buffer queue (#2) does not store any packet to be output, the round-robin scheduler 641 gives the right of output to a buffer queue (#3), and checks if the buffer queue (#3) stores a packet to be output. The same operations are repeated until a buffer queue that stores a packet to be output is found.

When a buffer queue that stores a packet to be output has been found, the round-robin scheduler 641 stops to point to the buffer queue with priority next to the found buffer queue, gives the right of output to that buffer upon determining the next packet to be output, and checks if that buffer queue stores a packet to be output.

More specifically, the round-robin scheme makes the respective buffer queues output packets in the priority order of all the buffer queues, in place of making a specific buffer queue preferentially output a packet to the ATM switch 613 unlike the fixed priority scheme.

In this manner, since the priority control units 612-1 to 612-(n-1) are inserted at the input side of the ATM switch 613, input data are processed in units of packets prior to switching and routing, and priority control is made in accordance with the packet types, even when traffic beyond the bandwidth of the line that connects the ATM switch 613 and SAR 616 is input, a packet with higher importance is preferentially transferred to and processed by the SAR 616. Therefore, the number of packets discarded inside the ATM switch 613 can be minimized.

Hence, when high priority is given to control/management information between relay devices such as a cut-through trigger packet, control cell, routing information, or the like, quick control and sharing of management information between relay devices can be realized.

When priority is variably set in units of packet types, user data to be forwarded hop by hop can be given priority higher than the control/management information, and the relay device may preferentially process the user data. Priority can be flexibly set in accordance with the scenario of the user of the relay device (to give high priority to user data to be forwarded hop by hop, to give high priority to control information, to give high priority to management information, and so forth).

(b) Hardware Implementation of Hop-by-hop Forwarding

Figure 50:
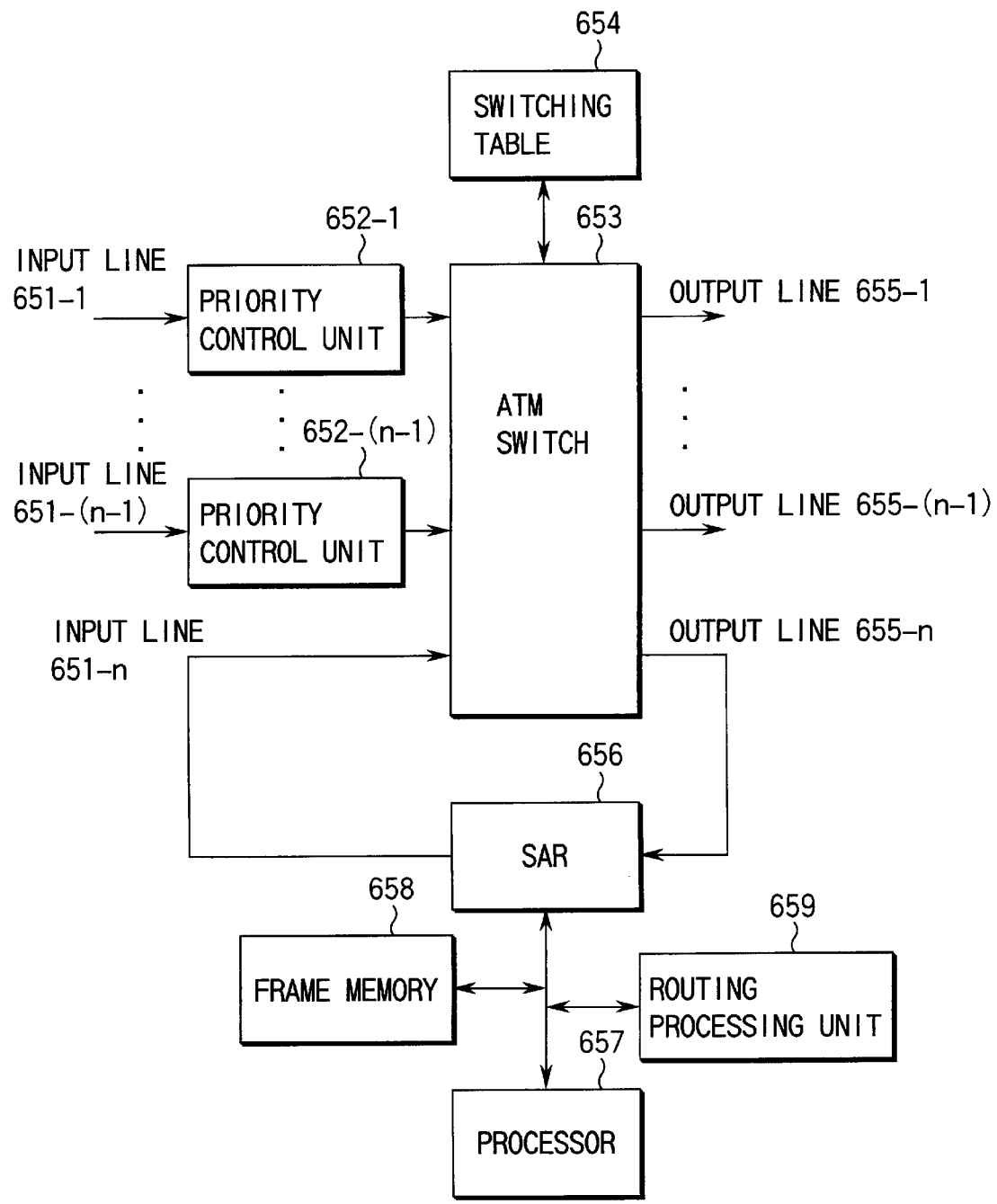
FIG. 50 is a block diagram showing the schematic arrangement of a relay device according to the sixth embodiment of the present invention, which uses an ATM switch as a switch, and implements hop-by-hop forwarding by hardware.

FIG. 50 is a block diagram showing the schematic arrangement of a relay device which uses an ATM switch as a switch, and implements routing of hop-by-hop packets by hardware. Referring to FIG. 50, reference numerals 651-1 to 651-n denote input lines; 652-1 to 652-(n-1), priority control units; 653, an ATM switch; 654, a switching table; 655-1 to 655-n, output lines; 656, an SAR; 657, a processor; 658, a frame memory; and 659, a routing processing unit.

Unlike in FIG. 46, routing of a hop-by-hop packet which is transferred from the output line 655-n to the SAR 656 and is reassembled on the frame memory 658 is done by the routing processing unit 659.

Upon receiving a message indicating completion of reassembly of a packet on the frame memory 658 from the SAR 656, the routing processing unit 659 executes routing on the basis of header information (source address, destination address, and the like) of the packet. The routing processing unit 659 informs the SAR 656 of the presence of a packet to be sent on the frame memory 658. The SAR 656 segments the packet into ATM cells, and inputs them to the ATM switch 653 via the line 651-n.

When the routing processing unit 659 is implemented by hardware, high-speed routing can be realized. In this case, in the arrangement shown in FIG. 50, packets to be processed by the processor 657 are only packets addressed to the relay device, i.e., a trigger packet, a packet containing routing protocol information, signaling cells used in ATM connection establishment, and the like.

Figure 51:
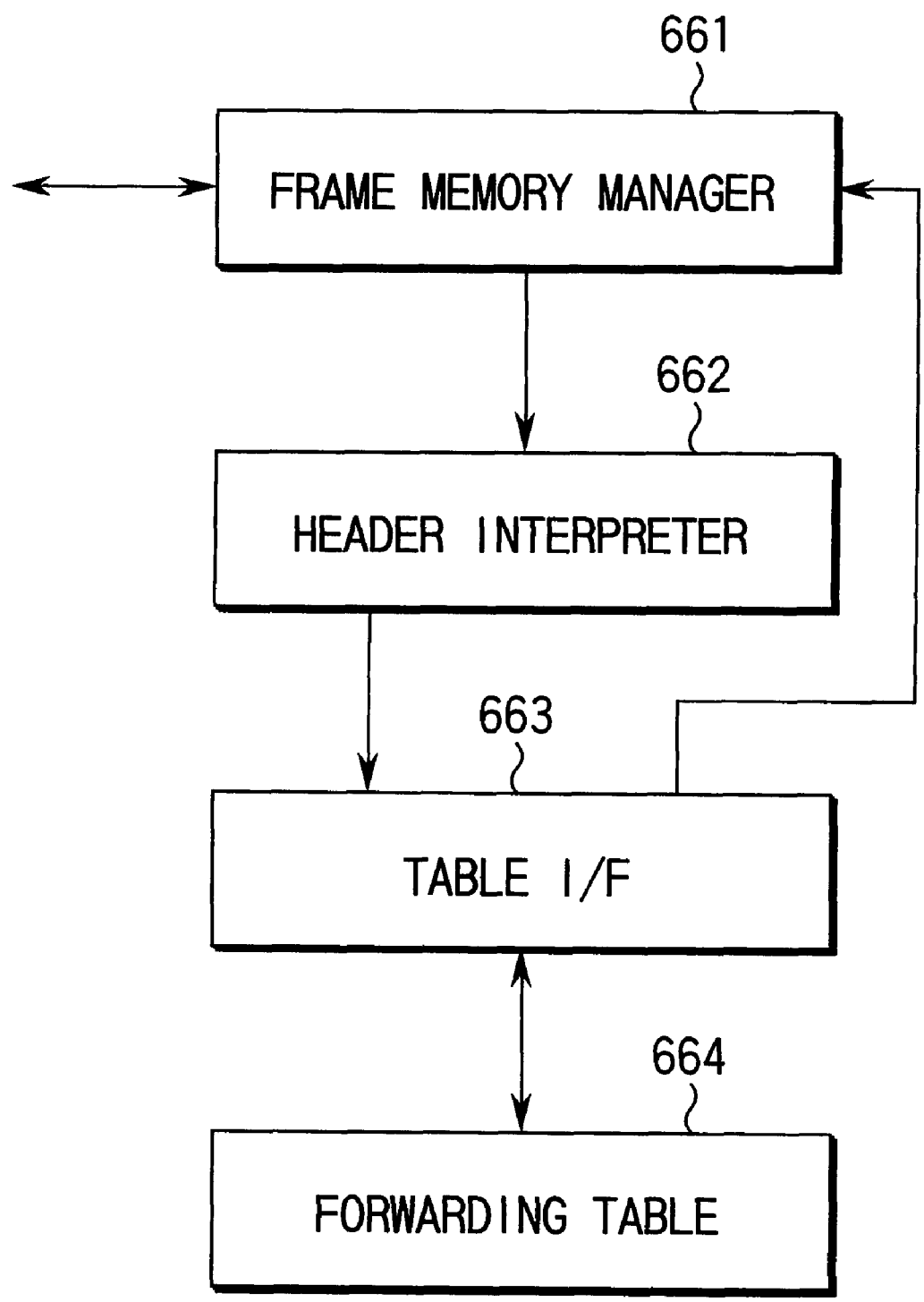
FIG. 51 is a block diagram showing the schematic arrangement of a routing processing unit in the relay device.

FIG. 51 shows the schematic arrangement of the routing processing unit 659.

The routing processing unit 659 comprises a frame memory manager 661, header interpreter 662, table I/F 663, and forwarding table 664. In this routing processing unit 659, a message indicating reassembly completion of a packet is received from the SAR 656, and the address or the like of the frame memory 658 where the packet is stored is received at the same time. The received information is managed by the frame memory manager 661.

The frame memory manager 661 extracts header information of the packet on the basis of the received address or the like of the frame memory 658 where the packet is stored, and transfers it to the header interpreter 662. The header interpreter 662 interprets the extracted header information, generates a key used for searching the forwarding table 664 that stores routing information of the packet, and supplies the key to the table I/F 663.

The table I/F 663 extracts routing information as output route information of the packet by searching the forwarding table 664 using the received search key of the forwarding table 664. The extracted routing information is transferred to the frame memory manager 661 together with information for identifying which packet the routing information pertains to.

The frame memory manager 661 writes the extracted routing information at the frame memory address where the packet is stored, and informs the SAR 656 of the end of routing.

In this arrangement, as in FIG. 46, the priority control units 652-1 to 652-(n-1) inserted at the input side of the ATM switch 653 are characterized by processing input data in units of packets and making priority control according to the packet types.

Note that the arrangement of the priority control units 652-1 to 652-(n-1) is the same as that shown in FIG. 47, and the arrangement (fixed priority scheme/round-robin scheme) of the queue manager 624 provided to each priority control unit is the same as that shown in FIGS. 48 and 49. Hence, a detailed description thereof will be omitted here.

Under the priority control of these priority control units 652-1 to 652-(n-1), even when traffic beyond the bandwidth of the line that connects the ATM switch 653 and SAR 656 is input, a packet with higher importance is preferentially transferred to and processed by the SAR 656. Therefore, the number of packets discarded inside the ATM switch 653 can be minimized.

Hence, when high priority is given to control/management information between relay devices such as a cut-through trigger packet, control cell, routing information, or the like, quick control and sharing of management information between relay devices can be realized.

When priority is variably set in units of packet types, user data to be forwarded hop by hop can be given priority higher than the control/management information, and the relay device may preferentially process the user data. Priority can be flexibly set in accordance with the scenario of the user of the relay device (to give high priority to user data to be forwarded hop by hop, to give high priority to control information, to give high priority to management information, and so forth).

According to the sixth embodiment mentioned above, since input data are processed in units of packets prior to routing and switching, and a packet is output to the ATM switch in accordance with priority corresponding to its packet type, a packet with high priority can be preferentially forwarded and processed, thus realizing efficient data communications.

When high priority is given to control/management information between relay devices such as a cut-through trigger packet, control cell, routing information, or the like, quick control and sharing of management information between relay devices can be realized.

When priority of each packet type is varied by external setups, priority higher than that of control/management information may be given to user data to be forwarded hop by hop, and user data may be preferentially processed.

Seventh Embodiment

The seventh embodiment of the present invention will be described in detail below with reference to the drawings.

Figure 52:
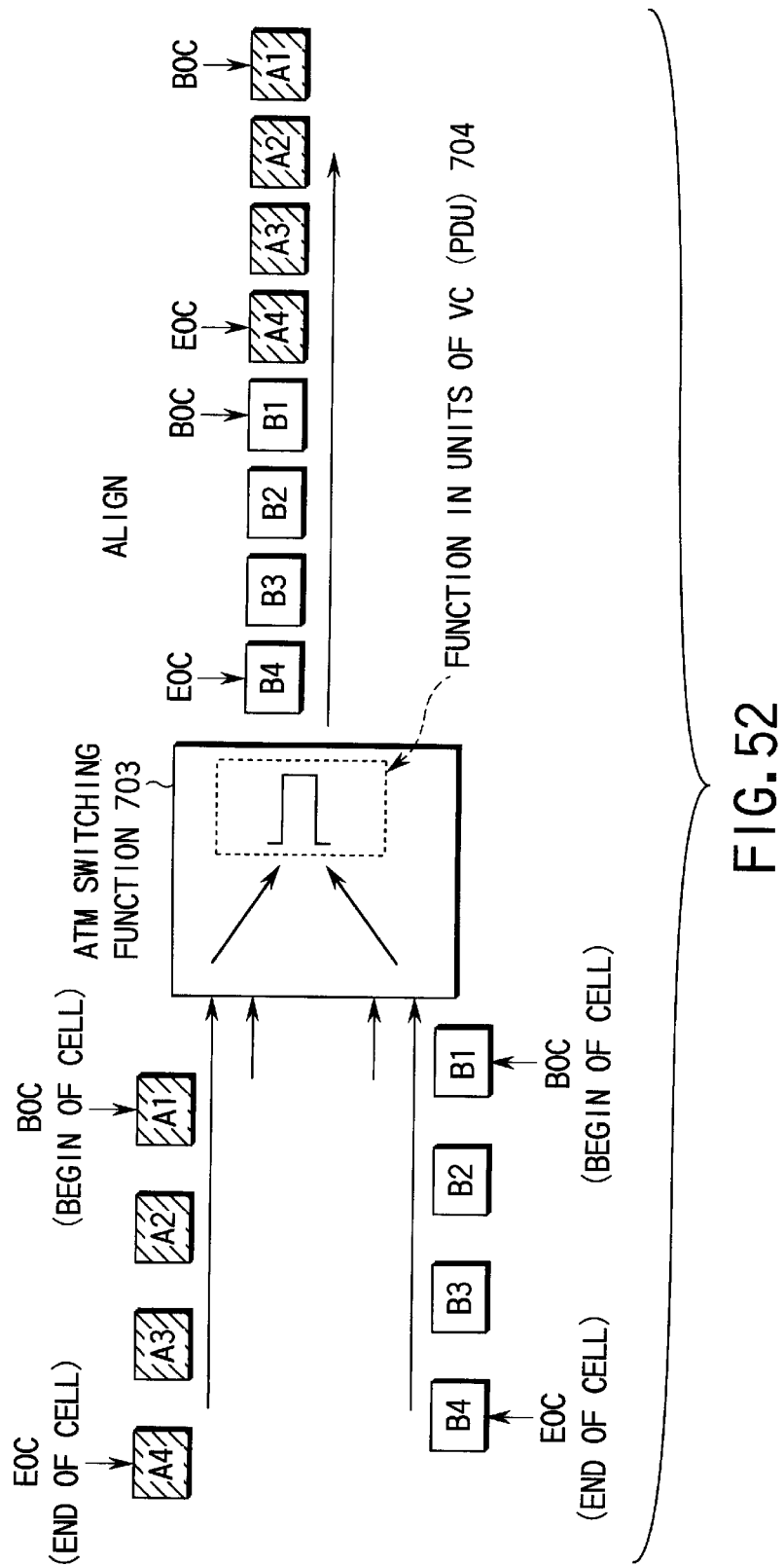
FIG. 52 is a view for explaining the basic principle of the seventh embodiment of the present invention.

In this embodiment, as shown in FIG. 52, upon merging a plurality of flows into a single VC (Virtual Connection), a function 704 in units of VCs (PDUs) aligns cells in units of PDUs upon merging. Such cell alignment is implemented using the two embodiments to be described below.

Figure 53:
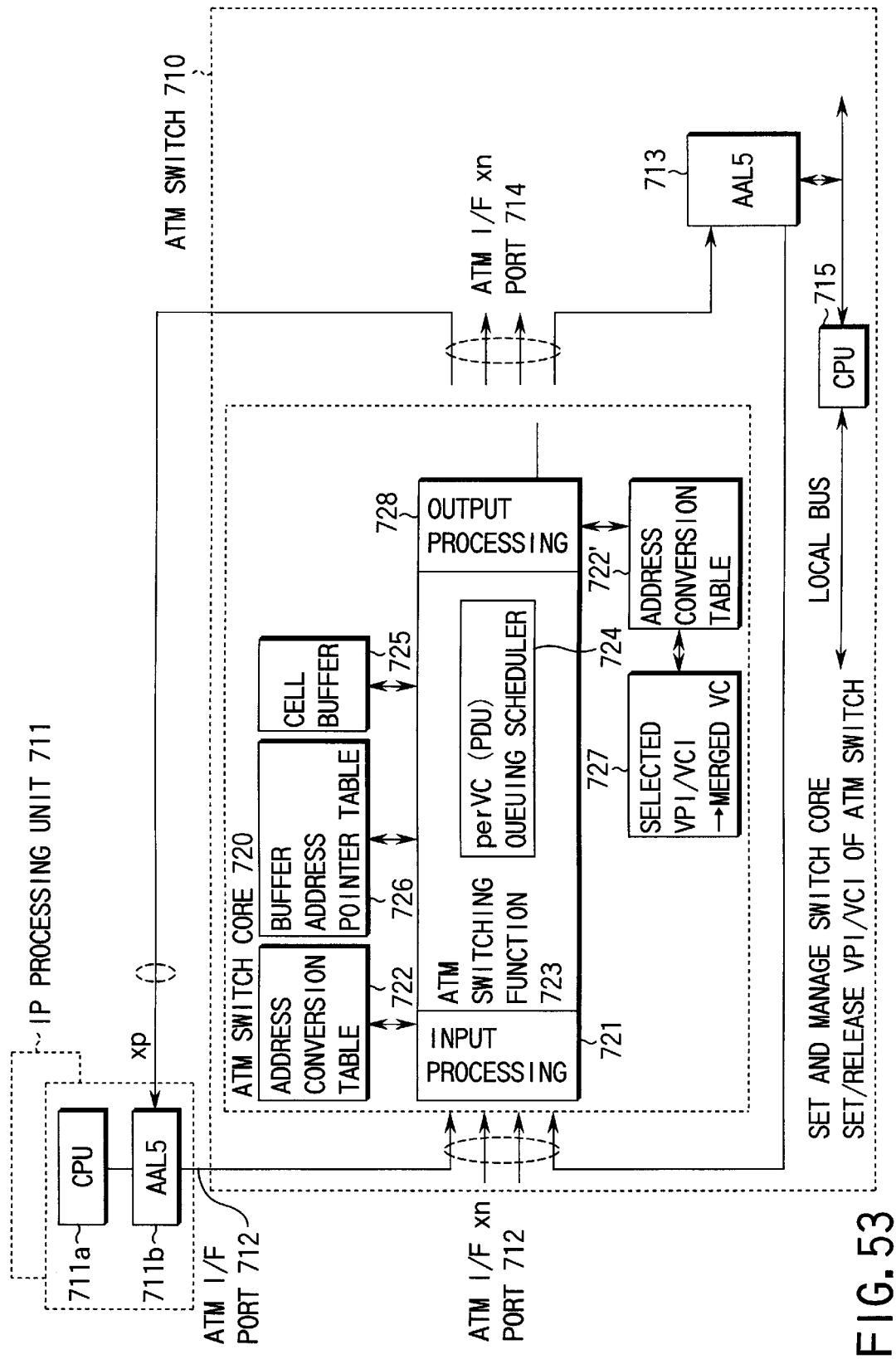
FIG. 53 is a diagram showing the arrangement of the seventh embodiment.

FIG. 53 shows the arrangement of the seventh embodiment of the present invention.

Referring to FIG. 53, a CSR is constituted by an ATM switch 710 and an IP processing unit 711 connected to the ATM switch 710 via an ATM-IF 712. The IP processing unit 711 comprises a CPU 711a and AAL5 section 711b, and processes a CSR protocol between neighboring nodes or a non-cut-through IP packet, i.e., a packet to be forwarded hop by hop by software (CPU). A plurality of (n) IP processing units 711 may be connected to improve the hop-by-hop performance. In this case, n=1, 2, . . . , but is determined according to the number of I/F ports of the ATM switch 710. That is, at least one ATM I/F 712 is required between the IP processing unit 711 and ATM switch 710. An AAL5 section 713 is provided to make CPU communications between the IP processing unit 711 and ATM switch 710, and to execute CSR protocol and IP forwarding processes. The ATM switch 710 has a large number of ATM I/Fs 712 to connect devices (routers, terminals, ATM switch fabrics, and the like) that can be connected via the ATM I/Fs 712.

The ATM switch 710 of this embodiment comprises an ATM switch core 720 which enqueues VCs in units of PDUs by the ATM switch, i.e., aligns cells by a perVC queuing function.

The ATM I/F input side will be explained first. The ATM switch core 720 is constructed by an input processor 721 for processing input cells, an address conversion table (not always necessary) 722 for converting addresses for the purpose of internal processes of the ATM switch, an ATM switching function 723 which provides an ATM switching function by including a pervc (PDU) scheduler 724 that performs queuing per VC, i.e., per PDU, and performs scheduling to the respective output ports in units of VCs or PDUs in consideration of QOS support and priority, a cell buffer 725 for storing received cells, a buffer address pointer table 726 which serves as a controller for storing or reading out the cell, i.e., controls the address, attributes (QOS, priority, and the like), pointer, and the like of the cell buffer, an address conversion table 722' which performs VPI/VCI address conversion upon outputting cells which are output while being aligned in units of VCs or PDUs to the ATM I/Fs, and a table, i.e., a Selected VPI/VCI→Merged VC section 727 to which information as to whether or not VC merge is made can be referred. Note that the address conversion table 722' may also provide the function of the Selected VPI/VCI→Merged VC section 727. Cells that have undergone an output process in an output processor 728 are output to the ATM I/FS 714.

Furthermore, the AAL5 section 713 is connected to the ATM switch core 720, but is basically used for connecting a CPU 715 of the ATM switch 710 and the CPU 711a of the IP processing unit 711 when these CPUs communicate with each other. The CPU 715 of the ATM switch 710 is the one for managing the device, and controls the ATM switch 710 upon receiving an instruction from the IP processing unit 711 in accordance with the CSR protocol. That is, the CPU 715 controls the ATM switch core 720 to set or release VPI/VCI and control the aforementioned various tables and the like.

FIG. 54 is a view for explaining the operation of the seventh embodiment of the present invention. In this embodiment, the perVC queuing scheduler 724 shown in FIG. 54C enqueues VCs per PDU in units of output ports of the ATM switch, i.e., aligns cells by a shaping function by means of perVC queuing.

More specifically, cells input to the ATM switching function 723 include those having different QOS classes (priority 1, priority 2), as shown in FIG. 54A, and PDUS cannot be normally reassembled. Hence, different queues #A, #B, and #C are assured in units of priority levels, and cells having identical priority are enqueued in each queue (FIG. 54D). Scheduling is done in accordance with the priority in units of QOS classes, i.e., cell data in each queue are merged and aligned to locate the queue with high priority at the head of the line in units of PDUs (FIG. 54B). Then, cells are output from the perVC queuing scheduler 724 in the PDU order shown in FIG. 54E.

FIG. 55 shows another example of the seventh embodiment, which concentratedly performs perVC queuing, i.e., perPDU queuing at one location of an ATM switching unit.

Figure 56:
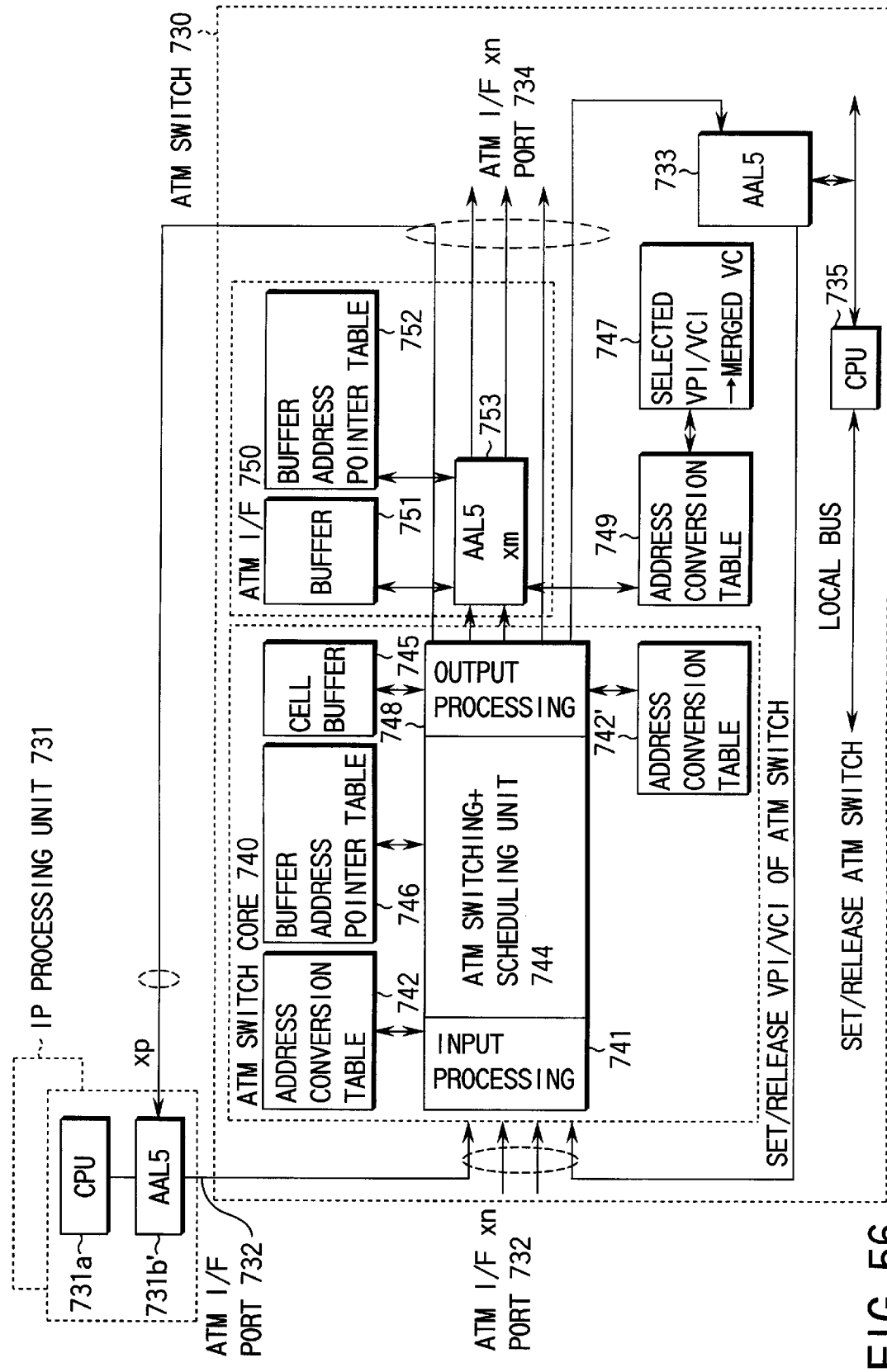
FIG. 56 is a diagram showing the arrangement of a modification of the seventh embodiment.

A modification of the seventh embodiment of the present invention will be described below with reference to FIG. 56.

The functions of an ATM switch core 740 will be explained first. The ATM I/F input side will be explained. The functions of the ATM switch core 740 can be simpler than those of the ATM switch core 720 described above with reference to FIG. 53. The ATM switch core 740 in this modification is constructed by an input processor 741 for processing input cells, an address conversion table (not always necessary) 742 for performing address conversion for the purpose of internal processes of the ATM switch, an ATM switching+scheduling section 744 for providing ATM switching and scheduling functions, a cell buffer 745 for storing received cells, a buffer address pointer table 746 which serves as a controller for storing or reading out the cell, i.e., controls the address, attributes (QOS, priority, and the like), pointer, and the like of the cell buffer, and an address conversion table 742' which performs VPI/VCI address conversion upon outputting cells to an ATM I/F 750. Cell data undergo an output process in an output processor 748, and are then input to the ATM I/F 750.

The output ports of the ATM switch core 740 are connected to the ATM I/F 750, which comprises an AAL5 section 753 that provides an SAR (Segmentation and Reassembly) function on a port that supports topology driven in the ATM I/F 750, a buffer 751, a buffer address pointer table 752 for managing the addresses of the buffer 751, an address conversion table 749 for performing address conversion, and a table, i.e., a Selected VPI/VCI→Merged VC section 747, to which information as to whether or not VC merge is made can be referred. Note that the address conversion table 749 may also provide the function of the Selected VPI/VCI→Merged VC section 747.

Note that a plurality of (m) AAL5 sections 753 of this embodiment are connected to output ports of an ATM switch 730. The AAL5 section 753 performs segmentation and reassembly of cells to be described later.

Furthermore, the AAL5 section 723 is connected to the ATM switch core 740, but basically used for connecting a CPU 735 of the ATM switch 730 and a CPU 731a of an IP processing unit 731 via the ATM switch core 740 and ATM I/F 750 when these CPUs communicate with each other. The CPU 735 of the ATM switch 730 is the one for managing the device, and controls the ATM switch 730 upon receiving an instruction from the IP processing unit 731 in accordance with the CSR protocol. That is, the CPU 735 controls the ATM switch core 740 to set or release VPI/VCI and control the aforementioned various tables and the like.

FIG. 57 is a view for explaining the operation of the modification of the seventh embodiment of the present invention. In this modification, a CS-PDU is read out by connection AAL5 to the output port of the ATM switch, and is then segmented and reassembled. Such operation is equivalent to scheduling in units of PDUs, and such method can also align cells.

More specifically, referring to FIG. 57, cells input to the ATM switching+scheduling section 744 include those having different QOS classes (priority 1, priority 2), as shown in FIG. 57A, and PDUs cannot be normally reassembled. Hence, these cells are input to the AAL5 section 753 and are segmented in units of cells by an AAL5 segmentation section 753a under the control of the CPU 735. Then, an AAL5 reassembly section 753b reassembles the segmented cells into a packet in units of PDUs in accordance with their QOS classes (priority 1, priority 2). As a result, the cells are aligned, as shown in FIG. 57B. Those cells are aligned and output in descending order of priority.

FIG. 58 shows another example of the aforementioned modification of the seventh embodiment, in which the AAL5 section 753 is provided to a specific port of the ATM switch.

As described above, in this embodiment, topology driven is supported as a function of the CSR. Upon merging packets to be forwarded to subnets having identical addresses into a single cut-through path, VCs are enqueued per PDU in units of output ports of the ATM switch or concentratedly by the aforementioned method, thereby aligning cells by a shaping function. As another method, AAL5 is connected to an output port or specific port of the ATM switch to read out a CS-PDU and then to segment and reassemble it, thus scheduling in units of PDUS. Therefore, an ATM relay device having dual modes which can selectively use cut-through paths in units of communication quality classes can be provided.

According to the seventh embodiment, since cells to be forwarded are aligned and merged in units of PDUs in correspondence with the required communication quality, an ATM relay device having dual modes which can selectively use cut-through paths in units of communication quality classes can be provided.

Eighth Embodiment

The eighth embodiment of the present invention will be described in detail below with reference to the drawings.

The outline of this embodiment will be explained first. This embodiment aims at effectively setting cut-through trigger information, which is fixedly set in the prior art. In order to design effective cut-through trigger information, the forwarding state of actual packets must be monitored and analyzed. There are two points to be monitored: monitoring of the protocol information and port number of an IP packet to be forwarded, and monitoring of the source and destination IP addresses of an IP packet to be forwarded.

These are currently implemented by two different cut-through modes in the label switching technique, i.e., the flow-driven and topology-driven modes. In the flow-driven mode, the forwarding mode is shifted to the cut-through mode on the basis of the protocol information and port information in the header of an IP packet. In the topology-driven mode, the forwarding mode is shifted to the cut-through mode on the basis of the source and destination IP addresses in the header of an IP packet.

Figure 59A:
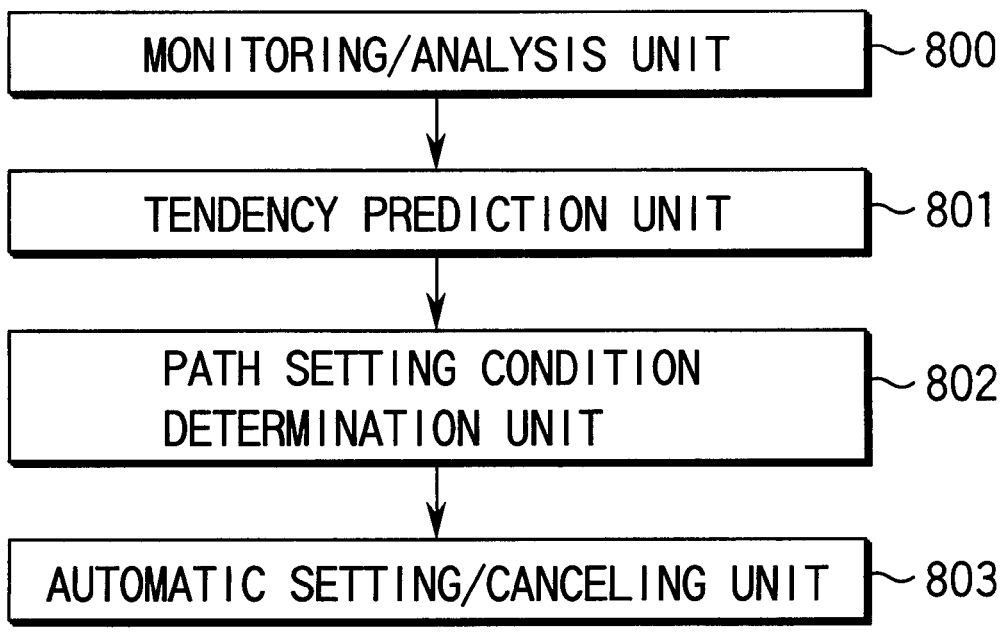
FIGS. 59A and 59B are diagrams for schematically explaining a packet forwarding state monitoring device according to the eighth embodiment of the present invention.
Figure 59B:
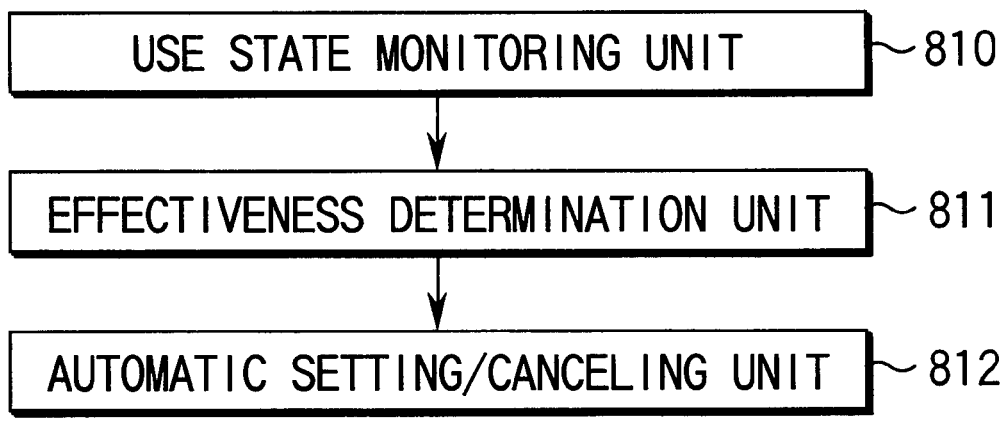

FIGS. 59A and 59B are diagrams for explaining the outline of a packet forwarding state monitoring device of this embodiment. In this embodiment, in consideration of the aforementioned two modes, a monitoring/analysis unit 800 shown in FIG. 59A monitors and analyzes the forwarding state of IP packets for a middle or long period of time. Based on the monitoring/analysis results, a tendency prediction unit 801 predicts the forwarding tendency of IP packets for a middle or long period of time. A path setting condition determination unit 802 then determines flow or topology, in which the cut-through mode may function effectively, on the basis of the predicted result. An automatic setting/canceling unit 803 automatically sets cut-through trigger information along with a change in time, and cancels the setup if it is determined that the setup is ineffective.

For packets which have already set with cut-through trigger information, the following processes are done. That is, referring to FIG. 59B, a use state monitoring unit 810 monitors the use state of packets which have already been set with cut-through trigger information, and an effectiveness determination unit 821 determines if the setup functions effectively. For setup which is determined not to function effectively, a canceling/re-setting unit 822 automatically cancels cut-through trigger information and resets the information if a more effective condition is found.

In this manner, by adopting effective cut-through trigger information, the load on a router using the label switching technique and a network including such router can be reduced, thus realizing high-speed packet forwarding and efficient use of the network.

Figure 60:
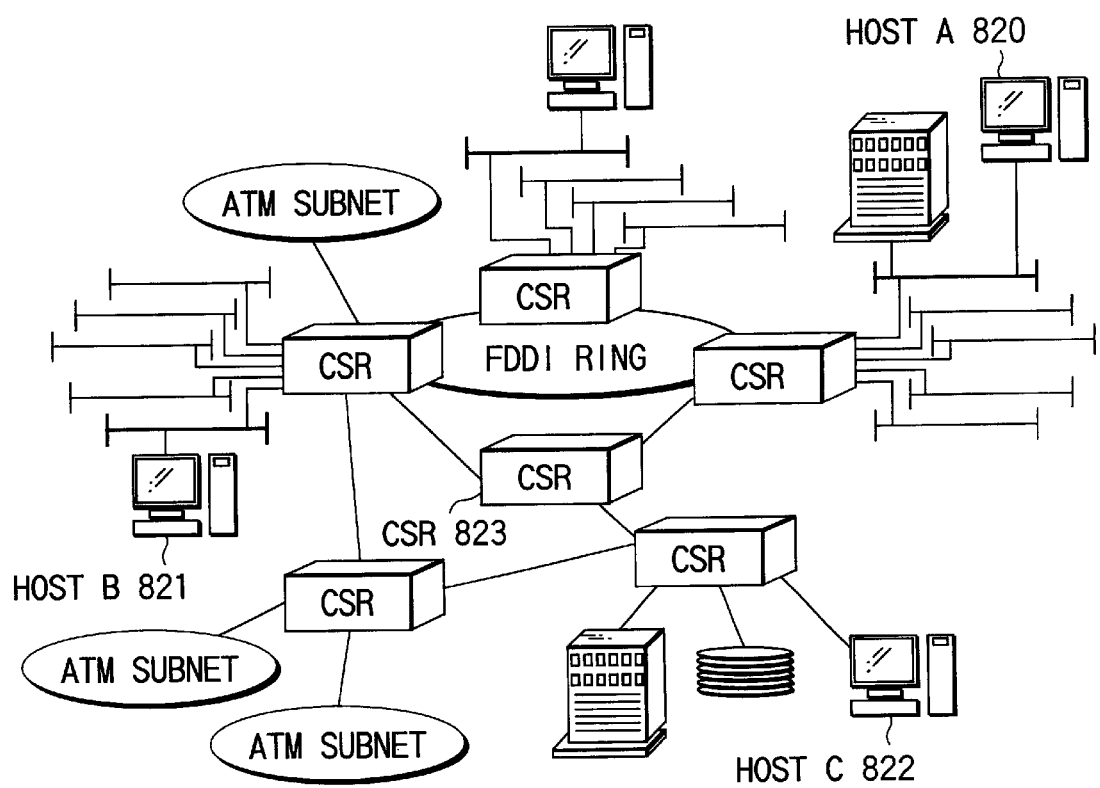
FIG. 60 is a diagram showing an example of a network including CSRS.

The aforementioned outline will be described in more detail below with reference to the drawings. FIG. 60 shows an example of a network that includes CSRs. Operations on a CSR 823 upon forwarding files between host A (820) and host B (821), between host B (821) and host C (822), and between host A (820) and host C (822) will be examined below.

Figure 61:
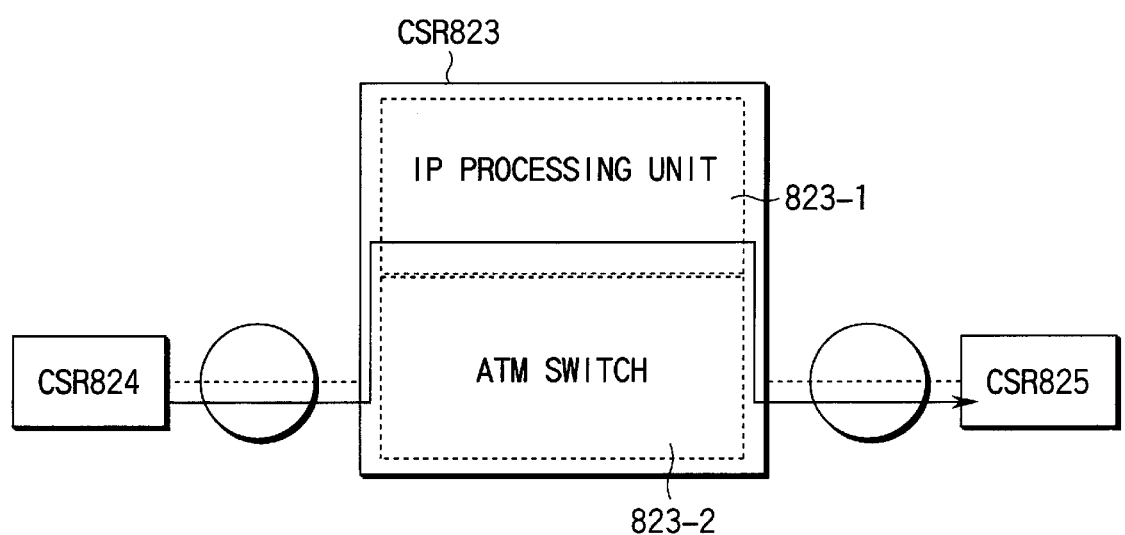
FIG. 61 is a diagram showing the flow of IP packets upon hop-by-hop forwarding.

An IP packet input to the CSR 823 is sent to its IP processing unit (IP controller) 823-1 to undergo a process (IP process) on the network layer level, as indicated by an arrow in FIG. 61, and is forwarded to the next hop (CSR 825). In case of this IP process, the protocol information, port number, and source and destination IP addresses are read from the header of the IP packet, and are compared with cut-through trigger information to check if the forwarding mode shifts to the cut-through mode. In case of the CSR, upon shifting to the cut-through mode, a communication is made with a neighboring CSR using a protocol called FANP to make negotiation that pertains to a cut-through path.

Figure 62:
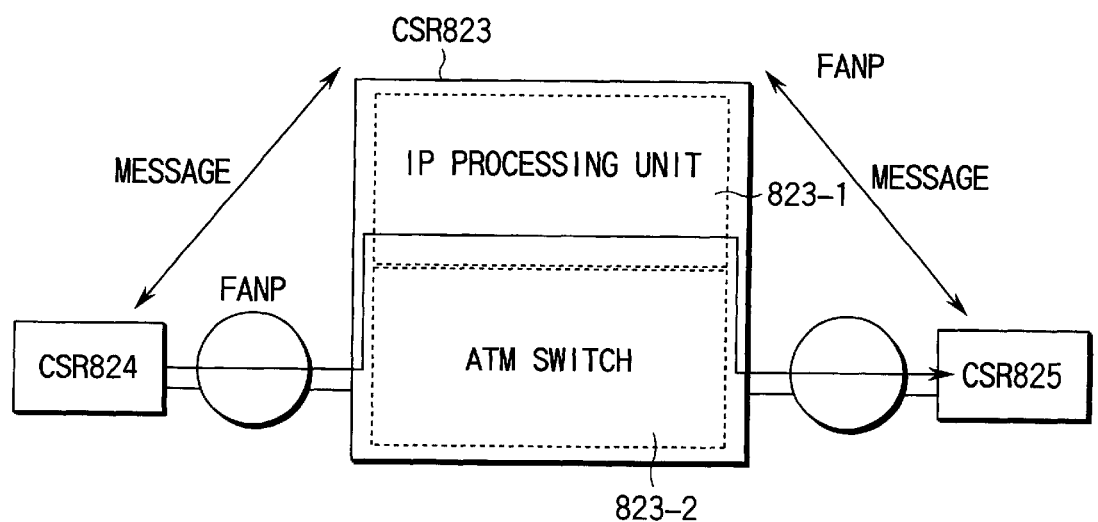
FIG. 62 is a diagram showing the operation of the CSR upon receiving a cut-through trigger.

FIG. 62 shows the operation of the CSR upon receiving a cut-through trigger. The protocol information, port number, and source and destination IP addresses of IP packets which do not shift to the cut-through mode are monitored for a middle or long period of time, and data that pertains to the forwarding state of IP packets, as shown in FIG. 65, are generated.

In the example shown in FIG. 65, the number of forwarded IP packets are totaled at 3-hour intervals. ○/X indicates a specific date, and ○/Δ indicates that the next day has started. Assume that such data are collected for a week, and the following tendencies are predicted from the total data.

1. Between hosts A and B, many packets of TCP/23 are forwarded at 18:00 to 3:00 nearly everyday, but only a very small number of packets are forwarded in other hours.

2. Between hosts A and C, many packets of UDP/300 are forwarded only on weekdays. No packets of UDP/300 are forwarded on holidays.

3. Between hosts B and C, many packets of TCP/21 are forwarded at 9:00 to 21:00 on weekdays. A very small number of packets are forwarded on holidays.

In this case, it is determined that the following conditions are effective for setting cut-through trigger information.

1. Between hosts A and B, cut-through trigger information for TCP/23 is effectively set at only 18:00 to 3:00.

2. Between hosts A and C, fixed cut-through trigger information for UDP/300 is effectively set.

3. Between hosts B and C, cut-through trigger information for TCP/21 is effectively set at only 9:00 to 21:00 on weekdays.

The aforementioned effective cut-through trigger information must be determined with reference to the number of packets forwarded per unit time in which the cut-through mode becomes effective. The number of packets forwarded per unit time used as a reference is calculated in consideration of the shift performance to the cut-through mode of the CSR.

The recommended cut-through trigger information determined in this manner is automatically set along a change in time.

Furthermore, the use state of the network is changing everyday, and the recommended cut-through trigger information which has been determined once may become ineffective in some cases. Hence, whether or not the cut-through mode used functions effectively is monitored to cancel ineffective cut-through trigger information.

Figure 63:
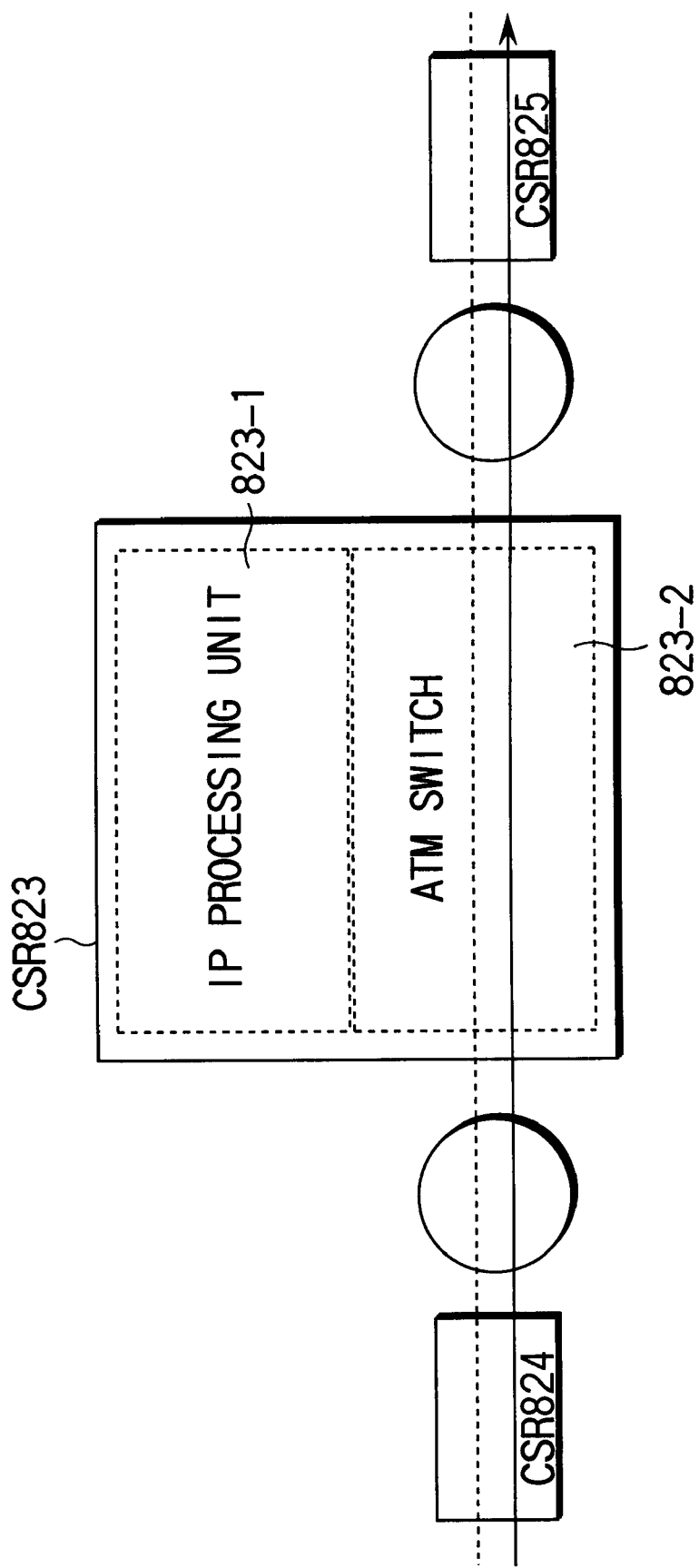
FIG. 63 is a diagram showing the operation of the CSR in a cut-through mode.

However, in the cut-through mode, unlike the hop-by-hop forwarding mode shown in FIG. 61, if ATM forwarding is used in the layer-2 or lower, no IP process is done, as shown in FIG. 63. Hence, in such case, the number of ATM cells are monitored in units of ATM ports, and VPI and VCI values in place of information in the IP header.

Figure 64:
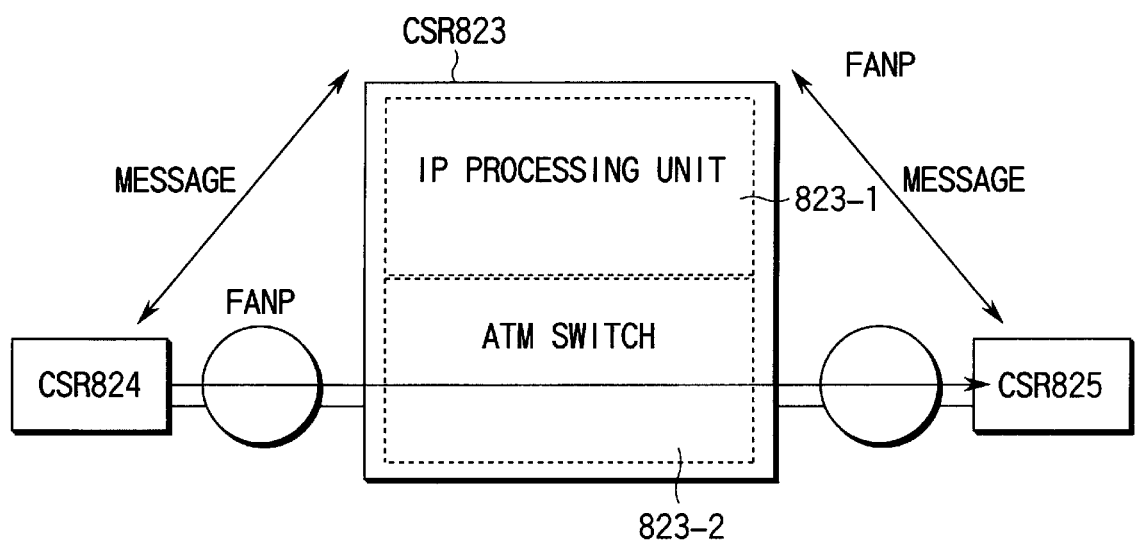
FIG. 64 is a diagram showing the shift operation from cut-through forwarding to hop-by-hop forwarding.

The number of cells per unit time is used as a reference at that time. If the number of cells per unit time as the monitoring result does not exceed a reference value, it is determined that cut-through does not effectively function. Then, the set ineffective cut-through trigger information is automatically canceled. Upon canceling, if that cut-through forwarding has already been done, the ineffective cut-through trigger information is canceled, and cut-through forwarding is forcibly switched to hop-by-hop forwarding, as shown in FIG. 64.

In the aforementioned embodiment, the forwarding state of packets is monitored along with an elapse of time to set cut-through trigger information. However, the present invention is not limited to such specific method, and cut-through trigger information may be set in accordance with the topographical condition of the location of a router or the priority levels of packets to be forwarded.

According to the eighth embodiment mentioned above, since a router itself that uses the label switching technique determines and automatically sets a condition for shifting the forwarding mode to an effective cut-through mode, and monitors the effectiveness of cut-through forwarding after the condition is set, the network can be efficiently used, and the load on the network administrator can be reduced.

Ninth Embodiment

The ninth embodiment of the present invention will be described in detail below with reference to the drawings.

Figures 66, 67:
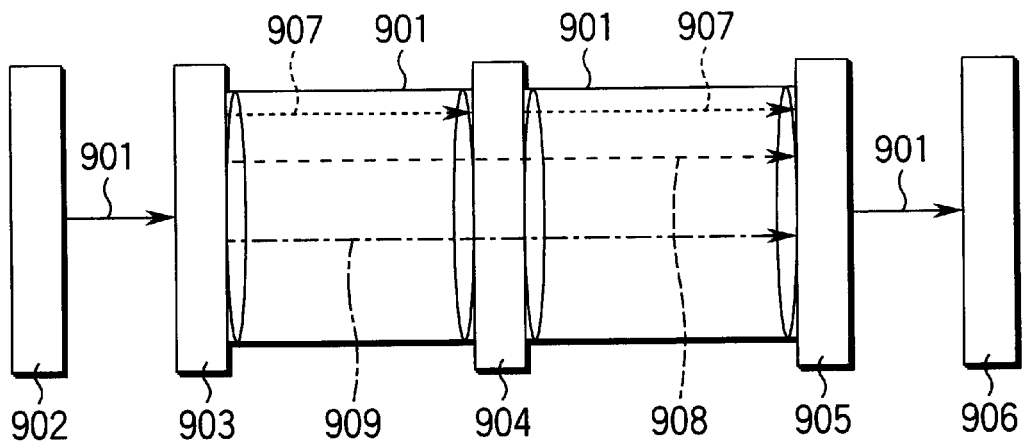
FIG. 66 is a diagram showing the system arrangement to which a designated path setting method according to the ninth embodiment of the present invention is applied.
FIG. 67 is a table showing various examples of QOS request conditions.

FIG. 66 shows the system arrangement to which a designated path setting method of this embodiment is applied, i.e., shows a network with a configuration obtained by arbitrarily connecting routers 903 and 905, which are located at boundaries between a label switch network and a network constructed by another device or label switch, a router 904 located within the label switch network, and routers 902 and 906 of networks constructed by another device or label switch via physical lines 901.

Referring to FIG. 66, reference numeral 907 denotes a path used for passing all data except for when a logic line designated path is set. Reference numeral 908 denotes a designated path set upon receiving a non-strict QOS request; and 909, a designated path set upon receiving a strict QOS request. In this embodiment, assume that QOS information is inserted in a packet header, as will be described later. In this designated path, the bandwidth can be preserved. FIG. 66 depicts data flows in only one way, but data can be sent two ways.

In this embodiment, two kinds of QOS information, i.e., strict and non-strict ones, will be explained for the sake of simplicity. However, different QOS request levels can be set in correspondence with the number of designated paths that can be set. Also, various QOS request conditions are known, but 1 to 4 in FIG. 67 show some examples of such conditions. When discard is permitted, a plurality of levels may be set. Also, in some cases, the use bandwidth may not be determined.

FIGS. 68 to 74 show the setting processes of a designated path based on QOS information used in this embodiment.

Figure 68:
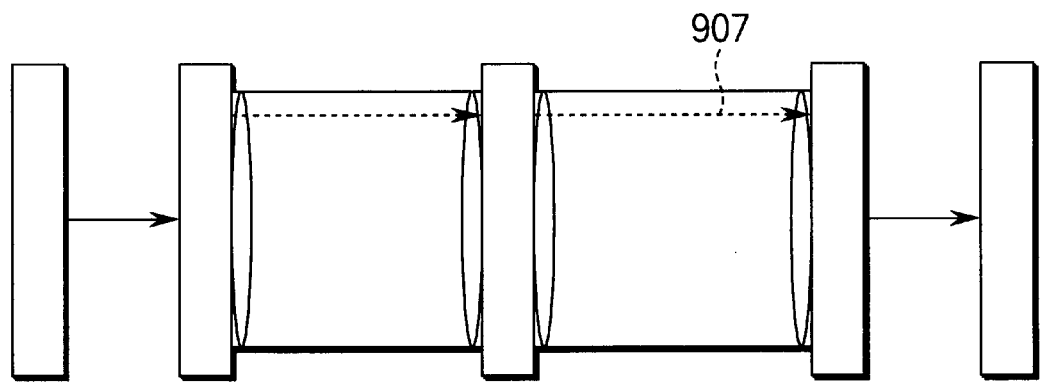
FIG. 68 is a diagram showing a state wherein no data flows through a line.

FIG. 68 shows a state wherein no data flows.

Figure 69:
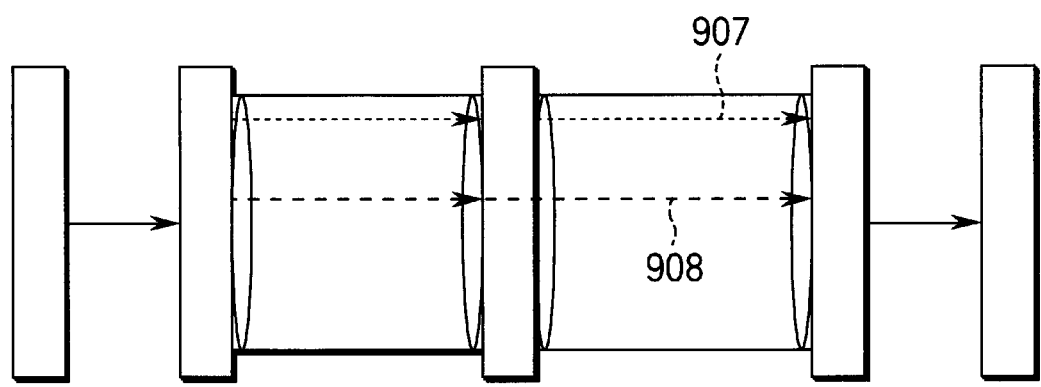
FIG. 69 is a diagram showing a state wherein a designated path with a non-strict QOS request is set in the state shown in FIG. 68.

In the label switch network, only a path 907 for forwarding all data hop by hop is set. This path 907 may be set immediately after data has begun to flow. When a packet from the router 902, which is addressed to the router 906 and carries information with a non-strict QOS request, has arrived at the router 903, the router 903 refers to designated path setting information for each set QOS information by a setting method to be described later, and determines if a designated path is set. When it is determined that a designated path is set, a designated path 908 for a non-strict QOS request is set, and the state changes, as shown in FIG. 69. On the other hand, when it is determined that a designated path is not set, the state shown in FIG. 68 is maintained, and the packet is forwarded hop by hop along the path 907.

After the state has changed, as shown in FIG. 69, packets with an identical destination, identical QOS level, and identical destination port information are forwarded along the designated path 908. In this state, upon receiving a packet which has the same QOS information as that upon setting the designated path previously but a different destination port, the identical designated path is used.

Figure 71:
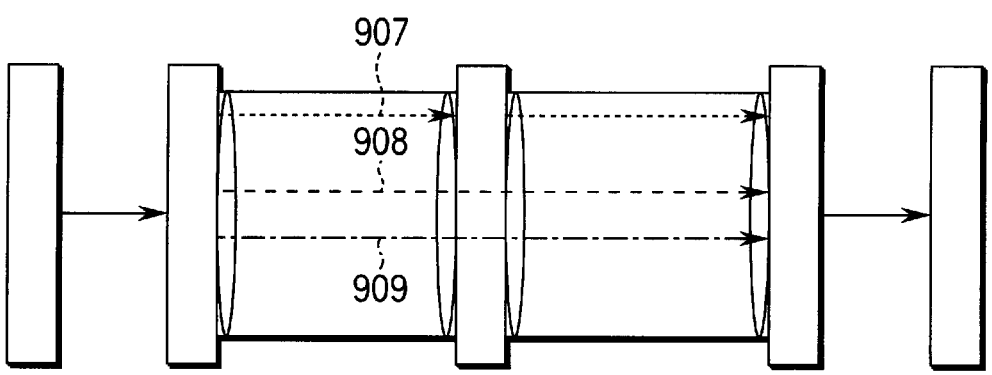
FIG. 71 is a diagram showing a state wherein a designated path with a non-strict QOS request and a designated path with a strict QOS request are set upon receiving a packet with a strict QOS request while the designated path with a non-strict QOS request is set.

Upon receiving a packet with a strict QOS request in the state shown in FIG. 69, a designated path is set with reference to the designated path setting information. As a result, a designated path 909 is set, and the state changes, as shown in FIG. 71. After that, packets with an identical destination, identical QOS information, and identical destination port are forwarded along the designated path 909.

Figure 74:
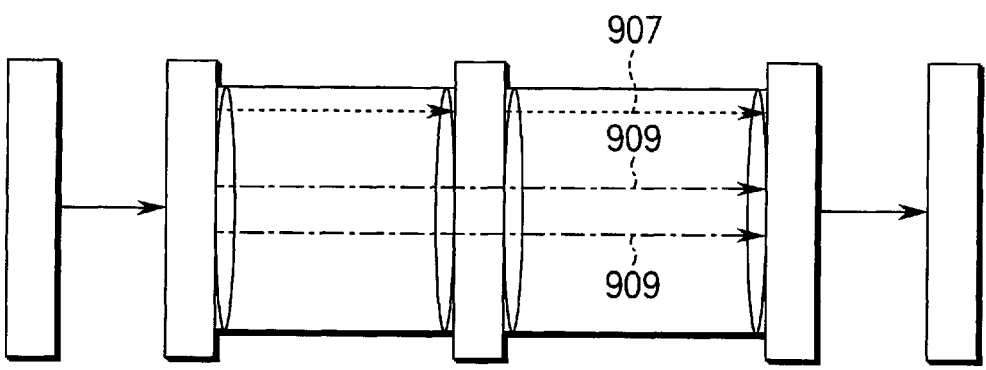
FIG. 74 is a view showing a state wherein two designated paths with a strict QOS request and one designated path with a non-strict QOS request are set.

Upon receiving a packet with a strict QOS request (may or may not be the same as the previous QOS information), identical destination, and different destination port in the state shown in FIG. 71, a designated path is set with reference to new QOS information. As a result, another designated path 909 for a strict QOS request is set, and the state changes, as shown in FIG. 74. After that, packets with an identical destination, identical destination port, and identical QOS are forwarded along this designated path 909.

Figure 70:
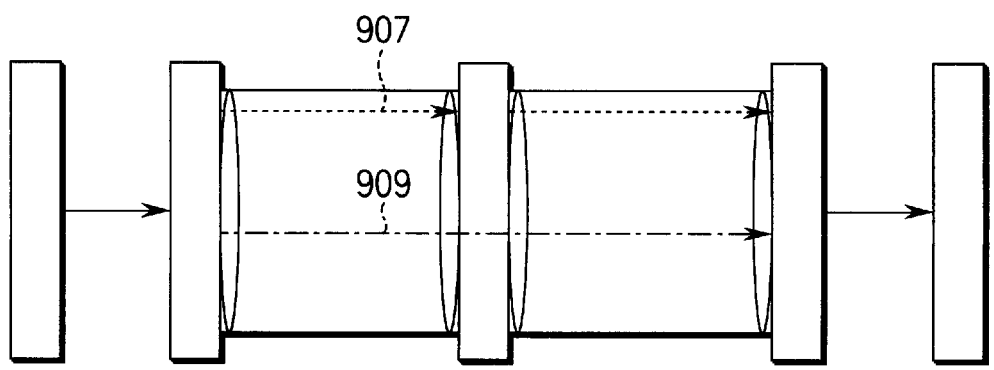
FIG. 70 is a diagram showing a state wherein a designated path with a strict QOS request is set in the state shown in FIG. 68.

On the other hand, upon receiving a packet with a strict QOS request in the state shown in FIG. 68, a designated path of the corresponding information is set with reference to the designated path setting information. In this manner, a designated path for a strict QOS request is set, and the state changes, as shown in FIG. 70. After that, packets with an identical destination, identical destination port, and identical QOS information are forwarded along this designated path 909.

Figure 72:
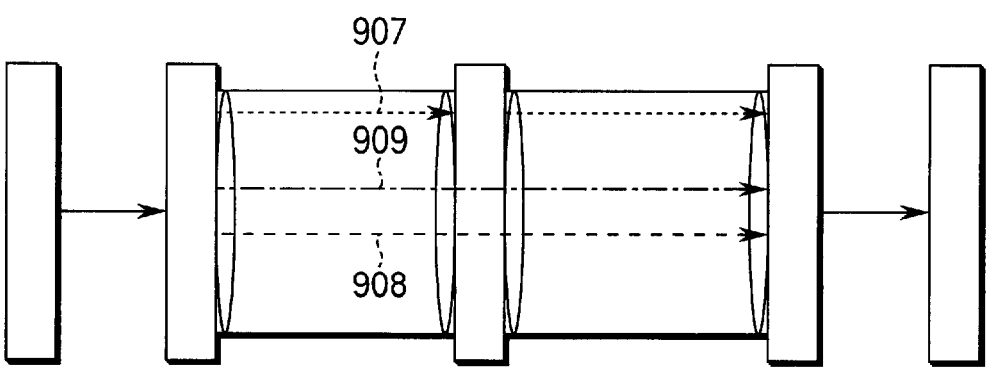
FIG. 72 is a diagram showing a state wherein a designated path with a non-strict QOS request and a designated path with a strict QOS request are set upon receiving a packet with a non-strict QOS request while the designated path with a strict QOS request is set.

Upon receiving a packet with a non-strict QOS request in the state shown in FIG. 70, if it is determined with reference to the designated path setting information that a new designated path must be set, new designated path is set. As a result, a new designated path 908 for a non-strict QOS request is set, and the state changes, as shown in FIG. 72. After that, packets with an identical destination and identical QOS are forwarded to that port.

Figure 73:
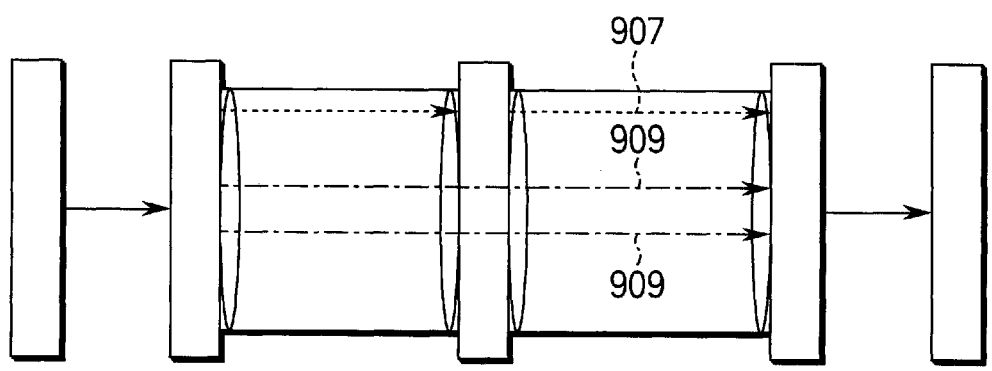
FIG. 73 is a diagram showing a state upon receiving a packet with a strict QOS request while the QOS request is strict.

On the other hand, when it is determined that a designated path need not be set, packets with an identical destination and identical QOS are forwarded hop by hop. Upon receiving a packet with a strict QOS request (may or may not be the same as the previous QOS information), identical destination, and different destination port in the state shown in FIG. 70, a new designated path is set with reference to the QOS information. In this case, a new designated path 909 is set, and the state changes, as shown in FIG. 73. After that, packets with an identical destination, identical destination port, and identical QOS are forwarded along that designated path.

Figure 75:
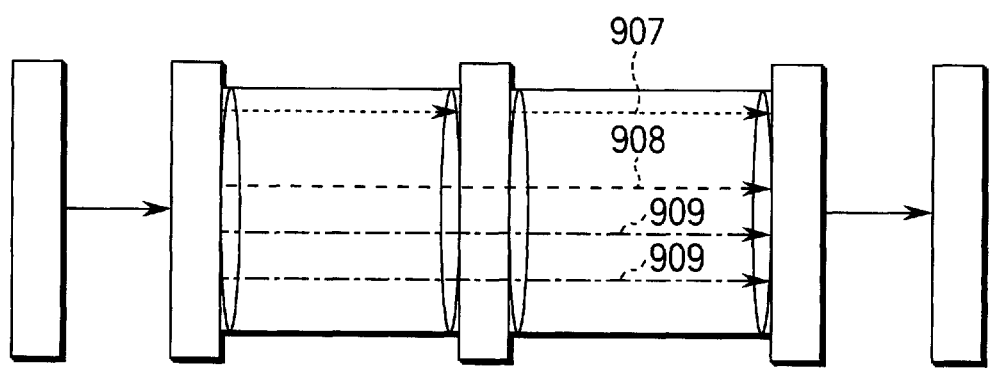
FIG. 75 is a diagram showing a state wherein designated paths in units of QOS classes are set upon starting up the system.

FIG. 75 is a diagram showing a state wherein designated paths in correspondence QOS information types are set upon starting up the system. In this method, designated paths 907, 908, and 909 corresponding to all the QOS types are set upon starting up the system, and upon receiving a given packet, that packet is forwarded along the designated path of the corresponding QOS.

Figure 76:
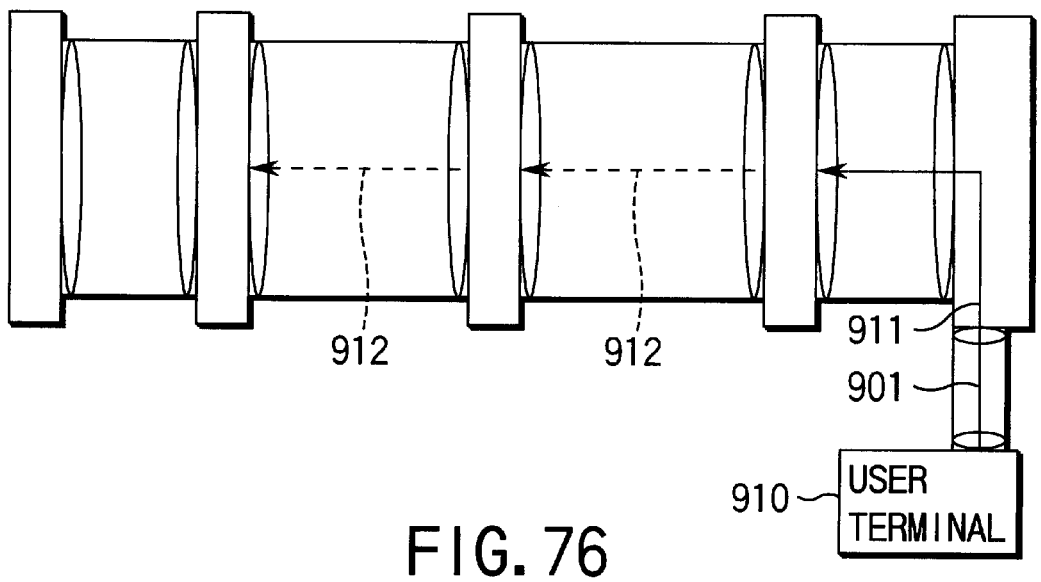
FIG. 76 is a diagram showing an example wherein a user terminal informs setup information of designated paths in units of QOS classes.
Figure 77:
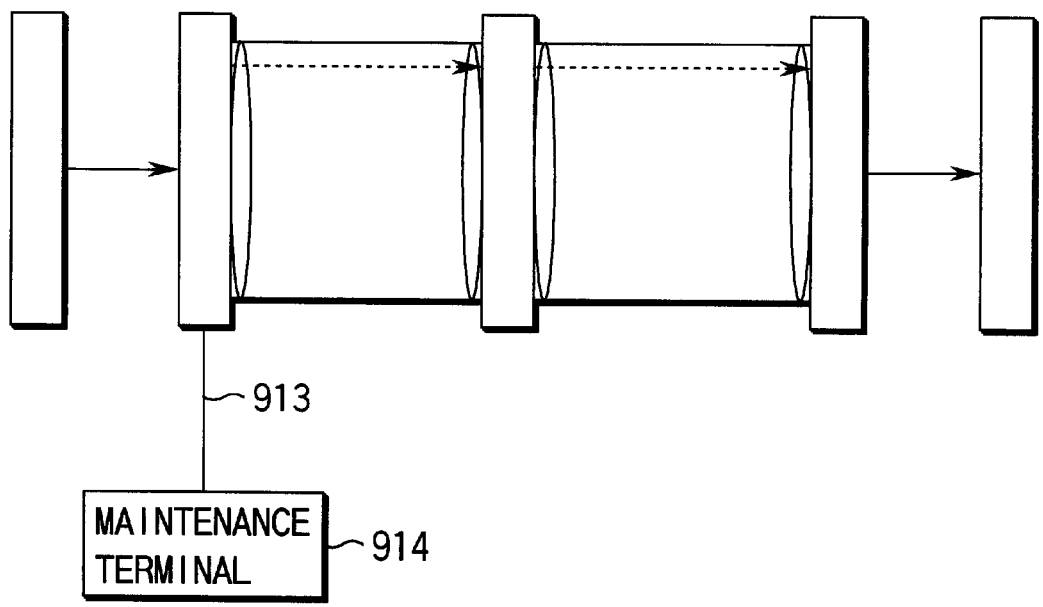
FIG. 77 is a diagram showing an example wherein a maintenance terminal inputs designated path setup information for each QOS information.

FIGS. 76 and 77 are diagrams for explaining other designated path setting methods. These figures show methods of determining how to set a designated path in correspondence with a QOS type upon setting designated paths in units of QOS information types. As shown in FIG. 76, in case of QOS information having data that pertains to a designated path from a user terminal 910, the user terminal 910 forwards information such as the bandwidth, delay, discard, and the like. Referring to FIG. 76, reference numeral 911 denotes a message which is output from the user terminal 910 and pertains to designated path setting information for each QOS information; and 912, a request information message from the user terminal 910.

On the other hand, as shown in FIG. 77, a method in which a maintenance person inputs a message that pertains to designated path setting information for each QOS information at a maintenance terminal 914 may be used. Referring to FIG. 77, reference numeral 913 denotes a maintenance terminal connection physical line. Also, default information may be provided to allow operations even when no designated path is set by any external terminal.

Figure 78:
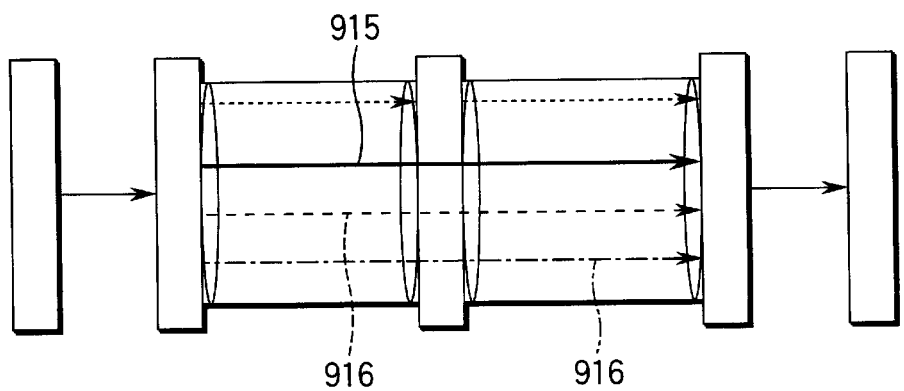
FIG. 78 is a diagram showing a state wherein a designated path with necessary request conditions upon starting up is set and, after that, a new designated path is generated upon generation of a data transmission request.

As still another setting method, only designated paths for request conditions required upon starting up the system are set, and upon receiving data with a non-corresponding request condition, another designated path may be set within the remaining bandwidth using a predetermined algorithm. FIG. 78 is a diagram showing a state wherein designated paths for request conditions required upon starting up the system have already been set, and thereafter, a new designated path is generated upon generation of a data transmission request. Referring to FIG. 78, reference numeral 915 denotes a designated path set for a specific request upon starting up the system. Reference numeral 916 denotes designated paths which do not correspond to that set upon starting up the system, and are generated upon generation of a data transmission request.

This method has a great advantage, i.e., can initially assure a required bandwidth upon starting up the system in terms of bandwidth assurance. In this embodiment, many kinds of request conditions are not used for the sake of simplicity. However, in practice, designated paths can be set in correspondence with more request conditions.

Figure 79:
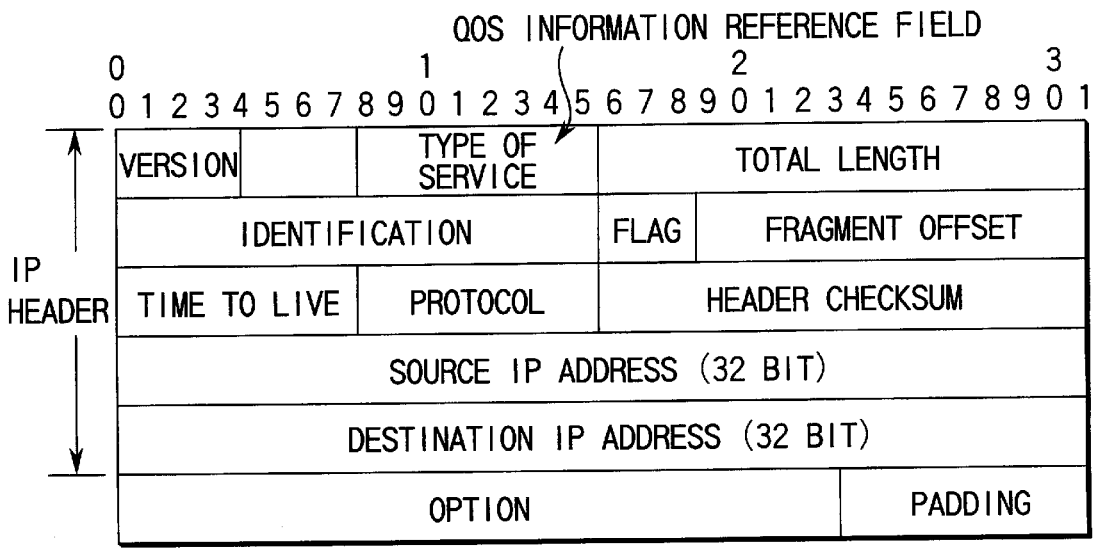
FIG. 79 is a view showing a field in which QOS information is inserted in a header used in IPv4.
Figure 80:
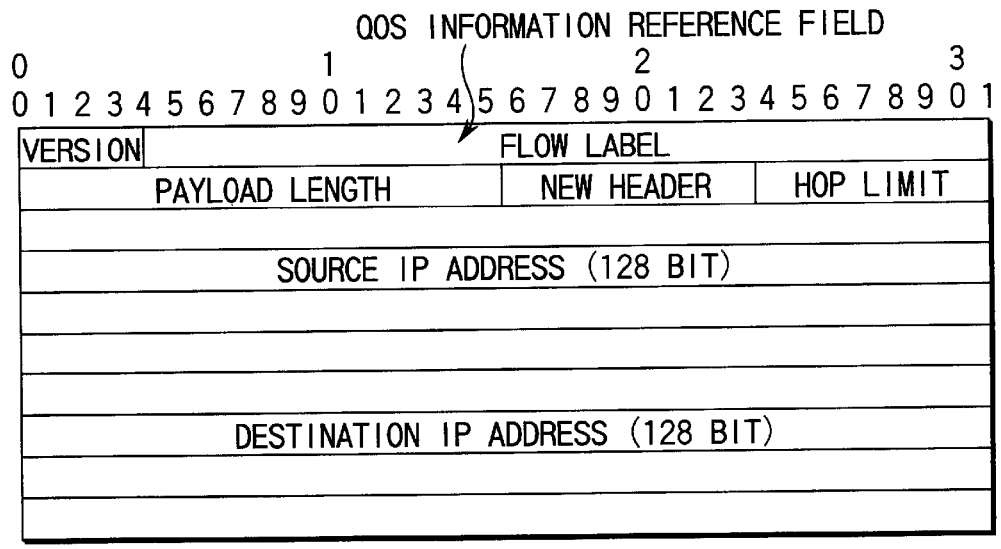
FIG. 80 is a view showing a field in which QOS information is inserted in a header used in IPv6.

FIG. 79 is a table showing that a Type of Service field is used as a field in which QOS information is inserted in the IPv4 header format, and FIG. 80 is a table showing that a Flow Label field is used as a field in which QOS information is inserted in the IPv6 header format.

According to the above-mentioned embodiment, packet forwarding that takes service quality differences into consideration while assuring QOS information of packets can be implemented. For example, in case of a packet having a strict QOS request, which does not permit any time delay, a path for preferentially passing this packet is set, thus preventing packet forwarding from delaying. Similarly, in case of a packet which must not be discarded, a path for preferentially passing this packet is set, thus preventing the packet from being discarded.

In the above embodiment, only QOS information has been explained. Also, the present invention can be applied to equivalent information, and a designated path can be set using such information. For example, a packet with specific quality can be forwarded to only a specific destination.

According to the ninth embodiment described above, a designated path setting method, which can implement packet forwarding that takes service quality differences into consideration while assuring QOS information of packets, can be provided.

10th Embodiment

The 10th embodiment of the present invention will be described in detail below with reference to the drawings.

In the existing protocols for nodes of a LAN, network layer protocols such as IP, IPX, AppleTalk, and the like are mainly used on the data link layer. As routing protocols running on these protocols, RIP (Routing Information Protocol), OSPF (Open Shortest Path Fast), BGP (Border Gateway Protocol), and the like are available.

In order to use these routing protocols on an ATM switch, an IP (or IPX, etc.) may be provided on the ATM layer as a protocol stack of the ATM switch. As one technique for implementing such use, IP over ATM is known. Such technique is called a topology-driven scheme since the network topology (configuration) serves as a trigger upon setting a connection when a connection is set on the basis of a routing table entry generated by a routing protocol (to be described later).

The arrangement of this embodiment is implemented by adding to the ATM switch, a protocol for setting a connection for routing information on the IP over ATM, a protocol for setting a connection based on a routing table entry generated by a routing protocol on the IP of the IP over ATM, an ATM layer control function of setting an ATM connection by an SVC (Switched Virtual Connection) from the IP of the IP over ATM, and a function of allowing a signaling processing unit for setting an SVC to refer to the routing table entry, so as to attain routing by the routing protocol used in the IP protocol.

In this embodiment, the routing protocol used in the IP protocol is directly used on the ATM switch, and an SVC is used upon setting an ATM connection. The signaling processing unit that sets the SVC refers to a routing table entry generated by the routing protocol, thus setting an end-to-end connection at high speed, thereby reducing the number of connections.

Figure 81:
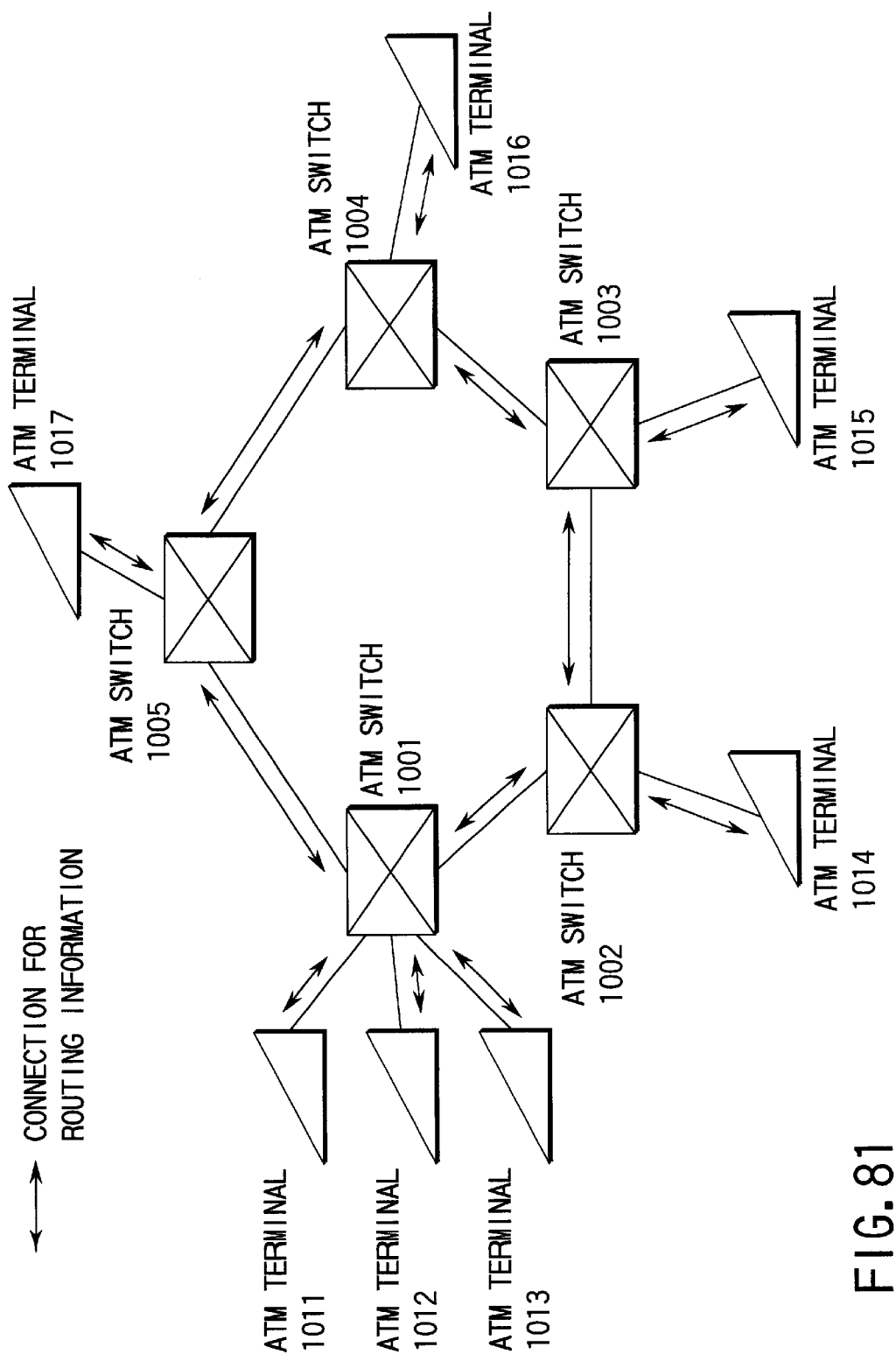
FIG. 81 is a diagram showing the arrangement of an ATM network to which the 10th embodiment of the present invention is applied.

FIG. 81 is a diagram showing the arrangement of an ATM network to which the 10th embodiment of the present invention is applied. The network shown in FIG. 81 is built by ATM switches 1001 to 1005 and ATM terminals 1011 to 1017, and ATM lines connect between the respective switches and between each switch and terminal.

Figure 82:
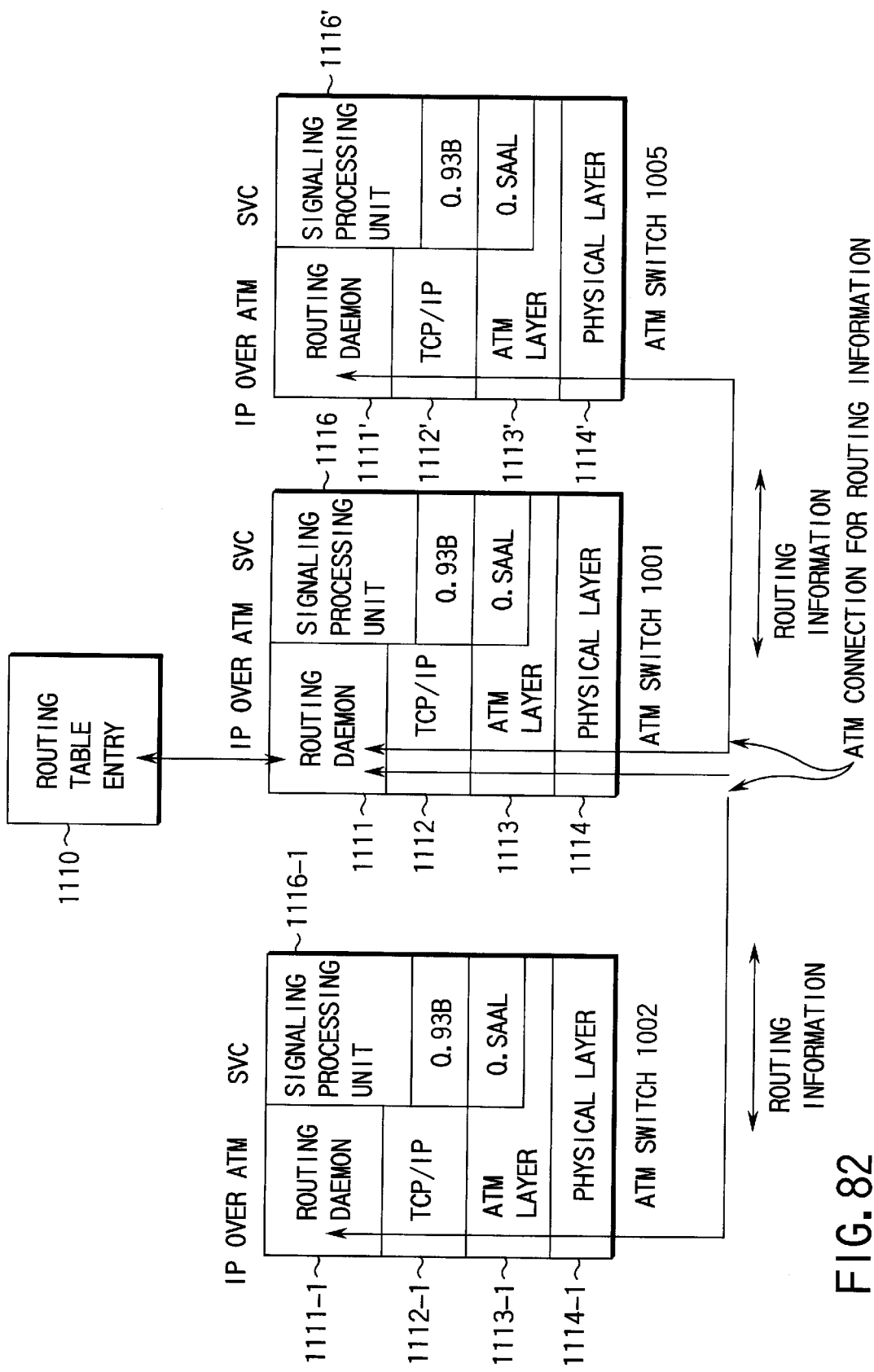
FIG. 82 is a diagram showing protocol stacks of ATM switches and the flow of routing information in this embodiment.

The following explanation will be given taking the ATM switch 1001 as an example. The ATM switch 1001 sets a single IP over ATM connection for routing information with each of neighboring nodes and terminals (see FIG. 81). This connection is set by a PVC (Permanent Virtual Connection) but may be set by an ARP server or SVC. As shown in FIG. 82, after the connections are set, the ATM switch 1001 executes routing based on an existing routing protocol such as RIP, OSPF, BGP, or the like by the IP on the IP over ATM. At this time, routing information is exchanged between the neighboring nodes and terminals via a routing daemon 1111 (1111', 1111-1), TCP/IP 1112 (1112', 1112-1), ATM layer 1113 (1113', 1113-1), and physical layer 1114 (1114', 1114-1), thus generating a routing table entry 1110. FIG. 82 depicts exchanges of routing information only between the ATM switches 1001 and 1002 and between the ATM switches 1001 and 1005, but routing is similarly done between other neighboring ATM switches and ATM terminals. Reference numeral 1116 (1116', 1116-1) denotes a signaling processing unit.

If an entry (destination: ATM terminal 1016, relay node: ATM switch 1005) is generated as the routing table entry of the ATM switch 1001, the ATM switch 1001 issues, to the ATM switch 1005, a setting request of a connection as an SVC to the ATM terminal 1016 using a connection setting protocol on the IP.

Figure 83:
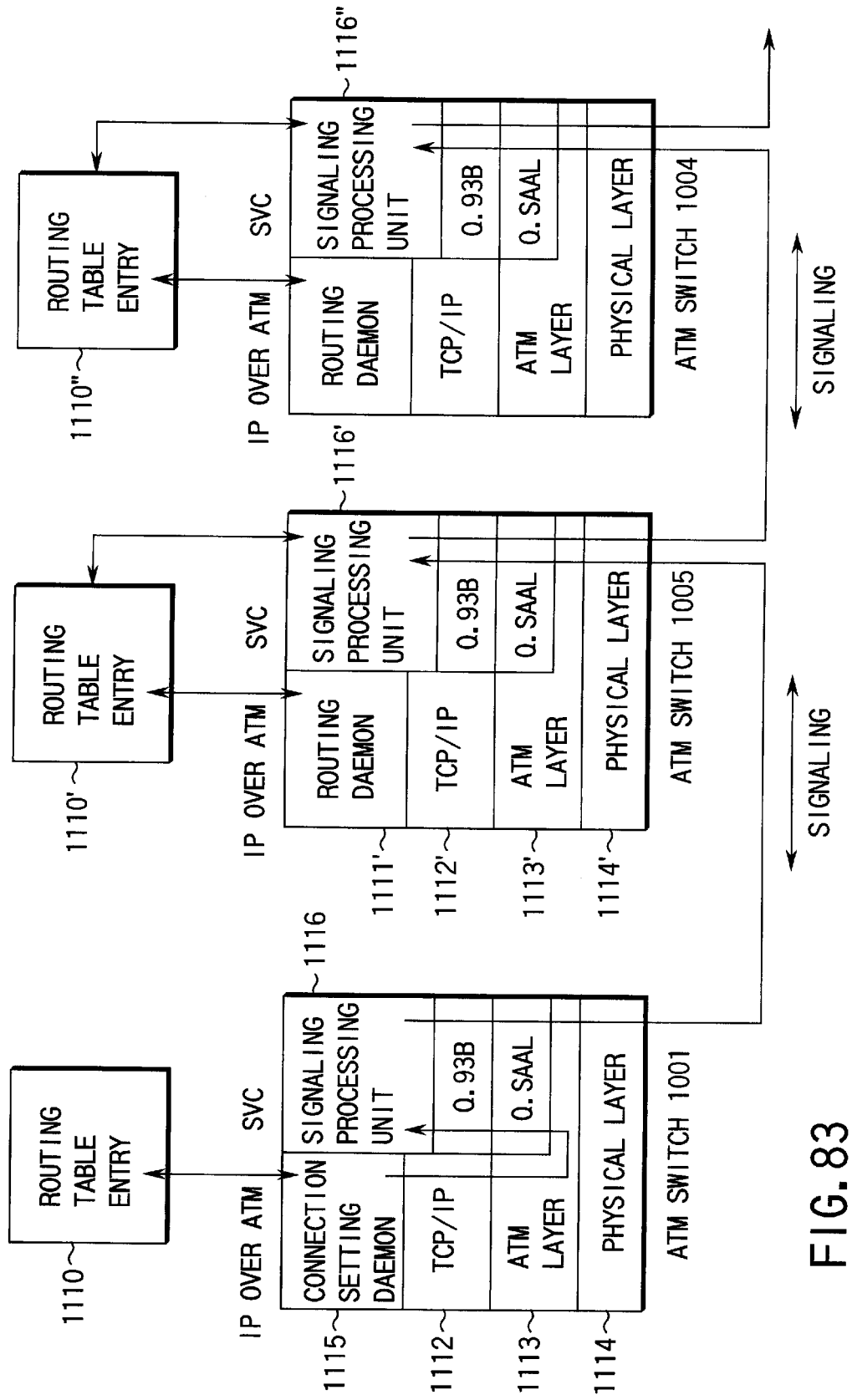
FIG. 83 is a diagram showing the flow of signaling information upon setting an SVC in this embodiment.

As shown in FIG. 83, the connection setting request is issued by a protocol (connection setting daemon) 1115 on the IP of the IP over ATM with respect to the ATM layer 1113, which issues a request to the signaling processing unit 1116 without sending it to the physical layer 1114. The ATM switches 1005 and 1004 as relay nodes receive the same request as a normal connection setting request using an SVC, and the signaling processing units 1116' and 1116" each obtain the next node for which a connection is to be set, by directly referring to routing table entries 1110' and 1110" generated by the routing protocol on the IP of the IP over ATM.

Figure 84:
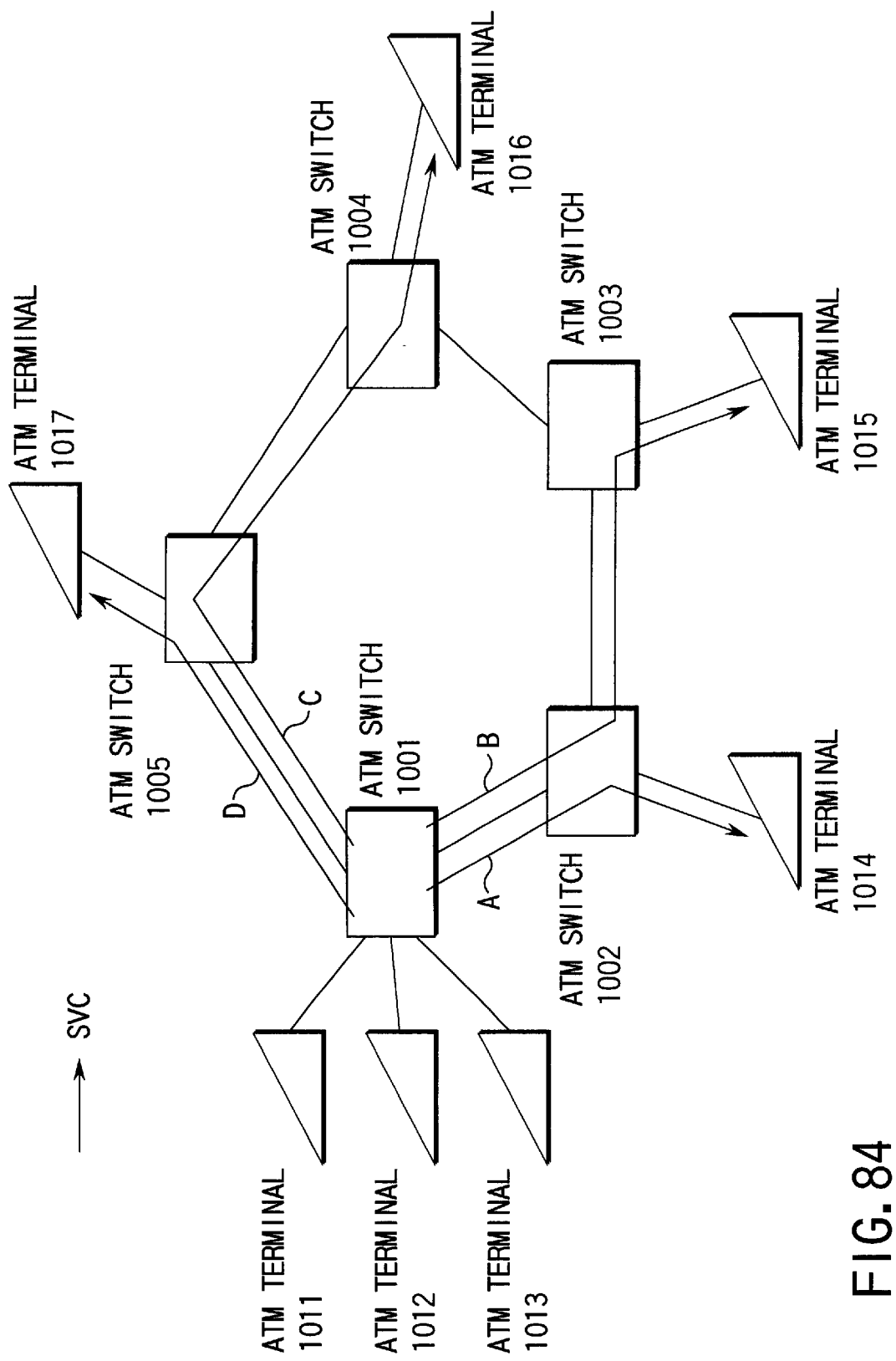
FIG. 84 is a diagram showing an example of connections set in this embodiment.

Likewise, the ATM switch 1001 automatically sets connections (A, B, C, D) as SVCs in optimal routes by the topology-driven scheme with respect to the ATM terminals (1014, 1015, 1016, 1017) other than the directly connected ones, as shown in FIG. 84.

Figure 85:
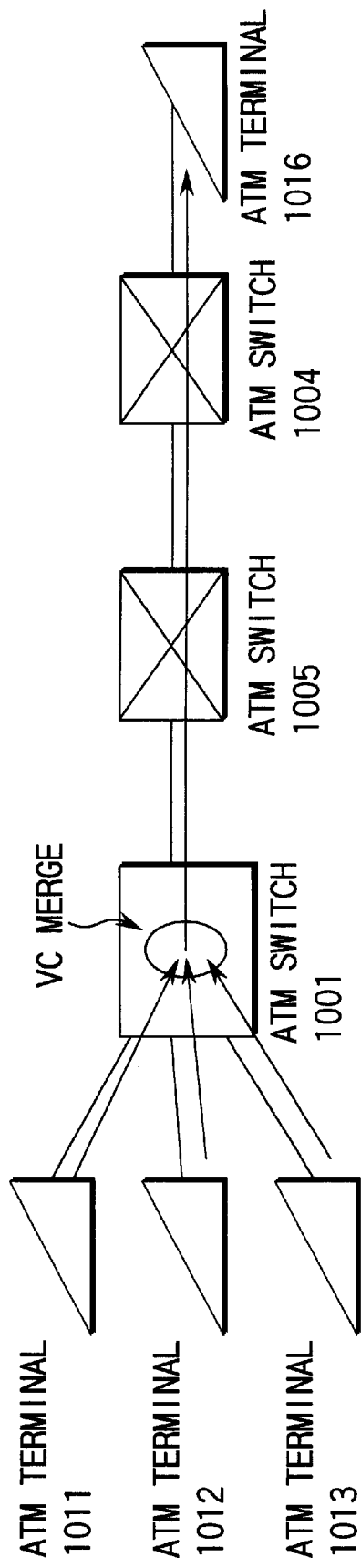
FIG. 85 is a diagram showing the VC merge processes in this embodiment.

Upon receiving SVC connection requests from the ATM terminals 1011 to 1013 to the ATM terminal 1016, the ATM switch 1001 sets a switch to flow incoming data from the respective hosts onto the already set connections to the ATM terminal 1016. To achieve such setup, however, the ATM switch 1001 must have a VC merge function (of merging a plurality of connections into a single path), as shown in FIG. 85.

According to the 10th embodiment described above, since the routing protocol of the IP can be used on the ATM switch, high-speed end-to-end connection setups and a reduction of the number of connections in the ATM network can be simultaneously realized.

Industrial Applicability

As described in detail above, according to the present invention, a plurality of forwarding means each having a unique forwarding processing function are provided in correspondence with the respective output ports of an ATM switch core. AS for packets having an identical address of those processed by these plurality of forwarding means, destination information which has different values in units of packets is assigned to ATM cells that form each packet, and ATM cells of packets which are assigned identical destination information are stored by a predetermined volume, and are output in a format that stores the ATM cells by the predetermined volume.

Therefore, according to the present invention, higher-speed, larger-capacity IP relay processes can be coped with without increasing the operation speed, processing performance, and the like. By combining with an ATM switch, since load distribution can be implemented by queuing in units of PDUs, i.e., ATM connections, an increase in cost can be reduced.

In the present invention, forwarding of an IP packet is done by receiving ATM cells, whose destination information indicates forwarding, via a first path connected to a first port of an ATM switch, signaling of an IP packet is done by receiving ATM cells, whose destination information indicates signaling, via a second path which is connected to a second port of the ATM switch and is physically different from the first path, and management/control is done by receiving ATM cells, whose destination information indicates management/control, via a third path which is connected to a third port of the ATM switch and is physically different from the first and second paths.

Accordingly, according to the present invention, software processes of the IP forwarding, signaling, and management/control functions can be reduced, and efficiency of forwarding, signaling, and management/control processes of IP packets can be improved. Hence, high-speed, large-capacity data relay processes can be implemented without improving the operation speed and processing speed (CPU performance).

In the present invention, signaling is done by signaling processing means by receiving a signaling packet from an ATM switch via a first link of the ATM switch, and IP packet forwarding is done by hardware using a predetermined memory by receiving an IP packet via a second link, which is physically different from the first link, by forwarding processing means provided independently of the signaling processing means.

Therefore, according to the present invention, especially when a network packet relay device based on the CSR scheme supports an SVC, high signaling performance can be obtained, and packet forwarding performance upon hop-by-hop forwarding can be greatly improved.

In the present invention, in an ATM switch which searches a routing table on the basis of header information of a cell input from an input-port line to rewrite the header information of the input cell to output-port information, and exchanges the cell to a predetermined output line, some bits of the header information of the input cell are masked, and the routing table is searched on the basis of the masked header information. Based on the search result obtained at that time, the header information of the input cell is rewritten to predetermined output-port information in the routing table.

As a consequence, according to the present invention, a network which can commonize output-port switching information of cells input via input-port lines, and can merge a plurality of VCCs into one can be realized. As a result, the VPI/VCI resource volume especially in the backbone network can be reduced, and the VCC merge scheme that never disturbs packet forwarding can be implemented.

In the present invention, in an ATM switch, the time for which no cell travels is periodically detected in units of connections, and the detected cell non-travel times are stored. The stored cell non-travel times are polled at a predetermined polling cycle, and a release process of connections is executed based on the polled cell non-travel times.

Hence, according to the present invention, a connection which becomes unnecessary can be released early irrespective of the polling cycle of a processor. As a result, connection resources can be effectively used.

In the present invention, in a relay device that executes routing in the network layer and switching in the data link layer using an ATM switch, input data are handled in units of packets to determine a packet type prior to the routing and switching, and each packet is sent to the ATM switch in accordance with priority corresponding to the packet type.

Therefore, according to the present invention, since input data are handled in units of packets prior to routing and switching, and a packet is sent to the ATM switch in accordance with priority corresponding to the packet type, a packet with high priority can be preferentially forwarded and processed, thus realizing efficient data communications.

In the present invention, in an ATM relay device which comprises a high-speed packet forwarding mode by means of hardware using an ATM switch, and forwards packets having an identical forwarding destination addresses by sharing a single path, packets having identical forwarding destination addresses are stored in different queues in correspondence with their communication quality levels in units of PDUs, packets stored in different queues in units of PDUs can be aligned in the order of communication quality levels, and can be forwarded using a single path.

Therefore, according to the present invention, since cells to be forwarded are aligned and merged in accordance with their required communication quality levels in units of PDUs, an ATM relay device having dual modes which can selectively use cut-through paths in units of communication quality classes can be provided.

In the present invention, in a packet forwarding state monitoring device, the forwarding state of packets to be forwarded to a destination by routing in the network layer is monitored, the forwarding tendency of packets is predicted on the basis of the monitoring result at that time, and a condition for shifting the forwarding mode to a hardware process below the data link layer is determined based on the predicted result.

Therefore, according to the present invention, since a router itself that uses the label switching technique determines and automatically sets a condition for shifting the forwarding mode to the effective cut-through mode, and monitors effectiveness of cut-through forwarding after the condition is set, the network can be efficiently used, and the load on the network administrator can be reduced.

In the present invention, a designated path setting method for a router or label switch host which is located at the boundary between a network constructed by a label switch and a network constructed by another device, or a router which is located at the boundary between an identical label switch network and another label switch network even in a network constructed by a label switch, comprises the step of referring to QOS information or equivalent information in a header of packet data to be forwarded, and the step of determining based on the referred QOS information or equivalent information whether or not a designated path is set for the packet data.

Hence, according to the present invention, packet forwarding that takes service quality differences into consideration while assuring QOS information of packets can be implemented.

In the present invention, an ATM switch at each node of an ATM network has an IP over ATM function, and upon setting a connection by such ATM switch, connections for routing information are set by the IP over ATM between neighboring switches and ATM terminals, and routing based on a predetermined routing protocol is done on the IP of the IP over ATM after the connections are set.

Therefore, according to the present invention, since the routing protocol of the IP can be used on the ATM switch, high-speed end-to-end connection setups and a reduction of the number of connections in the ATM network can be simultaneously realized.

What is claimed is:

1. An ATM relay device comprising:
    an ATM switch core for distributing an input ATM cell to a corresponding one of a plurality of output ports on the basis of destination information thereof;
    a plurality of forwarding means, provided in correspondence with the respective output ports of said ATM switch core, wherein each of the plurality of forwarding means has a unique forwarding processing function for executing a predetermined forwarding process for a packet obtained by reassembling ATM cells input via the respective output ports;
    destination information assignment means for assigning destination information which assigns different values to ATM cells in unit of packets having at least one packet with an identical address to at least one other packet processed by said plurality of forwarding means; and
    output means for storing ATM cells of packets assigned identical destination information by said destination information assignment means by a predetermined volume and outputting the ATM cells in a format that stores the ATM cells by the predetermined volume.

2. An ATM relay device according to claim 1, characterized in that said output means queues and stores packets having identical destination information in output queues in units of connections, and outputs the packets in units of protocol data units.

3. An ATM relay device according to claim 2, characterized in that whether or not ATM cells are stored in units of protocol data units is determined by an end flag.

4. An ATM relay device characterized by comprising:
    ATM switch for distributing an input ATM cell to at least one of first, second, and third different ports on the basis of destination information thereof;
    IP forwarding means for executing a forwarding process of an IP packet by receiving an ATM cell indicating that the destination information of the ATM cell is for forwarding via a first path connected to the first port of said ATM switch;

signaling means for executing a signal process of an IP packet by receiving an ATM cell indicating that the destination information of the ATM cell is for the signaling process, via a second path which is connected to the second port of said ATM switch and is physically different from the first path; and management/control means for making management/control by receiving an ATM cell indicating that the destination information of the ATM cell is for management/control, via a third path which is connected to the third port of said ATM switch and is physically different from the first and second paths.

5. An ATM relay device comprising a packet forwarding function in a network layer using an ATM switch, comprising:

signaling processing means, provided in association with an ATM switch, for executing a signaling process by receiving a signaling packet from the ATM switch via a first link;

forwarding processing means, provided independently of said signaling processing means, for executing an IP packet forwarding process by hardware using a predetermined memory by receiving an IP packet via a second link which is physically different from the first link; and CPU processing means for executing a CPU process by receiving at least a packet addressed to the ATM relay device and an IP packet which cannot undergo the IP packet forwarding process by said forwarding processing means, via a third link, which is physically different from the first and second links.

6. An ATM relay device according to claim 5, characterized in that the second link for the signaling process and the third link for the CPU process are physically an identical link.

7. An ATM relay device according to claim 5 or 6, characterized by comprising adjustment means for adjusting times to live of at least the packet addressed to the ATM relay device and the IP packet which cannot undergo the IP packet forwarding process by said forwarding processing means in said ATM relay device.

* * * * *

UNITED STATES PATENT AND TRADEMARK OFFICE
CERTIFICATE OF CORRECTION

PATENT NO. : 6,781,994 B1  Page 1 of 1
DATED : August 24, 2004
INVENTOR(S) : Nogami et al.

It is certified that error appears in the above-identified patent and that said Letters Patent is hereby corrected as shown below:

Column 60,
Line 63, change "ATM" (first occurrence) to -- an ATM --.

Signed and Sealed this

Twenty-third Day of November, 2004

JON W. DUDAS
*Director of the United States Patent and Trademark Office*